(12) United States Patent
Zhang et al.

(10) Patent No.: US 11,573,441 B2
(45) Date of Patent: Feb. 7, 2023

(54) BACKLIGHT ASSEMBLY WITH FRAME HAVING PLURALITY OF POSITIONING GROOVES ON RIM

(71) Applicants: BEIJING BOE DISPLAY TECHNOLOGY CO., LTD., Beijing (CN); BOE TECHNOLOGY GROUP CO., LTD., Beijing (CN)

(72) Inventors: Yu Zhang, Beijing (CN); Huiyan Li, Beijing (CN); Shixin Geng, Beijing (CN); Bochang Wang, Beijing (CN)

(73) Assignees: BEIJING BOE DISPLAY TECHNOLOGY CO., LTD., Beiing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/690,260

(22) Filed: Mar. 9, 2022

(65) Prior Publication Data
US 2022/0197078 A1    Jun. 23, 2022

Related U.S. Application Data

(63) Continuation of application No. 17/036,444, filed on Sep. 29, 2020, now Pat. No. 11,300,819, which is a (Continued)

(51) Int. Cl.
*G02F 1/1333* (2006.01)
*G02F 1/13357* (2006.01)
*G09G 3/34* (2006.01)

(52) U.S. Cl.
CPC .. *G02F 1/133308* (2013.01); *G02F 1/133603* (2013.01); *G02F 1/133605* (2013.01);
(Continued)

(58) Field of Classification Search
CPC ......... G02F 1/033308; G02F 1/133317; G02F 1/133608; G09F 13/0413; G09F 13/0445
See application file for complete search history.

(56) References Cited

U.S. PATENT DOCUMENTS 8,439,552 B2 *   5/2013   Jeong ................... G02B 6/0088
                                                       362/634
8,558,963 B2 *  10/2013   Li ...................... G02F 1/133308
                                                       349/64
(Continued)

FOREIGN PATENT DOCUMENTS

CN        101435948 A       5/2009
CN        103836463 A       6/2014
(Continued)

OTHER PUBLICATIONS

Non-final office action from U.S. Appl. No. 17/036,444 dated Aug. 5, 2021.

*Primary Examiner* — Ismael Negron
(74) *Attorney, Agent, or Firm* — Dilworth & Barrese, LLP.; Michael J. Musella, Esq.

(57) ABSTRACT

A backlight assembly includes a first sub-optical film with first edge portions, and a supporting frame including a first supporting portion which includes rims. At least one rim includes a first positioning groove and second positioning grooves, the first edge portion includes a first positioning portion in the first positioning groove and second positioning portions in the second positioning grooves; a difference between sizes of the first positioning groove and the first positioning portion is a first space, a difference between a size of each second positioning groove and that of the second positioning portion is a second space greater than the first space; the first edge portions include a first sub-edge portion, the first positioning portion is located at a midpoint of the first sub-edge portion, and the second positioning
(Continued)

portions are distributed on both sides of the first positioning portion.

20 Claims, 17 Drawing Sheets

Related U.S. Application Data continuation-in-part of application No. PCT/CN2020/093954, filed on Jun. 2, 2020, and a continuation-in-part of application No. PCT/CN2019/126915, filed on Dec. 20, 2019.

(52) U.S. Cl.
CPC .. *G02F 1/133314* (2021.01); *G02F 1/133317* (2021.01); *G09G 3/3406* (2013.01)

(56) References Cited

U.S. PATENT DOCUMENTS

| | | | |
|---|---|---|---|
| 8,587,748 B2* | 11/2013 | Sun | G02F 1/133608 349/60 |
| 9,244,298 B2 | 1/2016 | Ishida | |
| 9,341,888 B2 | 5/2016 | Takeuchi | |
| 9,411,193 B2 | 8/2016 | Zhang et al. | |
| 9,651,733 B2* | 5/2017 | Liu | G02B 6/005 |
| 9,715,139 B2* | 7/2017 | Lee | G02F 1/1336 |
| 9,739,933 B2 | 8/2017 | Kim | |
| 9,841,634 B2 | 12/2017 | Park | |
| 10,012,791 B2* | 7/2018 | Zhang | G02B 6/0088 |
| 10,041,653 B2 | 8/2018 | Ahn | |
| 10,788,707 B2* | 9/2020 | Ai | G02F 1/133308 |
| 11,300,819 B2* | 4/2022 | Zhang | G02F 1/133308 |
| 2012/0293928 A1* | 11/2012 | Li | G02F 1/133608 361/679.01 |
| 2013/0270977 A1* | 10/2013 | Chen | A47B 81/06 312/7.2 |
| 2016/0131828 A1 | 5/2016 | Gotou | |
| 2016/0291231 A1 | 10/2016 | Jang | |
| 2017/0127166 A1 | 5/2017 | Noma | |
| 2018/0136520 A1 | 5/2018 | Kim | |
| 2020/0218112 A1 | 7/2020 | Chae | |

FOREIGN PATENT DOCUMENTS

| | | |
|---|---|---|
| CN | 104049394 A | 9/2014 |
| CN | 204188910 U | 3/2015 |
| CN | 106504651 A | 3/2017 |
| CN | 106526933 A | 3/2017 |
| CN | 207396915 A | 5/2018 |
| CN | 109003539 A | 12/2018 |
| KR | 101678627 A | 12/2016 |
| WO | 2013024718 A1 | 2/2013 |

* cited by examiner

BACKLIGHT ASSEMBLY WITH FRAME HAVING PLURALITY OF POSITIONING GROOVES ON RIM

CROSS REFERENCE TO RELATED APPLICATIONS

This application is a continuation application of U.S. Ser. No. 17/036,444 filed on Sep. 29, 2020 which is a continuation in part of international application PCT/CN2019/126915 filed on Dec. 20, 2019, and is also a continuation in part of international application PCT/CN2020/093954 filed on Jun. 2, 2020, all of these applications hereby incorporated herein by reference in their entirety.

TECHNICAL FIELD

At least one embodiment of the present disclosure relates to a backlight assembly and a display device.

BACKGROUND

A curved surface display device can form a display region with a curved shape. When the curved surface display device is applied to a large-size display device, the difference between a visual angle of a middle of the display region and a visual angle of an edge of the display region can be reduced to achieve a better display effect.

SUMMARY

At least one embodiment of the present disclosure provides a backlight assembly and a display device. The backlight assembly includes a first sub-optical film and a supporting frame. The first sub-optical film includes a plurality of first edge portions; a supporting frame includes a first supporting portion, the first supporting portion has a first supporting surface facing the first sub-optical film to support the first sub-optical film, the first supporting portion includes a plurality of rims, at least one rim is configured to support at least one first edge portion. The at least one rim includes a first positioning groove and at least one second positioning groove, the at least one first edge portion includes a first positioning portion and at least one second positioning portion, the first positioning portion is in the first positioning groove, and each second positioning portion is in a corresponding second positioning groove; in a normal temperature environment, on each rim and the corresponding first edge portion, opposite sides of each second positioning groove in an extending direction of the rim are not in contact with opposite sides of the corresponding second positioning portion in the extending direction of the rim, the normal temperature environment means that the ambient temperature of the backlight assembly is in a range of 0~40° C.; a difference between a size of the first positioning groove and a size of the first positioning portion in the extending direction of the rim is a first space, a difference between a size of each second positioning groove and a size of the corresponding second positioning portion in the extending direction of the rim is a second space, and the first space is smaller than the second space; the plurality of first edge portions include a first sub-edge portion extending along a first direction and a second sub-edge portion extending along a second direction, the first positioning portion on the first sub-edge portion is approximately located at a midpoint of the first sub-edge portion in the first direction, and the at least one second positioning portion includes a plurality of second positioning portions, and the plurality of second positioning portions located on the first sub-edge portion are distributed on both sides of the first positioning portion in the first direction.

In some examples, a length of the first sub-edge portion is greater than that of the second sub-edge portion; in the normal temperature environment, a plurality of second spaces corresponding to the plurality of second positioning portions on the first sub-edge portion gradually increase in a direction from the midpoint to both end points of the first sub-edge portion.

In some examples, the first positioning portion on the first sub-edge portion includes a first protruding portion, each second positioning portion on the first sub-edge portion includes a second protruding portion, a middle part of the second protruding portion includes an opening, a boss is disposed in the second positioning groove corresponding to the second positioning portion on the first sub-edge portion, and the opening is sleeved on the boss.

In some examples, in the normal temperature environment, opposite sides of each boss in the first direction are not in contact with opposite sides of a corresponding opening in the first direction, and a difference between a size of the opening and a size of the boss in the first direction is a third space greater than the first space.

In some examples, a plurality of third spaces corresponding to the plurality of second positioning portions gradually increase in the direction from the midpoint to both end points of the first sub-edge portion.

In some examples, the second space between each second positioning portion and the corresponding second positioning groove includes at least one of an expansion space and a contraction space, and in the normal temperature environment, in the direction from the midpoint to both end points of the first sub-edge portion, a plurality of expansion spaces corresponding to the plurality of second positioning portions gradually increase, and/or a plurality of contraction spaces corresponding to the plurality of second positioning grooves gradually increase.

In some examples, the first edge portion further includes a third positioning portion and at least one fourth positioning portion on the second sub-edge portion, and the rim of the first supporting portion configured to support the second sub-edge portion includes a third positioning groove and at least one fourth positioning groove, the third positioning portion is in the third positioning groove, and each fourth positioning portion is in a corresponding fourth positioning groove, the least one fourth positioning portion is located on a same side of the third positioning portion in the second direction, in the normal temperature environment, opposite sides of each fourth positioning groove in the second direction are not in contact with opposite sides of the corresponding fourth positioning portion in the second direction, and a difference between a size of the third positioning groove and a size of the third positioning portion in the second direction is smaller than a difference between a size of each fourth positioning groove and a size of a corresponding fourth positioning portion in the second direction.

In some examples, the opening of the second positioning portion on the first sub-edge portion close to the third positioning portion contacts with or keeps a small distance from a side of a corresponding boss away from the third positioning portion in the second direction, and a space between a side of the third positioning portion away from the fourth positioning portion and a corresponding side of the third positioning groove is smaller than a space between a side the third positioning portion close to the fourth positioning portion and a corresponding side of the third positioning groove to realize an accurate positioning of the first sub-optical film in the second direction; a space between the side of the third positioning portion away from the fourth positioning portion and the corresponding side of the third positioning groove is smaller than two spaces between two sides of each fourth positioning portion and a corresponding fourth positioning groove.

In some examples, the rim of the plurality of rims configured to support the first sub-edge portion is an arc shaped rim, and a bending direction of the arc-shaped rim faces the first sub-optical film.

In some examples, the backlight assembly further includes: a second sub-optical film including a plurality of second edge portions, the second sub-optical film being located between the first sub-optical film and the first supporting surface of the supporting frame, the first supporting surface being configured to support the second sub-optical film and the first sub-optical film, and at least one of the plurality of rims being configured to support at least one second edge portion. At least one rim of the first supporting portion further includes a plurality of blocking walls, and at least one second edge portion includes a plurality of concave portions, the plurality of concave portions are disposed in one-to-one correspondence with the plurality of blocking walls, and each concave portion is configured to be clamped with the corresponding blocking wall to fix the second sub-optical film.

In some examples, the second sub-optical film includes a third sub-edge portion extending along the first direction and a fourth sub-edge portion extending along the second direction; the plurality of concave portions include a first sub-concave portion and a plurality of second sub-concave portions located on the third sub-edge portion, the first sub-concave portion is approximately located at a midpoint of the third sub-edge portion in the first direction, and the plurality of second sub-concave portions are distributed on both sides of the first sub-concave portion; in the normal temperature environment, opposite sides of each second sub-concave portion in the first direction are not in contact with opposite sides of a corresponding blocking wall in the first direction, a difference between a size of the first sub-concave portion and a size of a corresponding blocking wall in the first direction is a fourth space, a difference between a size of the second sub-concave portion and a size of the corresponding blocking wall in the first direction is a fifth space, the fourth space is smaller than the fifth space.

In some examples, a length of the third sub-edge portion is greater than a length of the fourth sub-edge portion.

In some examples, in the normal temperature environment, in a direction from a middle point to both end points of the third sub-edge portion, a plurality of fifth spaces corresponding to the plurality of second sub-concave portions gradually increase.

In some examples, the plurality of concave portions include a third sub-concave portion and at least one fourth sub-concave portion located on the fourth sub-edge portion, the at least one fourth sub-concave portion is located on one side of the third sub-concave portion in the second direction, and in the normal temperature environment, a difference between a size of the third sub-concave portion and a size of a corresponding blocking wall in the second direction is smaller than a difference between a size of each fourth sub-concave portion and a size of a corresponding blocking wall in the second direction.

In some examples, each of the plurality of blocking walls includes two sub-blocking walls arranged in an extending direction of the rim where the blocking wall is located, and the first positioning groove, the second positioning groove, the third positioning groove or the fourth positioning groove is disposed between the two sub-blocking walls, and in the normal temperature environment, an edge of the first edge portion of the first sub-optical film except the first positioning portion, the second positioning portion, the third positioning portion and the fourth positioning portion has an interval with the blocking walls.

In some examples, the backlight assembly further includes: a back plate, at least part of the back plate being located at a side of the supporting frame away from the first sub-optical film. The back plate includes a bottom plate and a side plate disposed on an edge of the bottom plate, and the supporting frame is connected to the bottom plate, the bottom plate includes a bottom wall and a second supporting portion located outside an edge of the bottom wall, the second supporting portion has a second supporting surface facing the first sub-optical film, and the first supporting portion is disposed on the second supporting surface of the second supporting portion.

At least one embodiment of the present disclosure provides a display device, including the backlight assembly as mentioned above, the display device is a curved surface display device.

At least one embodiment of the present disclosure provides a backlight assembly. The backlight assembly includes a first sub-optical film and a supporting frame. The backlight assembly includes a first sub-optical film and a supporting frame. The first sub-optical film includes a plurality of first edge portions; a supporting frame includes a first supporting portion, the first supporting portion has a first supporting surface facing the first sub-optical film to support the first sub-optical film, the first supporting portion includes a plurality of rims, at least one rim is configured to support at least one first edge portion. The at least one rim includes a first positioning groove and at least one second positioning groove, the at least one first edge portion includes a first positioning portion and at least one second positioning portion, the first positioning portion is in the first positioning groove, and each second positioning portion is in a corresponding second positioning groove; in a normal temperature environment, on each rim and the corresponding first edge portion, opposite sides of each second positioning groove in an extending direction of the rim are not in contact with opposite sides of the corresponding second positioning portion in the extending direction of the rim, the normal temperature environment means that the ambient temperature of the backlight assembly is in a range of 0~40° C.; a difference between a size of the first positioning groove and a size of the first positioning portion in the extending direction of the rim is a first space, a difference between a size of each second positioning groove and a size of the corresponding second positioning portion in the extending direction of the rim is a second space, and the first space is smaller than the second space; the plurality of first edge portions include a first sub-edge portion extending along a first direction and a second sub-edge portion extending along a second direction, the at least one second positioning portion includes a plurality of second positioning portions, the plurality of second positioning portions are located on a same side of the first positioning portion on the first sub-edge portion.

In some examples, a length of the first sub-edge portion is greater than that of the second sub-edge portion; in the normal temperature environment, a plurality of second spaces corresponding to the plurality of second positioning portions gradually increase in a direction from a position close to the first positioning portion to a position away from the first positioning portion.

In some examples, a length of the first sub-edge portion is greater than a length of the second sub-edge portion.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

Figure 1A:
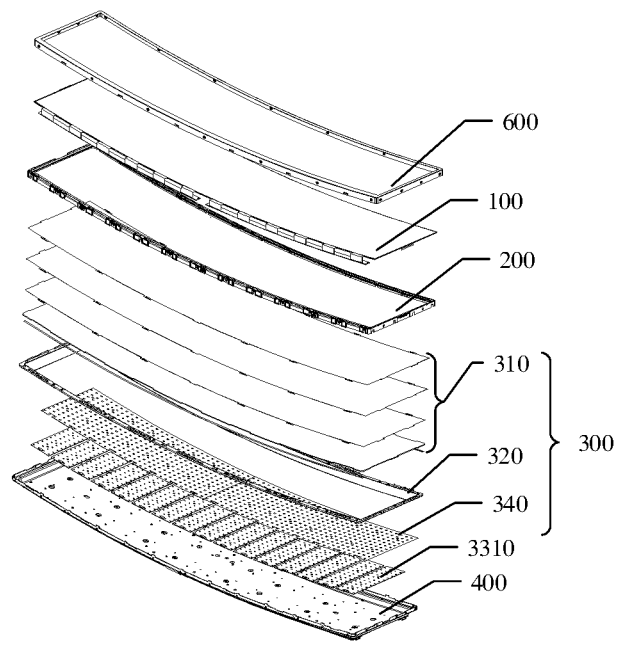
FIG. 1A is an exploded schematic diagram of a curved surface display device provided by an embodiment of the present disclosure.

In order to make objects, technical details and advantages of the embodiments of the present disclosure apparent, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

The features such as "parallel", "vertical" and "same" used in the embodiments of the present disclosure all include the features of "parallel", "vertical" and "same" in strict sense, as well as situations such as "approximately parallel", "approximately vertical" and "approximately same" which contain certain errors. Considering the errors related to the measurement in discussion and the measurement of specific quantities (that is, limitation of the measurement system), "approximately" can mean that a value is within the acceptable deviation range for a specific value determined by those of ordinary skill in the art. For example, "approximately" can mean within one or more standard deviations, or within 10% or 5% of the specific value.

In the research, inventor(s) of the application found that a curved surface display device includes one middle frame, which is used to support a display panel in the display device and has a light shading function on a periphery of the display panel. An optical film is arranged on a side of the middle frame away from the display panel, and an edge of the optical film includes a plurality of openings to be sleeved on a plurality of protrusions disposed on an upper edge of a side wall of a back plate to fix the edge of the optical film. Because the thermal expansion coefficient of the optical film is quite different from that of a metal material of the back plate, when they are deformed by expansion with heat and contraction with cold, a lamination effect between the edge of the optical film and the upper edge of the side wall of the back plate will become worse, which will cause the optical film to wrinkle, thus affecting the display effect of the display device. In addition, a part of the optical film except the edge can also be supported by a plurality of pillars disposed on a side of the optical film away from the display panel. Because the pillar only supports the optical film, but is not fixedly connected with the optical film, when the curved surface display device is used in vehicles (such as automobiles), a problem of unqualified vibration reliability will occur. For example, when the curved surface display device as mentioned above is used in a vehicle, friction and collision will occur between the pillar and the optical film, which will not only cause noise and abnormal sound, but also scratch the optical film, resulting in bad problems such as white spots and bright lines on the display screen.

Another curved surface display device includes one middle frame for supporting an optical film and a display panel, which requires greater hardness, and a supporting portion for supporting the optical film in the middle frame has greater thickness. When the display device is tested at an environment with high temperature and high humidity, a value of expansion and contraction of a material of the middle frame will increase. For example, when the middle frame expands, it will interfere with other structures such as a front frame, resulting in light leakage. When the middle frame contracts, a fixation gap between the middle frame and the optical film decreases, and the optical film folds, which leads to a poor display picture. In addition, an upper edge of the middle frame and an upper edge of the side wall of the back plate are roughly positioned through a hook structure and the like, and the fixing mode of the middle frame and the side wall of the back plate leads to greater assembly tolerance, thereby affecting the curvature accuracy of the display device. In addition, in a case of the middle frame of the above mentioned curved surface display device having a relatively large thickness, not only the difficulty of processing and molding is increased, but also a problem is caused so that the middle frame is difficult to deform in the process of fixing the middle frame and the back plate, which makes it difficult to match the curvature of the back plate.

In addition, the curvature deviation of the back plate, the middle frame and the front frame in the curved surface display device will affect the curvature accuracy of the whole curved surface display device. Therefore, the curvature accuracy of the current large-size curved surface display device is only 10%.

Embodiments of the present disclosure provide a curved surface display device, which includes a display panel, a first middle frame, a backlight assembly, and a back plate. The first middle frame is located on a non-display side of the display panel and is configured to support the display panel; the backlight assembly is located at a side of the first middle frame away from the display panel and includes an optical film and a second middle frame, the second middle frame is located at a side of the optical film away from the display panel and is configured to support the optical film; at least part of the back plate is located at a side of the backlight assembly away from the display panel. The back plate includes a bottom plate and a side plate disposed on an edge of the bottom plate, and the second middle frame is connected to the bottom plate. In the present disclosure, two middle frames are disposed in the curved surface display device, and the second middle frame is fixed on the bottom plate of the back plate to minimize the assembly tolerance, thereby improving the curvature accuracy of the display device.

The curved surface display device, the vehicle and the backlight assembly provided by embodiments of the present disclosure will be described below with reference to the drawings.

Figure 1B:
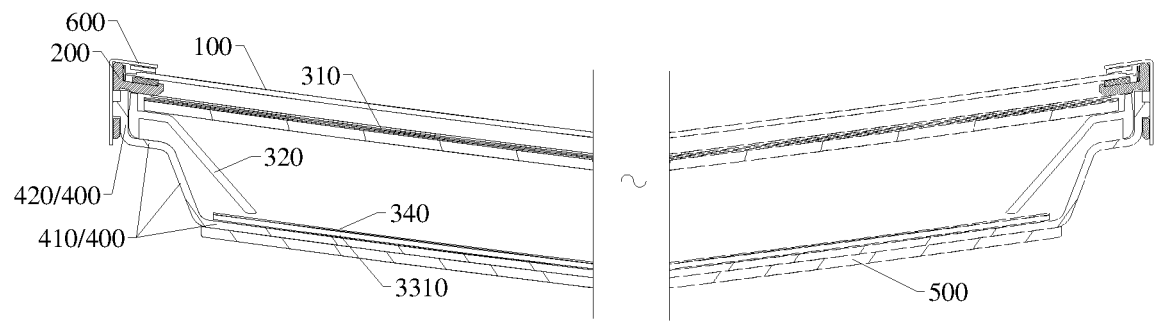
FIG. 1B is a sectional view of the curved surface display device shown in FIG. 1A in an assembled state.

FIG. 1A is an exploded schematic diagram of a curved surface display device provided by an embodiment of the present disclosure, and FIG. 1B is a sectional view of the curved surface display device shown in FIG. 1A in an assembled state. As shown in FIG. 1A and FIG. 1B, the curved surface display device sequentially includes a front frame 600, a display panel 100, a first middle frame 200, a backlight assembly 300, and a back plate 400.

For example, as shown in FIG. 1A and FIG. 1B, the display panel included in the curved surface display device may be a liquid crystal display panel. The liquid crystal display panel may include an array substrate (not shown), an opposite substrate (not shown), and a liquid crystal layer (not shown) located between the array substrate and the opposite substrate.

For example, a side of the array substrate facing the opposite substrate can include a plurality of gate lines extending along one direction and a plurality of data lines extending along the other direction, and the plurality of gate lines and the plurality of data lines are arranged crosswise to define a plurality of pixel units arranged in an array. Each pixel unit can include a pixel electrode and a thin film transistor. The gate line is connected with a gate electrode of the thin film transistor to turn on or turn off the thin film transistor. The pixel electrode is connected with one of a source electrode and a drain electrode of the thin film transistor, and the data line is connected with the other of the source electrode and the drain electrode of the thin film transistor. The data line inputs voltage signals required for displaying pictures to the pixel electrode through the thin film transistor to realize the display of the array substrate.

For example, the opposite substrate may be a color film substrate, and a side of the color film substrate facing the array substrate may be provided with a color film layer corresponding to the pixel unit and a black matrix covering structures such as the gate lines and the data lines located in a non-display area. For example, a side of the color film substrate facing the array substrate may also be provided with a common electrode opposite to the pixel electrode, and the common electrode is configured to apply a common voltage to generate an electric field with the pixel electrode to drive the liquid crystal molecules in the liquid crystal layer to deflect. The liquid crystal molecules are deflected to change the transmittance of the liquid crystal layer, thereby realizing the display of the desired gray-scale image.

For example, the display panel 100 may further include a first polarizer disposed on a side of the array substrate away from the opposite substrate and a second polarizer disposed on a side of the opposite substrate away from the array substrate. The first polarizer includes a light transmission axis extending along a first direction and polarizes backlight incident in the first polarizer along the first direction. The second polarizer includes a light transmission axis extending along a second direction and polarizes light incident on the second polarizer along the second direction. For example, the light transmission axis of the first polarizer and the light transmission axis of the second polarizer are perpendicular to each other.

For example, as shown in FIG. 1A and FIG. 1B, the backlight assembly 300 is located on the non-display side of the display panel 100 to provide backlight for the display panel 100. For example, the backlight assembly 300 provided by the embodiment of the present disclosure can be a direct-type backlight assembly, which includes a light source component 330, an optical film 310 between the light source component 330 and the display panel 100, and a reflective sheet 340 on a side of the light source component 330 facing the optical film 310.

For example, the light source component 330 includes light-emitting diodes arranged in an array.

For example, in a direction from the light source component 330 to the display panel 100, the optical film 310 may include a diffuser plate, a first diffuser sheet, a prism layer and a second diffuser sheet stacked in sequence.

For example, the diffuser plate can be made of transparent materials such as polymethyl methacrylate (PMMA) or polycarbonate (PC), which is thick and has a light transmittance of 50%-80%. For example, for a higher haze, the first diffuser sheet is generally made of polyethylene terephthalate (PET) or polycarbonate, and is disposed on a side of the diffuser plate away from the light source component, so that the light distribution is more uniform. For example, the prism layer can be made of serrated or wavy polymethyl methacrylate microstructures or the like, which has a good spotlight effect. For example, the second diffuser sheet is made of a material with higher transmittance and lower haze, which can be used as a structure for protecting the prism layer.

A certain light mixing distance is set between the light source component 330 and the diffuser plate, so that the light emitted by the light source component 330 forms a uniform energy distribution between the light source component 330 and the diffuser plate. For example, the first diffuser sheet, the prism layer, and the second diffuser sheet are configured to uniformly extract the light emitted from the light source component 330.

For example, in order to improve the utilization rate of the light source, the backlight assembly 300 may further include the reflective sheet 340 which is located on a light-emitting surface of the light source component 330 and exposes the light-emitting diodes, that is, the reflective sheet 340 includes opening areas corresponding to the light-emitting diodes one by one to expose the light-emitting diodes.

For example, the back plate 400 is used to support the light source component 330.

As shown in FIG. 1A and FIG. 1B, a first middle frame 200 is located on the non-display side of the display panel 100, that is, between the display panel 100 and the backlight assembly 300, and is configured to support the display panel 100. The backlight assembly 300 further includes a second middle frame 320 located at a side of the optical film 310 away from the display panel 100, and the second middle frame 320 is configured to support the optical film 310. The curved surface display device provided by the embodiment of the present disclosure further includes a back plate 400 located at the side of the backlight assembly 300 away from the display panel 100, which includes a bottom plate 410 and a side plate 420 disposed at an edge of the bottom plate 410, and the second middle frame 320 is connected to the bottom plate 410 of the back plate 400. The above-mentioned "the second middle frame 320 is connected to the bottom plate 410 of the back plate 400" means that the second middle frame is in contact with the bottom plate and is fixedly connected with the bottom plate in at least one direction. In the present disclosure, two middle frames are arranged in the curved surface display device, and only the second middle frame is fixed on the bottom plate of the back plate, so that the assembly tolerance can be minimized, and then the curvature precision of the display device is improved.

Figure 2A:
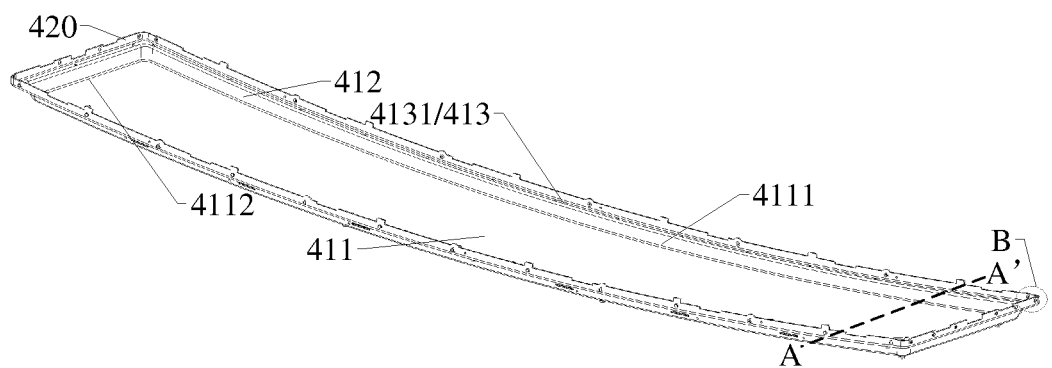
FIG. 2A is a schematic plan view of a back plate shown in FIG. 1A.
Figure 2B:
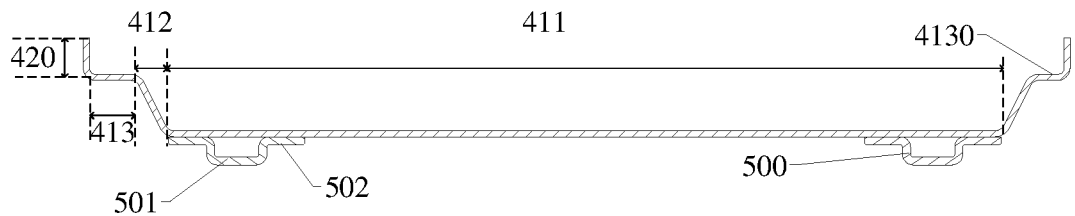
FIG. 2B is a schematic cross-sectional view taken along line AA shown in FIG. 2A.

For example, FIG. 2A is a schematic plan view of a back plate shown in FIG. 1A, and FIG. 2B is a schematic cross-sectional view taken along a line AA shown in FIG. 2A. As shown in FIG. 1A to FIG. 2B, the bottom plate 410 and side plates 420 of the back plate 400 form an accommodation space to accommodate the backlight assembly 300. The bottom plate 410 of the back plate 400 includes a bottom wall 411 and a first supporting portion 413 located outside an edge of the bottom wall 411. The bottom plate 410 further includes a connecting portion 412 connecting the edge of the bottom wall 411 with the first supporting portion 413, the first supporting portion 413 extends outward from the edge of the connecting portion 412.

For example, the light source component 330 and the reflective sheet 340 included in the backlight assembly 300 are both located on the surface of the bottom wall 411 at a side facing the display panel 100, and the bottom wall 411 is used for supporting the light source component 330 and the reflective sheet 340.

The bottom wall 411 in the embodiment of the present disclosure is a curved surface structure for maintaining a predetermined curvature of the display panel 100. When the curved surface display device provided by the embodiment of the present disclosure is used for viewing, the bottom wall may be curved, that is, the edge of the bottom wall is curved toward a side facing the display panel.

For example, as shown in FIG. 1A to FIG. 2B, the bottom wall 411 includes two first edges 4111 opposite to each other, and the first edges 4111 are curved edges, such as arc edges, so that the bottom wall 411 is a curved surface structure. For example, the bottom wall 411 also includes second edges 4112 opposite to each other. In the embodiment, the second edges 4112 are taken as straight edges, for example, but not limited thereto. The second edge can also be a curved edge as long as the bottom wall enclosed by the first edge and the second edge is a curved surface structure. FIG. 2B is a schematic cross-sectional view of the back plate taken along a plane parallel to the second edge according to an embodiment of the present disclosure, it can be seen from FIG. 2B that the bottom wall extends substantially along a straight line in a direction along the second edge. The first edge and the second edge as mentioned above refer to the edges defined by a part where the bottom wall connected with the connecting portion.

For example, when the display device provided by the embodiment of the present disclosure is a large-size display device, for example, when a size of the display device is greater than 40 inches, the length of the arc-shaped first edge 4111 is longer than that of the linear second edge 4112 to achieve a better display effect.

For example, as shown in FIG. 1A to FIG. 2B, in a technical scheme provided by an embodiment of the present disclosure, an arc-shaped reinforcing rib 500 is disposed on a side of the bottom wall 411 away from the display panel 100, and an extending direction of the arc-shaped reinforcing rib 500 is the same as that of the first edge 4111, and the strength of the arc-shaped reinforcing rib 500 is greater than that of the bottom wall 411 to effectively bind the bottom wall 411, prevent the bottom wall 411 from deforming, and further ensure the curvature of the bottom wall 411. That is, the arc-shaped reinforcing rib 500 is disposed on the side of the bottom wall 411 away from the display panel 100 to prevent the bottom wall 411 from being deformed. For example, a material of the arc-shaped reinforcing rib 500 can be galvanized steel plate with a thickness of 2 mm, and a material of the bottom wall 411 can be aluminum with a thickness of 1.5 mm.

For example, as shown in FIG. 1A to FIG. 2B, the arc-shaped reinforcing rib 500 may be located at the edge of the bottom wall 411 extending in the extending direction of the first edge 4111 to better ensure the curvature of the bottom wall.

Certainly, upon the second edge of the bottom wall being also in an arc shape, the side of the bottom wall away from the display panel can also be provided with an arc-shaped reinforcing rib extending along an extending direction of the second edge to further ensure the curvature of the bottom wall.

For example, the arc-shaped reinforcing rib 500 can be connected with the bottom wall by fasteners, such as screws or bolts.

For example, arc-shaped reinforcing ribs 500 may be provided on both edges of the bottom wall 411 extending in the extending direction of the first edge 4111 on the side away from the display panel 100 to better ensure the curvature of the bottom wall 411.

For example, as shown in FIG. 1A to FIG. 2B, each arc-shaped reinforcing rib 500 may include a central portion 501 and an edge portion 502 fixed to the bottom wall 411, and a certain distance may be set between the central portion 501 and the bottom wall 411, that is, a hollow structure may be set in the central portion 501, so as to ensure strength and curvature while reducing weight.

For example, the hardness of a material selected for the arc-shaped reinforcing rib 500 is greater than that of the back plate to strengthen the back plate strength and prevent the back plate deformation from affecting the curvature accuracy of the display device.

In the embodiment, the arc-shaped reinforcing rib at each edge is taken as a continuous reinforcing rib for description, but not limited thereto. The arc-shaped reinforcing rib at any edge may also include a plurality of separated sub-reinforcing ribs, as long as the reinforcing rib can ensure the curvature of the bottom wall, and the number and shape of the arc-shaped reinforcing ribs are not limited in the embodiment of the present disclosure.

For example, when the display device in the embodiment of the present disclosure is used in occasions such as vehicle-mounted display or commercial display, a plurality of support columns (not shown in the figure) may be provided on a side of the above-mentioned arc-shaped reinforcing rib away from the bottom wall to fix the display device. For example, in the extending direction of the arc-shaped reinforcing rib, a plurality of support columns are arranged at the central portion of the arc-shaped reinforcing rib to fix the curved surface display device on the vehicle.

For example, as shown in FIG. 2A, for example, the connecting portion 412 may be a structure that surrounds the bottom plate 410, and the connecting portion 412 is used to form a light mixing cavity between the light source component 330 and the optical film 310 so as to form a certain light mixing distance between the light source component 330 and the optical film 310. The embodiments of the present disclosure are not limited thereto, for example, it is possible that the connecting portion is only provided at positions where the two first edges of the bottom wall are located, that is, the connecting portion connected with the bottom wall is not provided at the second edge of the bottom wall, and then the first supporting portions only include curved parts corresponding to the two first edges.

For example, as shown in FIG. 1A to FIG. 2B, the connecting portion 412 is located at the edge of the bottom wall 411 and extends from the bottom wall 411 towards the display panel 100. For example, the end of the connecting portion 412 away from the bottom wall 411 is located outside the connecting position between the connecting portion 412 and the bottom wall 411, so as to facilitate the integrated molding of the bottom wall and the connecting portion. Embodiments of the present disclosure are not limited thereto, and the connecting portion may be perpendicular to the second edge of the bottom wall as long as the bottom wall and the first supporting portion can be connected.

For example, as shown in FIG. 1A to FIG. 2B, the bottom plate 410 further includes a first supporting portion 413 extending outward from the edge of the connecting portion 412 away from the bottom wall 411, and the first supporting portion 413 is located on the side of the bottom wall 411 facing the display panel 100.

For example, the first supporting portion 413 may be a continuous annular structure surrounding the display panel to support a second middle frame mentioned later. Of course, it is not limited thereto, and the first supporting portion may also be a discontinuous annular structure as long as it can support the second middle frame.

As shown in FIG. 1A to FIG. 2B, the annular first supporting portion 413 includes a first arc strip portion 4131 corresponding to the first edge 4111, and a bending direction of the first arc strip portion 4131 is the same as that of the first edge 4111. The bottom wall in the embodiment of the disclosure adopts a curved surface structure, and the first edge of the bottom wall is an arc-shaped edge, so that the first supporting portion connected with the first edge of the bottom wall through the connecting portion is formed into the first arc shaped strip portion having an arc shape.

For example, the back plate in the embodiment of the present disclosure can be formed by an integrated die casting or stamping forming process, and the bottom plate of the back plate can be of an integral structure, that is, the bottom wall, the connecting portion and the first supporting portion are of an integral structure, thereby forming the first arc strip portion of the first supporting portion while forming the curved surface bottom wall. For example, the back plate can be formed by stamping process. When the back plate is formed by stamping process, the resilience is large, and an additional structure is needed to ensure the curvature. The back plate can also be made by die-casting molding process (molten iron flows into a designed mold and is cooled and molded) to reduce the resilience rate and dehydration rate of the molded material.

For example, the back plate can be made of aluminum or galvanized steel plate. The material of the back plate can meet the requirements of actual product power consumption for heat dissipation performance. When the display device has special requirements for temperature (for example, when the white light brightness of the display device is 1000 nits, the back plate temperature requirement is not higher than 48° C.), aluminum can be selected as the material of the back plate. When the display device has no special requirements, the galvanized steel plate can be selected as the material of the back plate to reduce the cost. For example, the thickness of the bottom wall may be 1.5 mm, which is not limited by the embodiments of the present disclosure.

For example, as shown in FIG. 1A to FIG. 2B, the first supporting portion 413 has a first supporting surface 4130 facing the display panel 100, and the first supporting surface 4130 is used for supporting the second middle frame 320. For example, the first supporting surface may be a continuous annular surface.

In the specification of the disclosure, the first supporting surface of the first supporting portion refers to a plane on a side of the first supporting portion facing the second middle frame to support the second middle frame. The first supporting surface is defined as such a plane in order to better explain the positional relationship between other components and the first supporting surface, but it does not mean that the surface of the first supporting portion must be a plane. For example, in the case where the surface of the first supporting portion has protrusion structures, the first supporting surface as a plane may be a plane located at the bottom of these protrusion structures or a plane passing through a point on the surface of the first supporting portion.

In a direction perpendicular to the first supporting surface, a direction from an opposite side of the first supporting surface of the first supporting portion to the first supporting surface is called "upper" direction, and a direction from the first supporting surface to an opposite side of the first supporting surface of the first supporting portion is called "lower" direction. Therefore, various positional relationships modified by "upper" and "lower" or "top" and "bottom" have clear meanings. Such as an upper surface, a lower surface, a top wall and a bottom wall. In addition, in a direction parallel to the first supporting surface, a direction from a center of the bottom wall to an edge is called the "outer" direction, and a direction from the edge of the bottom wall to the center is called the "inner" direction. Therefore, the relative position relationship modified by "inner" and "outer" has a clear meaning. For example, "inner side" and "outer side". In addition, it should be noted that the above terms representing orientation are only exemplary and represent the relative position relationship of various components, and the combination of parts in various devices or equipment of the present disclosure or the whole device or equipment can rotate at a certain angle as a whole.

For example, as shown in FIG. 1A to FIG. 2B, the side plate 420 of the back plate 400 extends from the outer edge of the first supporting portion 413 toward the display panel 100. For example, the side plate 420 may be an annular structure that surrounds the display panel 100.

Figure 2C:
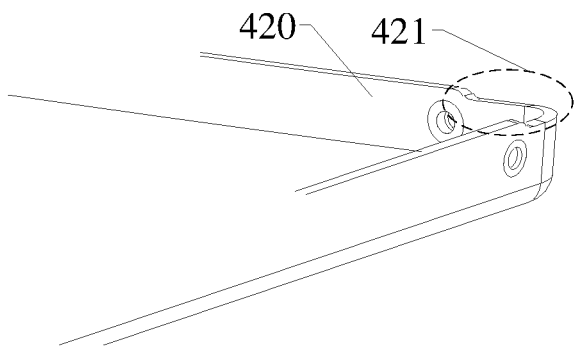
FIG. 2C is an enlarged schematic diagram at a position B in FIG. 2A.

For example, FIG. 2C is an enlarged view at a position B in FIG. 2A. As shown in FIG. 1A to FIG. 2C, four sides of the display panel 100 are connected with one another to form four corners. The side plate 420 is provided with a groove 421 at the position surrounding at least one of the four corners of the display panel 100 and facing the display panel 100.

For example, the bottom plate 410 and the side plates 420 in the back plate 400 may be of an integral structure, and for example, the back plate may be formed by a die-casting or stamping process. In the embodiment of the disclosure, a groove is provided at one or more of the four corners of the side plate, which can prevent extruded material from stacking at the corner position of the side plate and forming a protrusion when the back plate adopts a stamping process to form a curved surface structure, thereby ensuring the curvature of the first middle frame and the front frame of the back plate at the side of the side plate away from the bottom wall, and further ensuring the curvature accuracy of the display device.

Figure 3A:
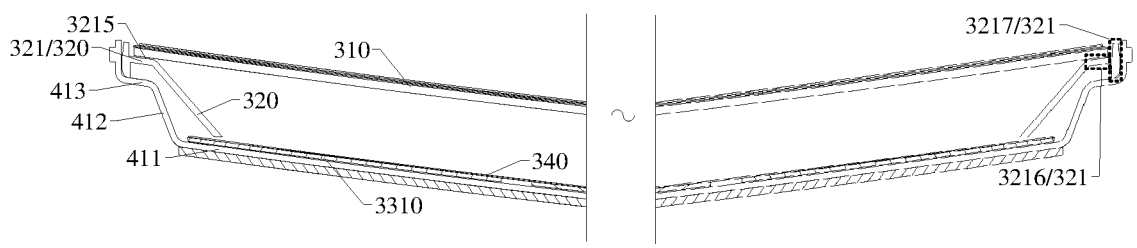
FIG. 3A is a first cross-sectional view of an assembly structural of a back plate and a backlight assembly shown in FIG. 1A.
Figure 3B:
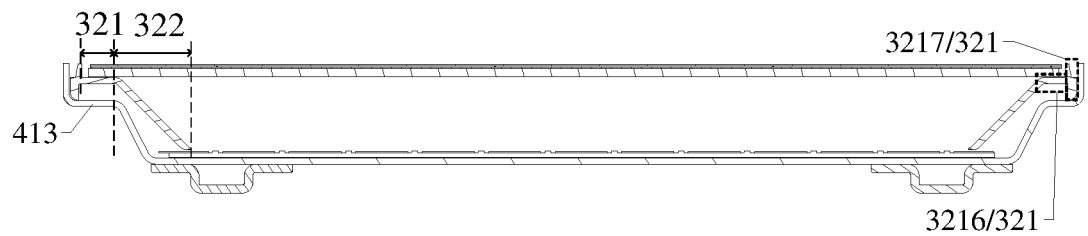
FIG. 3B is a second cross-sectional view of the assembly structure of a back plate and a backlight assembly shown in FIG. 1A.

For example, FIG. 3A is a first cross-sectional view of the structure of the back plate and backlight assembly, and FIG. 3B is a second cross-sectional view of the structure of the back plate and backlight assembly. As shown in FIG. 3A and FIG. 3B, the backlight assembly 300 includes a light source component 330, a reflective sheet 340, a second middle frame 320, and an optical film 310.

For example, as shown in FIG. 1A to FIG. 3B, the second middle frame 320 includes a second supporting portion 321 disposed on the first supporting surface 4130 of the first supporting portion 413. The second supporting portion 321 is configured to support the optical film 310, that is, the second supporting portion 321 has a second supporting surface 3215 facing the display panel 100 for supporting the optical film 310.

For example, as shown in FIG. 3A and FIG. 3B, the second supporting portion 321 includes a first part 3216 for supporting the optical film and a second part 3217 in contact with the first supporting portion 413 of the bottom plate. A side of the first part 3216 of the second supporting portion 321 facing the optical film is provided with the second supporting surface 3215, and the second part 3217 of the second supporting portion 321 extends in a direction substantially perpendicular to the second supporting surface 3215 and contacts with the first supporting portion 413. The first supporting portion 413 supports the second middle frame 320 by supporting the second part 3217 of the second supporting portion 321.

For example, the first supporting surface 4130 of the first supporting portion 413 of the bottom plate 410 is fixedly connected with the second supporting portion 321 of the second middle frame 320, that is, the second supporting portion 321 of the second middle frame 320 is fixed on the first supporting portion 413 of the bottom plate 410. For example, the first part 3216 of the second supporting portion 321 is fixed on the first supporting portion 413 of the bottom plate 410.

Figure 3C:
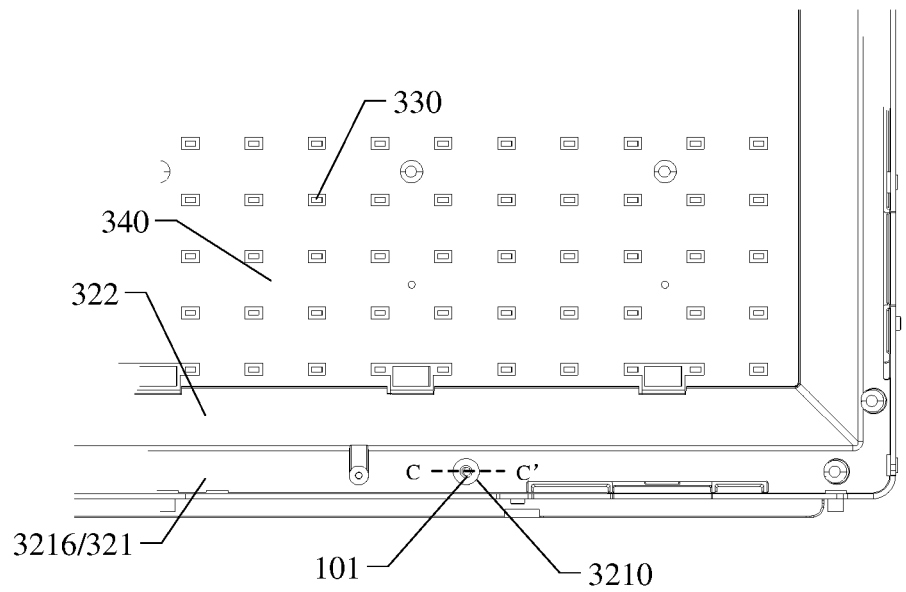
FIG. 3C is an enlarged plan view of a connection between a second middle frame and a first supporting portion in an example of an embodiment of the present disclosure.
Figure 3D:
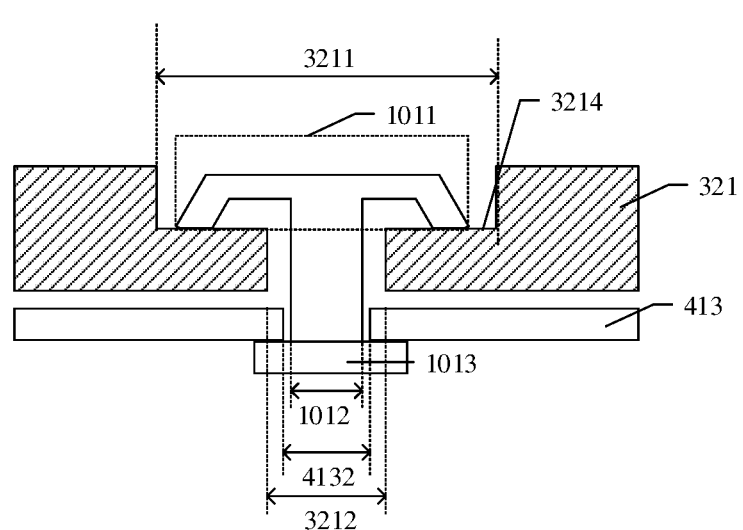
FIG. 3D is a schematic cross-sectional view taken along a line CC' shown in FIG. 3C.

For example, FIG. 3C is an enlarged schematic plan view of the connection between the second middle frame and the first supporting portion in the embodiment of the present disclosure, and FIG. 3D is a schematic cross-sectional view taken along the line CC' shown in FIG. 3C. As shown in FIG. 1A to FIG. 3D, the second supporting portion 321 of the second middle frame 320 (for example, the first part 3216 of the second supporting portion 321) is fixedly connected with the first supporting portion 413 through a first fixing member 101, and the first fixing member 101 extends in a direction perpendicular to the first supporting surface 4130 so that the first supporting portion 431 is fixedly connected with the second middle frame 320 in a direction perpendicular to the first supporting surface 4130. The connection of the second middle frame 320 to the bottom plate 410 of the back plate 400 in the embodiment of the present disclosure may include that the second middle frame is fixedly connected with the bottom plate along the direction perpendicular to the first supporting surface. In the embodiment of the disclosure, the second middle frame and the back plate are fixed in the direction perpendicular to the first supporting surface, so that the second middle frame and the back plate can be accurately positioned in the direction perpendicular to the first supporting surface, and the assembly tolerance can be minimized. In addition, a manner that the second middle frame and the back plate are fixed along the direction perpendicular to the first supporting surface can not only prevent the curvature of the second middle frame from being influenced by the first fixing member, but also make the second middle frame and the back plate have a better fixed connection effect, so that the second middle frame can match the curvature of the back plate, thus better ensuring the curvature of the second supporting portion.

For example, the first fixing member 101 may be a nylon rivet, a screw or the like, which is not limited in the embodiment of the present disclosure.

For example, as shown in FIG. 1A to FIG. 3D, the second supporting portion 321 includes a first fixing hole 3210 penetrating the second supporting portion 321 in a direction perpendicular to the first supporting surface 4130, and the first supporting portion 413 of the bottom plate 410 includes a second fixing hole 4132 opposite to the first fixing hole 3210. The first fixing member 101 is located in the first fixing hole 3210 and the second fixing hole 4132. The first fixing member 101 fixedly connects the second middle frame 320 with the first supporting portion 413 of the bottom plate 410 through the first fixing hole 3210 of the second supporting portion 321 and the second fixing hole 4132 of the first supporting portion 413, and a fixing direction between the second middle frame 320 and the bottom plate 410 is perpendicular to the first supporting surface. The above-mentioned second fixing hole may be a through hole, and at this time, the first fixing member may be a nylon rivet or a screw, for example, the nylon rivet material is not easy to rust, is not affected by the humidity of an external environment of the display device, and does not generate abnormal noise when the display device is in a vibration environment. The second fixing hole as mentioned above may also be a blind hole, and in this case, the first fixing member may be a screw.

For example, as shown in FIG. 1A to FIG. 3D, the first fixing hole 3210 includes a first sub fixing hole 3211 and a second sub fixing hole 3212, and the first sub fixing hole 3211 is located at a side of the second sub fixing hole 3212 close to the display panel 100. In the direction parallel to the first supporting surface 4130, the smallest size of the first sub fixing hole 3211 is greater than the largest size of the second sub fixing hole 3212 to form a step at a connection position of the first sub fixing hole 3211 and the second sub fixing hole 3212, a side of the step has a fixing surface 3214 facing the display panel side and parallel to the first supporting surface, and the first fixing member 101 is disposed in the first fixing hole to fix the second middle frame and the bottom plate.

For example, the first fixing member 101 may include a first sub fixing member 1011 and a second sub fixing member 1012 connected to each other, and a third sub fixing member 1013 located at a side of the second sub fixing member 1012 away from the first sub fixing member 1011. For example, the first sub fixing member 1011 and the second sub fixing member 1012 may be an integral structure, and the third sub fixing member 1013 is movably connected with the second sub fixing member 1012. For example, the first sub fixing member 1011 is located in the first sub fixing hole 3211, the second sub fixing member 1012 is located in the second sub fixing hole 3212 and the second fixing hole 4132 of the first supporting portion 413, and the third sub fixing member 1013 is located on a side of the first supporting portion 413 away from the second supporting portion 321 to connect the third sub fixing member 1013 and the second sub fixing member 1012 to fix the second middle frame and the bottom plate.

For example, a size of the first sub fixing member 1011 in the direction perpendicular to the first supporting surface is not greater than a depth of the first sub fixing hole 3211, so as to ensure the flatness of a part of the surface of the second supporting portion for supporting the optical film.

For example, in the direction parallel to the first supporting surface 4130, the smallest size of the first sub fixing member 1011 is greater than the largest size of the second sub fixing member 1012 and the largest size of the second sub fixing hole 3212, and the maximum size of the first sub fixing member 1011 is less than the smallest size of the first sub fixing hole 3211, and when the second sub fixing member 1012 is disposed in the second sub fixing hole 3212, the first sub fixing member 1011 can be pressed on the fixing surface 3214 (i.e., the first sub fixing member contacts the fixing surface) to fix the second middle frame 320 on the bottom plate 410 in the direction perpendicular to the first supporting surface 4130.

For example, the first fixing hole and the through hole can be round holes, and the size of the first fixing hole is greater than that of the first fixing member in a direction parallel to a diameter of the round hole. For example, the diameter of the second sub fixing hole 3212 may be 3.78 mm, the diameter of the second sub fixing member 1012 may be 3.0 mm, and the diameter of the second fixing hole 4132 may be 3.1 mm. Of course, embodiments of the present disclosure are not limited thereto.

Figure 3E:
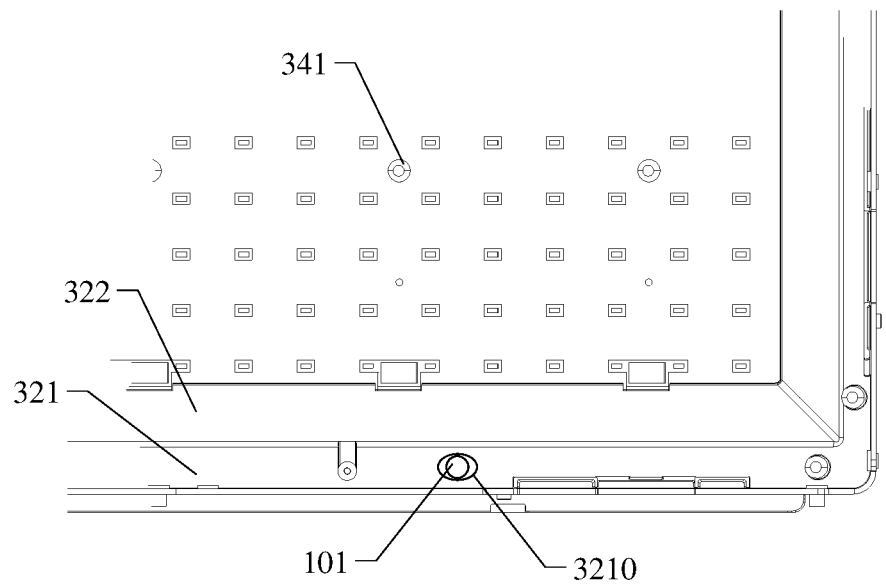
FIG. 3E is an enlarged plan view of a connection between a second middle frame and a first supporting portion in another example of an embodiment of the present disclosure.

FIG. 3E is an enlarged plan view of the connection between the second middle frame and the first supporting portion provided by another example of the embodiment of the present disclosure. As shown in FIG. 3E, the first fixing hole 3210 may be an elliptical hole, and a major axis direction of the elliptical hole is in the extending direction of the first edge of the bottom wall, as long as the major axis size of the first fixing hole 3210 is greater than that of the first fixing member 101.

For example, the first fixing hole 3210 in the example may also include a first sub fixing hole (not shown in the figure) and a second sub fixing hole (not shown in the figure), and the first sub fixing hole is located on a side of the second sub fixing hole close to the display panel. In a direction parallel to the first supporting surface 4130, the minimum size of the first sub fixing hole is greater than the maximum size of the second sub fixing hole to form a step at a connection position of the first sub fixing hole and the second sub fixing hole, a side of the step has a fixing surface facing the display panel and parallel to the first supporting surface, and the first fixing member is disposed in the first fixing hole to fix the second middle frame and the bottom plate.

For example, the first fixing member 101 may also include a first sub fixing member (not shown in the figure) and a second sub fixing member (not shown in the figure) connected with each other, and a third sub fixing member (not shown in the figure) located on a side of the second sub fixing member away from the first sub fixing member. For example, the first sub fixing member and the second sub fixing member may be an integral structure. For example, the first sub fixing member is located in the first sub fixing hole, the second sub fixing member is located in the second sub fixing hole and the second fixing hole of the first supporting portion, and the third sub fixing member is located at a side of the first supporting portion away from the second supporting portion to connect the third sub fixing member with the second sub fixing member to fix the second middle frame and the bottom plate.

For example, in the direction parallel to the first supporting surface 4130, the smallest size of the first sub fixing member 1011 is greater than the largest size of the second sub fixing member 1012 and the largest size of the second sub fixing hole 3212, and the maximum size of the first sub fixing member 1011 is less than the smallest size of the first sub fixing hole 3211, and when the second sub fixing member 1012 is disposed in the second sub fixing hole 3212, the first sub fixing member 1011 can be pressed on the fixing surface 3214 (i.e., the first sub fixing member contacts the fixing surface) to fix the second middle frame 320 on the bottom plate 410 in the direction perpendicular to the first supporting surface 4130.

For example, the first sub fixing hole may be an elliptical hole, and in the major axis direction of the elliptical hole, a size of the first sub fixing member is smaller than that of the first sub fixing hole. In a minor axis direction of the elliptical hole, a size of the first sub fixing member is approximately equal to a size of the first sub fixing hole. The second sub fixing hole can be a round hole or an elliptical hole. Upon the second sub fixing hole being an elliptical hole, in the major axis direction of the elliptical hole, a size of the second sub fixing member is smaller than that of the second sub fixing hole; in the minor axis direction of the elliptical hole, a size of the second sub fixing member is approximately equal to a size of the second sub fixing hole.

Because the smallest size of the first sub fixing hole 3211 is greater than the largest size of the first sub fixing member 1011 and a size of the second sub fixing hole 3212 is greater than that of the second sub fixing member 1012 in the direction parallel to the first supporting surface, that is, the size of the first fixing hole is greater than the size of the first fixing member in the direction parallel to the first supporting surface, there is a gap between an inner side of the first fixing hole 3210 and an outer side of the first fixing member 101 in the direction parallel to the first supporting surface 4130, the first fixing member 101 is not contact with the inner side of the first fixing hole 3210. Therefore, upon the second middle frame being deformed in the process of expansion with heat and contraction with cold, the gap as mentioned above provides a space for expansion and contraction of the second middle frame, so as to avoid local bulging and other defects of the second supporting portion. While the second sub fixing member 1012 penetrates through the second sub fixing hole 3212 and the second fixing hole in the first supporting portion 413, the second middle frame and the bottom plate can be fixedly connected in a direction perpendicular to the first supporting surface by the way of the snap connection between the second sub fixing member 1012 and the third sub fixing member in combination with the way of pressing the first sub fixing member 1011 on the fixing surface.

Figure 3F:
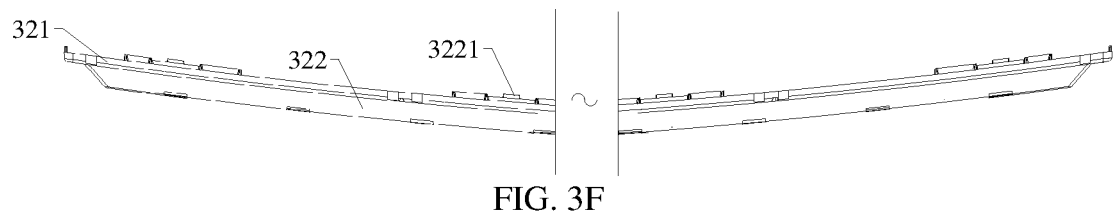
FIG. 3F is a side structural diagram of a second middle frame shown in FIG. 3A.

For example, FIG. 3F is a schematic side structure diagram of the second middle frame shown in FIG. 3A. As shown in FIG. 1A to FIG. 3F, a shape of a part of the second supporting portion 321 fixedly connected with the first arc strip portion 4131 is arc-shaped. The partially arc-shaped supporting portion is fixedly connected with the first arc strip portion 4131 through the first fixing member 101 extending in the direction perpendicular to the first supporting surface 4130, and in an extending direction of the arc-shaped supporting portion, a size of the first fixing member 101 is smaller than that of the first sub fixing hole so that the first fixing member 101 can move in the first fixing hole 3210 in a direction parallel to the first supporting surface 4130 relative to the second middle frame 320.

The embodiment of the present disclosure adopts the second middle frame to support the optical film, and fixedly connects the second middle frame with the bottom plate of the back plate instead of fixedly connecting the second middle frame with the side plate of the back plate. Therefore, upon an arc-shaped supporting portion of the second supporting portion is deformed by expansion with heat and contraction with cold, a distance reserved between the first sub fixing hole and the first fixing portion can prevent deformation such as a protrusion on a side of the arc-shaped supporting portion around the first fixing portion facing the display panel, which seriously affects the curvature of the second middle frame and affects the optical film. In addition, in the embodiment of the disclosure, the first fixing hole in the second middle frame is only a through hole penetrated by the first fixing member, rather than a threaded hole used for being engaged with the first fixing member (taking the first fixing member as a screw as an example), so even if the expansion and contraction displacement generated by the arc-shaped supporting portion around the first fixing member is large, the obstruction of the first fixing member may cause large deformation of the fixing hole, and there will be no failure of the fixing hole. Therefore, the bottom plate and the second middle frame are fixedly connected by adopting the first fixing member extending along the direction perpendicular to the first supporting surface, so that the first fixing member can be prevented from influencing the curvature of the second supporting portion, and the curvature of the second supporting portion can be better ensured.

In an embodiment of the present disclosure, the bottom wall may be used to maintain a predetermined curvature of the arc-shaped part in the second supporting portion.

For example, upon the second edge of the bottom wall being a straight edge, a strip-shaped part in the annular first supporting portion corresponding to the second edge is also non-arc-shaped, and the second supporting portion disposed on the strip-shaped part is also non-arc-shaped.

For example, before connecting the second middle frame with the back plate, the second middle frame does not have a large curvature. Upon the second middle frame being connected with the first supporting portion through the first fixing member, the second supporting portion of the second middle frame bends according to the shape corresponding to the curvature of the first supporting portion.

For example, as shown in FIG. 1A to FIG. 3F, the second middle frame 320 further includes an extension portion 322 connected with the second supporting portion 321, and the extension portion 322 extends toward the bottom wall 411, and the end of the extension portion 322 away from the second supporting portion 321 presses against the periphery of the reflective sheet 340. In the embodiment of the present disclosure, while the second supporting portion included in the second middle frame is fixedly connected with the first supporting portion, the extension portion included in the second middle frame is pressed against the reflective sheet arranged on the bottom wall to further fix the second middle frame, prevent the second supporting portion from overturning and ensure the stability of the second middle frame.

It should be noted that the above-mentioned extension portion presses against the reflective sheet, which means that the extension portion is in contact with the reflective sheet, so that the bottom wall can support the extension portion, while the extension portion can fix the reflective sheet and prevent the periphery of the reflective sheet from wrapping. FIG. 1A to FIG. 3F schematically show that the end of the extension portion away from the second supporting portion is pressed against the reflective sheet, and the extension portion in the actual product is in contact with the surface of the reflective sheet.

For example, as shown in FIG. 1A to FIG. 3F, an edge of the extension portion 322 connected with the second supporting portion 321 is located at the outer side of the edge of the extension portion 322 pressing against the reflective sheet 340, and the edge of the extension portion 322 connected with the second supporting portion 321 is located at a side of the end of the extension portion 322 pressing against the reflective sheet 340 close to the display panel 100, so that an inner surface of the extension portion 322 is formed as an inclined surface, and the inclined surface acts as a reflective surface, for example, reflectivity of the inclined surface is not less than reflectivity of the reflective sheet, so as to improve the utilization rate of the light emitted by the light source component 330 and improve luminous efficiency. In the embodiment of the present disclosure, the second middle frame is configured to support the optical film, and at the same time, and to press the reflective sheet to form a light mixing space between the light source component and the optical film.

For example, the material of the reflective sheet 340 has flexible characteristics, and the reflective sheet 340 can form to be a curved reflective sheet with a certain curvature by being arranged on the curved surface bottom wall 411.

For example, the second middle frame 320 is made of a material with certain hardness and flexibility. For example, the material of the second middle frame 320 may be polycarbonate (PC) mixed with 10% glass fiber, so as to ensure that the second middle frame has a predetermined hardness.

Figure 4A:
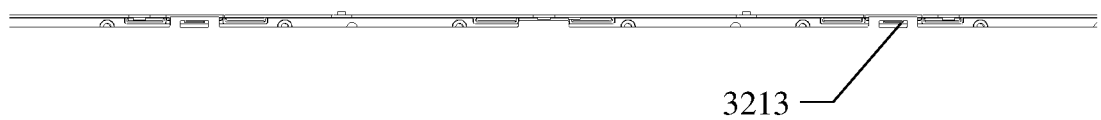
FIG. 4A is a schematic diagram of a partial planar structure after a second middle frame and an optical film shown in FIG. 3A are assembled.
Figure 4B:
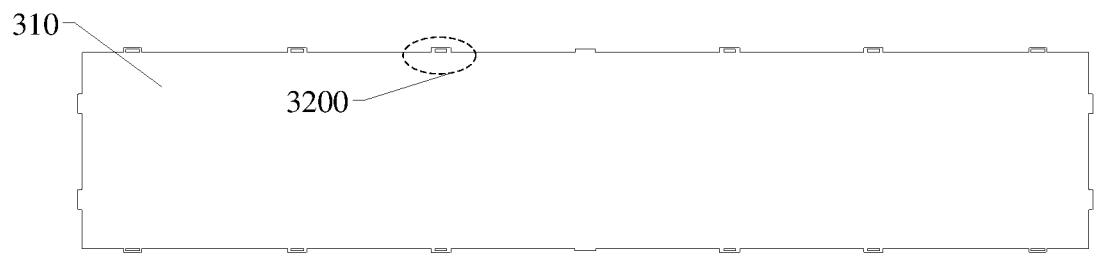
FIG. 4B is a schematic plan view of the optical film shown in FIG. 4A.

For example, FIG. 4A is a schematic diagram of a partial planar structure after a second middle frame and an optical film shown in FIG. 3A are assembled, and FIG. 4B is a schematic plan view of the optical film shown in FIG. 4A. As shown in FIG. 1A to FIG. 4B, a side of the second supporting portion 321 of the second middle frame 320 facing the display panel is provided with a plurality of protrusions 3213, and an edge of at least one of films in the optical film 310 except a diffuser plate (for example, a first diffuser sheet and a second diffuser sheet) includes a plurality of openings 3200. The plurality of openings 3200 correspond to the plurality of protrusions 3213 one by one to set at least one film of the optical film 310 except the diffuser plate on the second middle frame 320, that is, the plurality of openings 3200 are sleeved on the plurality of protrusions 3213 one by one to set at least one film of the optical film 310 except the diffuser plate on the second middle frame 320.

In the technical scheme provided by the embodiment of the present disclosure, the second middle frame is used to support and fix the optical film (for example, the diffuser plate is adhered to the second supporting surface). Because the thermal expansion coefficient between the optical film and the second middle frame is close, upon the two materials being deformed by expansion with heat and contraction with cold, the bonding effect between the edge of the optical film and the second middle frame will not be affected, thus ensuring the curvature of the optical film. In addition, in the embodiment of the disclosure, the second middle frame has a good supporting effect on the optical film, and the arrangement of the supporting pillars can be omitted, so that when the curved surface display device is applied to vehicles, such as automobiles, the vibration reliability can also be improved.

A vehicle-mounted liquid crystal display module includes an edge-lit backlight source, which includes a structural member and an optical film fixed on the structural member. Two opposite edges of the structural member are provided with grooves having a positioning column therein. An edge of the optical film is provided with a protrusion, which include a round hole matched with the positioning column. A surface of the optical film facing the structural member is provided with double-sided adhesive tape to bond the optical film with the structural member, thus stabilizing the optical film when the vehicle-mounted liquid crystal display module is applied to vehicle-mounted vibration conditions. In the research, the inventors of the application found that a fixing mode of the optical film and the structural member in the above-mentioned vehicle-mounted liquid crystal display module is similar to a fixing mode of an optical film in a general small-size liquid crystal display module, with the difference that the optical film is also adhered with the structural member through double-sided adhesive tape, thus reducing the relative displacement between the optical film and structural member. This limiting mode with double-sided adhesive tape limits the moving space of the optical film. The environment in which the vehicle-mounted liquid crystal display module is located includes a high temperature and high humidity environment besides a vibrating environment. For example, the vehicle-mounted liquid crystal display module may be in a high temperature and high humidity environment with a temperature range of −40 to 95° C. and a relative humidity as high as 90%. In a case where a reliability test of cold, hot and shock is carried out on the optical film, the optical film will expand or contract, and the double-sided adhesive tape arranged between the optical film and the structural member limits the moving space when the optical film expands or contracts, which will cause the optical film to have wrinkles, warpage and other defects, thus affecting the display screen of the display device.

Another embodiment of the present disclosure provides a backlight assembly including a first sub-optical film and a supporting frame. The first sub-optical film includes a plurality of first edge portions; the supporting frame includes a supporting portion having a supporting surface facing the first sub-optical film to support the first sub-optical film, and the supporting portion includes a plurality of rims, at least one of which is configured to support at least one first edge portion. At least one rim of the supporting portion includes a first positioning groove and at least one second positioning groove; at least one first edge portion of the first sub-optical film includes a first positioning portion and at least one second positioning portion, the first positioning portion is in the first positioning groove, and each second positioning portion is in a corresponding second positioning groove. In a normal temperature environment, on each rim and corresponding first edge portion, opposite sides of each second positioning groove in an extending direction of the rim are not in contact with opposite sides of the corresponding second positioning portion in the extending direction of the rim, and a difference between a size of the first positioning groove and a size of the first positioning portion in the extending direction of the rim is a first space, a difference between a size of each second positioning groove and a size of the corresponding second positioning portion in the extending direction of the rim is a second space, and the first space is smaller than the second space. By setting distances between the two positioning portions of the first sub-optical film and the corresponding positioning grooves differently, the combination of accurate positioning and rough positioning can be realized, which can not only ensure the fixing of the optical film and the supporting frame, but also ensure that the optical film is not easy to wrinkle in a high temperature and high humidity environment, and does not affect the normal display. The backlight assembly provided by the embodiment of the present disclosure can be applied to the curved surface display devices shown in FIG. 1 to FIG. 4B, and can also be applied to other display devices, which is not limited by the embodiment of the present disclosure.

For example, the supporting frame in the above embodiments may be the second middle frame 320 shown in FIG. 1 to FIG. 4B, and the supporting portion in the above embodiments may be the second supporting portion shown in FIG. 1 to FIG. 4B, but not limited thereto. The supporting frame in the above embodiments may also be different from the second middle frame shown in FIG. 1 to FIG. 4B, and the supporting portion in the above embodiments may also be different from the second supporting portion shown in FIG. 1 to FIG. 4B. For example, the first sub-optical film in the above embodiment may be a part of the optical film 310 shown in FIG. 1 to FIG. 4B, but is not limited thereto, and may also be different from the optical film shown in FIG. 1 to FIG. 4B.

Figure 4C:
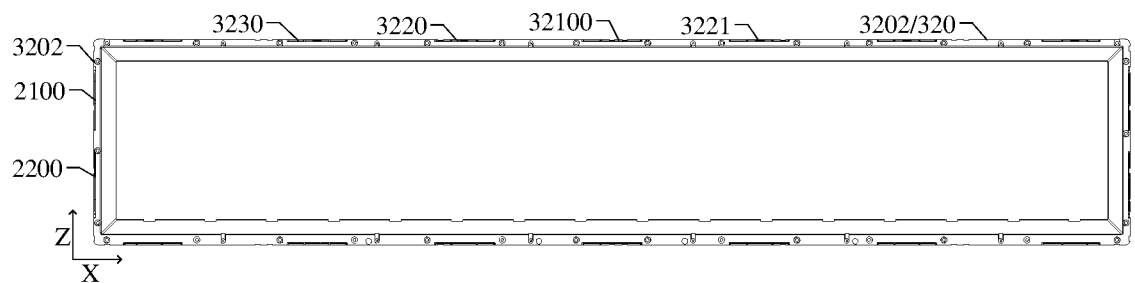
FIG. 4C is a schematic plan view of a second middle frame provided by another embodiment of the present disclosure.
Figure 4D:
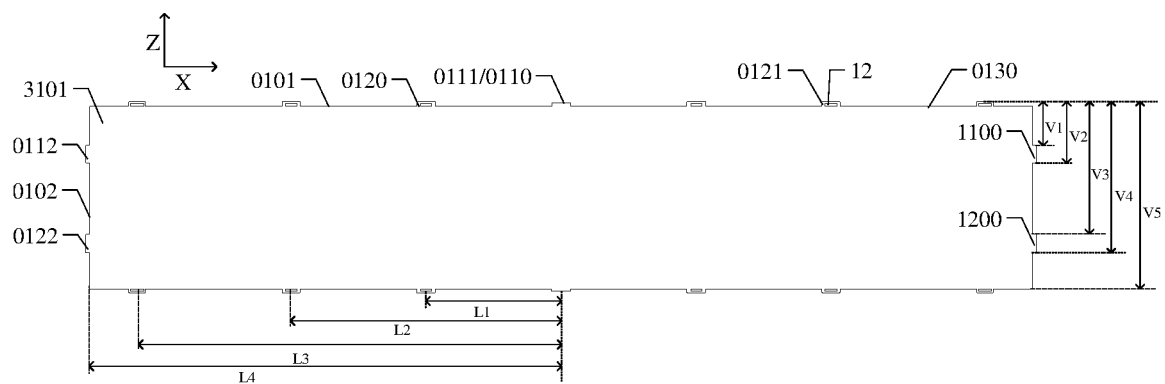
FIG. 4D is a schematic plan view of the first sub-optical film disposed on the second middle frame shown in FIG. 4C.
Figure 4E:
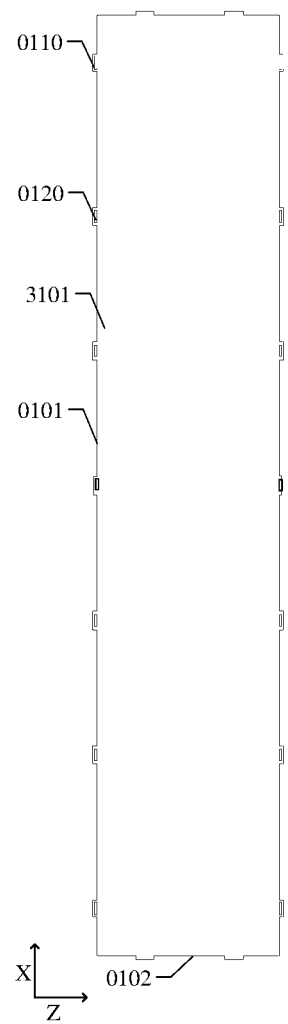
FIG. 4E is a schematic plan view of the first sub-optical film provided by another example of the embodiment of the present disclosure.
Figure 4F:
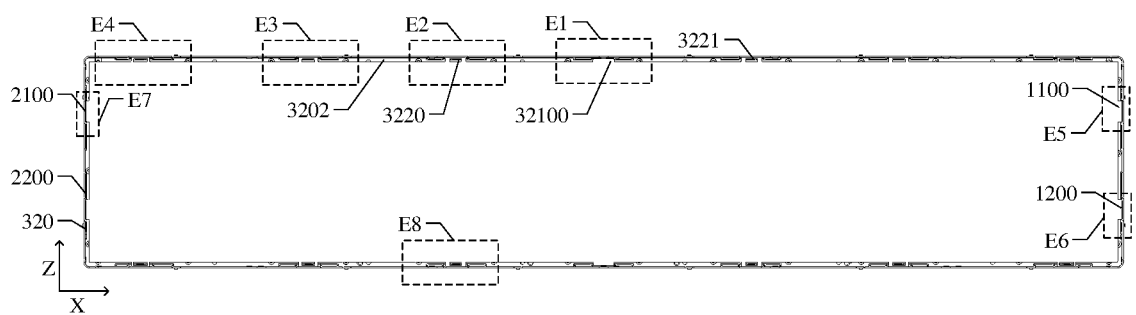
FIG. 4F is a schematic diagram of a planar structure in which the first sub-optical film and the second middle frame are matched.
Figure 4G:
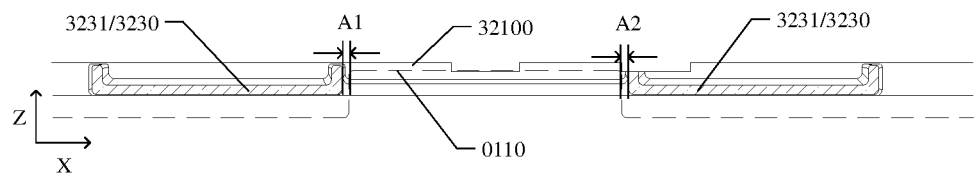
FIG. 4G is a partial enlarged view of E1 region of the backlight assembly shown in FIG. 4F.
Figure 4H:
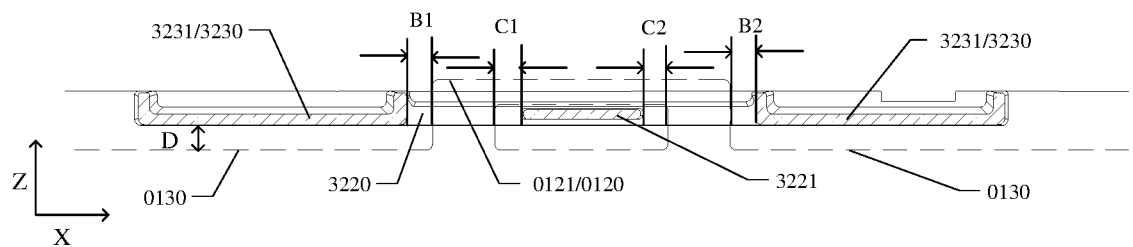
FIG. 4H is a partial enlarged view of E2 region of the backlight assembly shown in FIG. 4F.
Figure 4I:
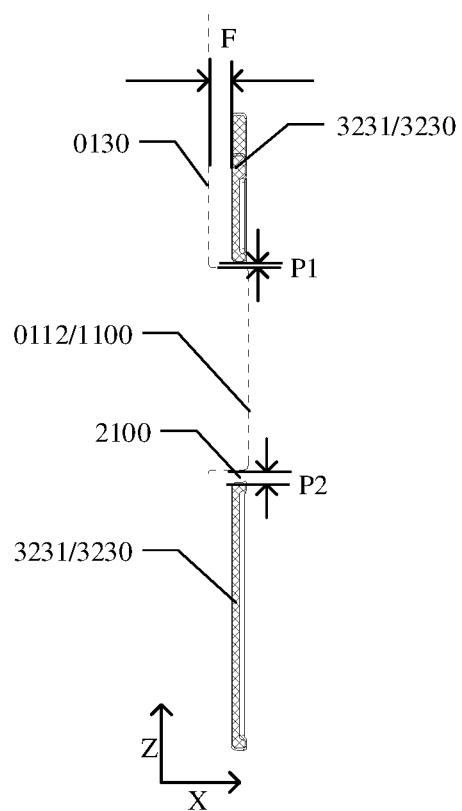
FIG. 4I is a partial enlarged view of E5 region of the backlight assembly shown in FIG. 4F.
Figure 4J:
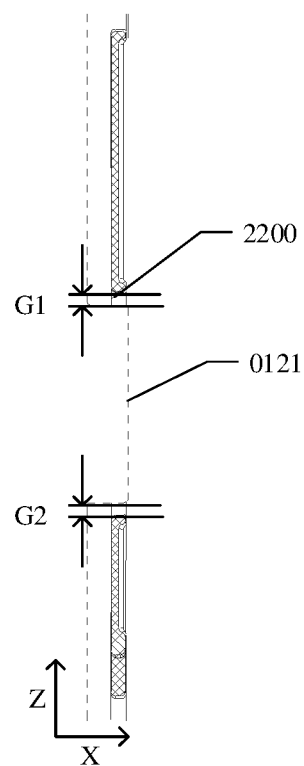
FIG. 4J is a partial enlarged view of E6 region of the backlight assembly shown in FIG. 4F.
Figure 4K:
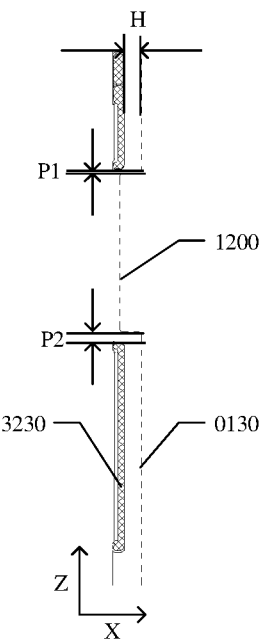
FIG. 4K is a partial enlarged view of E7 region of the backlight assembly shown in FIG. 4F.
Figure 4L:
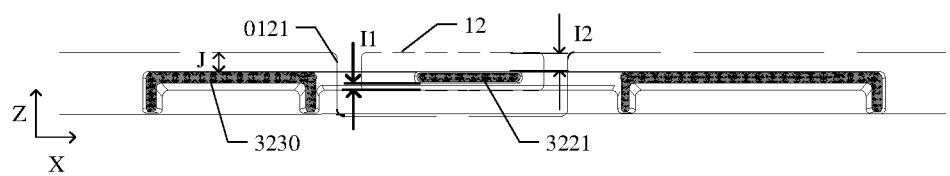
FIG. 4L is a partial enlarged view of E8 region of the backlight assembly shown in FIG. 4F.
Figure 4M:
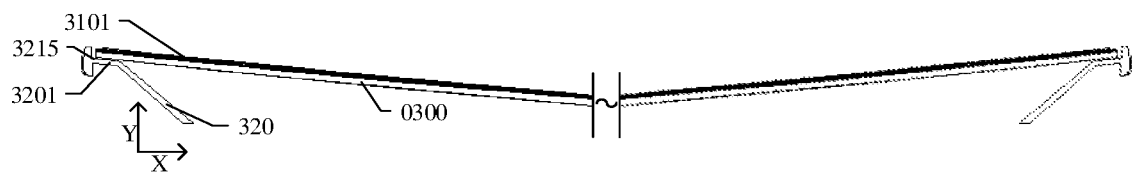
FIG. 4M is a schematic diagram of a partial cross-sectional structure of a backlight assembly provided by an embodiment of the present disclosure.

Another embodiment of the present disclosure provides a backlight assembly, as shown in FIG. 4M, which includes an optical film 3101 and a supporting frame 320. The optical film includes a plurality of edge portions; the supporting frame includes a supporting portion having a supporting surface facing the optical film to support the optical film, and the supporting portion includes a plurality of rims, at least one of which is configured to support at least one edge portion. At least one rim includes a first positioning groove and at least one second positioning groove, at least one edge portion includes a first positioning portion and at least one second positioning portion, the first positioning portion is located in the first positioning groove and each second positioning portion is located in the corresponding second positioning groove. In a normal temperature environment, on each rim and the corresponding edge portion, opposite sides of each second positioning groove in an extending direction of the rim are not in contact with opposite sides of the corresponding second positioning portion in the extending direction of the rim, a difference between a size of the first positioning groove and a size of the first positioning portion in the extending direction of the rim is a first space, a difference between a size of each second positioning groove and a size of the corresponding second positioning portion in the extending direction of the rim is a second space, and the first space is smaller than the second space. In this embodiment, the optical film may refer to the first sub-optical film, the supporting frame may refer to the second middle frame, and the edge portion may refer to the first edge portion.

For example, FIG. 4C is a schematic plan view of a second middle frame provided by another embodiment of the present disclosure, FIG. 4D is a schematic plan view of a first sub-optical film disposed on the second middle frame shown in FIG. 4C, and FIG. 4F is a schematic diagram of a planar structure in which the first sub-optical film and the second middle frame are matched. FIG. 4G is a partial enlarged view of E1 region of the backlight assembly shown in FIG. 4F, and FIG. 4H is a partial enlarged view of E2 region of the backlight assembly shown in FIG. 4F. For example, the backlight assembly in the embodiment of the present disclosure includes a first sub-optical film 3101 and a second middle frame 320. Here, the second middle frame 320 is a supporting frame which plays a role of supporting, and can also be called a supporting frame. The second middle frame 320 includes a second supporting portion having a second supporting surface facing the first sub-optical film 3101 to support the first sub-optical film 3101. As shown in FIG. 4C to FIG. 4H, the second supporting portion 321 includes a plurality of rims 3202, and the first sub-optical film 3101 includes a plurality of first edge portions. At least one rim 3202 of the second supporting portion 321 includes a first positioning groove 32100 and at least one second positioning groove 3220. At least one first edge portion of the first sub-optical film 3101 includes a first positioning portion 0110 and at least one second positioning portion 0120. The first positioning portion 0110 is located in the first positioning groove 32100, and each second positioning portion 0120 is located in the corresponding second positioning groove 3220 so that the first sub-optical film 3101 is fixed on the second supporting portion. For example, each rim 3202 of the second supporting portion includes a first positioning groove 32100 and at least one second positioning groove 3220, and each first edge portion of the first sub-optical film 3101 includes a first positioning portion 0110 and at least one second positioning portion 0120.

For example, the second middle frame can be a structural member for supporting the display module, which is used for accommodating and supporting the optical film, a light bar (a light plate), a reflective sheet and other elements. For example, the second middle frame may also be one of the structural components only supporting the optical film. For example, the second middle frame can be made of metal or plastic.

In a normal temperature environment, in the second positioning grooves 3220 located on the same rim, there is a gap between two sides of the corresponding second positioning portion which are close to two inner sides of each second positioning groove in the extending direction of the rim. For example, in each rim, there may or may not be a gap between sides of the first positioning groove opposite to each other in the extending direction of the rim and sides of the corresponding positioning portion opposite to each other in the extending direction of the rim. When there is a gap between the sides of the first positioning groove and the first positioning part, the sides of each positioning groove opposite to each other in the extending direction of the rim and the sides of the corresponding positioning portion opposite to each other in the extending direction of the rim are not in contact with each other.

The normal temperature environment in the embodiment of the present disclosure means that the ambient temperature of the backlight assembly is in a range of 0~40° C., such as 10~30° C., such as 25° C. The second supporting portion includes a plurality of rims 3202 connected end to end to form a closed polygon. The embodiment of the present disclosure takes four rims as an example, and the plurality of rims 3202 form a rectangle, but is not limited thereto. The number of the rims can also be three or more, and the embodiment of the present disclosure is not limited thereto.

For example, as shown in FIG. 4C to FIG. 4H, the embodiment of the present disclosure takes the backlight assembly as a curved surface backlight assembly as an example, in which at least one rim of the first supporting portion is an arc rim, and the projection of one of the arc rims on the XZ plane is a straight line and extends along the X direction. The first positioning groove 32100 located on the rim includes two inner sides opposite to each other in the X direction, and the first positioning portion 0110 is located between the two inner sides, and there are intervals A1 and A2 between the two sides of the first positioning portion 0110 and the two inner sides respectively. The second positioning groove 3220 on the rim also includes two inner sides opposite to each other in the X direction, and the second positioning portion 0120 is located between the two inner sides, and there are intervals B1 and B2 between the two sides of the second positioning portion 0120 and the two inner sides, respectively. In the normal temperature environment, there are two intervals between each positioning portion and the corresponding positioning groove in the X direction, one of which provides an expansion space for the first sub-optical film and the other provides a contraction space for the first sub-optical film. Thus, when the backlight assembly provided by the embodiment of the present disclosure is in a high temperature environment (for example, 50~100° C.) or a low temperature environment (for example, 0~40° C.), there is an enough expansion space or an enough contraction space between the positioning portion of the first sub-optical film and the corresponding positioning groove of the first middle frame, thus preventing the first sub-optical film from being wrinkled due to the obstruction of the first middle frame during expansion or contraction.

For example, in the normal temperature environment, the sizes of the two intervals reserved between each positioning portion and the corresponding positioning groove can be the same or different, and the size relationship between the two intervals can be determined according to the expansion and contraction amount of the first sub-optical film in a high temperature environment or a low temperature environment. For example, in a case where the backlight assembly provided by the embodiment of the disclosure is applied to a vehicle-mounted display device, the temperature range of the vehicle-mounted environment can be −40~95° C. Taking the temperature of the normal temperature environment of 25° C. as an example, a low temperature difference between the lowest temperature and the normal temperature is 65° C., and a high temperature difference between the highest temperature and the normal temperature is 70° C. At this time, a width of the interval providing the expansion space for the first sub-optical film is greater than a width of the interval providing the contraction space for the first sub-optical film. For example, the width of the interval providing the expansion space for the first sub-optical film is 0.1~0.4 microns greater than the width of the interval providing the contraction space for the first sub-optical film. For example, in order to facilitate manufacturing, the width of the interval providing the expansion space for the first sub-optical film may be equal to the width of the interval providing the contraction space for the first sub-optical film.

Upon the backlight assembly provided by the embodiment of the present disclosure being in different temperature environments, the widths of the two intervals between the positioning grooves and the corresponding positioning portions will change to a certain extent. For example, the interval providing the expansion space for the first sub-optical film may change to 0 upon the backlight assembly being in a high temperature environment, or the interval providing the contraction space for the first sub-optical film may change to 0 upon the backlight assembly being in a low temperature environment. Therefore, the widths of the two intervals between each positioning groove and the corresponding positioning portion are based on a case that the backlight assembly is in the normal temperature environment.

As shown in FIG. 4C to FIG. 4H, upon the backlight assembly provided by the embodiment of the present disclosure being in the normal temperature environment, in the first positioning groove 32100 and the second positioning groove 3220 located on the same rim, a sum of sizes of the two intervals between the two opposite sides of the first positioning portion 0110 and two opposite sides of the first positioning groove 32100 in the extending direction of the rim is the first space S1, and a sum of sizes of the two opposite sides of each second positioning portion 0120 and two opposite sides of the corresponding second positioning groove 3220 in the extending direction of the rim is the second space S2. That is, the difference between the sizes of the first positioning groove 32100 and the first positioning portion 0110 in the extending direction of the rim is the first space S1, and the difference between the sizes of each second positioning groove 3220 and the corresponding second positioning portion 0120 in the extending direction of the rim is the second space S2. The first space S1 is smaller than the second space S2.

For example, as shown in FIG. 4F to FIG. 4H, the sum of the sizes of the interval A1 and the interval A2 between the first positioning groove 32100 and the corresponding first positioning portion 0110 in the extending direction of the rim where the first positioning groove 32100 is located is the first space S1; the sum of the sizes of the interval B1 and the interval B2 between the second positioning groove 3220 and the corresponding second positioning portion 0120 in the extending direction of the rim where the second positioning groove 3220 is located is the second space S2, and the first space S1 is smaller than the second space S2. Thus, the first positioning portion 0110 is an accurate positioning portion, and the first positioning groove 32100 is an accurate positioning groove, and the accurate positioning of the first sub-optical film is realized by the cooperation of the accurate positioning portion and the accurate positioning groove. The second positioning portion 0120 is a rough positioning portion, and the second positioning groove 3220 is a rough positioning groove. The rough positioning of the first sub-optical film is realized by the cooperation of the rough positioning portion and the rough positioning groove.

The accurate positioning in the embodiment of the present disclosure refers to only considering the manufacturing tolerance of the accurate positioning portion and the accurate positioning groove, and the manufacturing tolerance is a tolerance that exists reasonably in order to facilitate the installation of the accurate positioning portion into the accurate positioning groove. For example, in actual products, the cutting tolerance range of the accurate positioning portion is in a range of 0.05~0.1 mm, and the manufacturing tolerance range of the accurate positioning groove is in a range of 0.05~0.15 mm. For example, the widths of the interval A1 and the interval A2 between the accurate positioning portion and the accurate positioning groove may both be 0.18 mm, and then the first space S1 may be 0.36 mm. For example, the widths of the interval A1 and the interval A2 may be the widths of the backlight assembly upon it being in the normal temperature environment. In the case where the backlight assembly is in a vehicle-mounted environment and the backlight assembly is no longer in the normal temperature environment, the widths of the interval A1 and the interval A2 may change, but the first space S1 remains basically unchanged.

The accurate positioning in the embodiment of the present disclosure refers to that the manufacturing tolerance and assembly tolerance of the accurate positioning portion and the accurate positioning groove should be considered without considering the deformation size affected by the temperature and humidity, so that the relative displacement of the optical film and the second middle frame can be limited in at least one direction after the accurate positioning portion and the accurate positioning groove are installed and fixed, so that the backlight assembly of a display device can meet the vibration reliability in a certain use scene, such as a vehicle-mounted display device. It should be noted that those skilled in the art know that the existence of accurate positioning does not make the diaphragm completely ideal without relative displacement.

The rough positioning in the embodiment of the present disclosure refers to considering the manufacturing tolerances and assembly tolerances of the rough positioning portion and the rough positioning groove, and the deformation size of materials affected by temperature and humidity, so that the rough positioning portion and the rough positioning groove can have a certain relative displacement in at least one direction after being fixed. In order to realize rough positioning, that is, to allow the rough positioning portion and the rough positioning groove to move relatively in at least one direction, the difference between the size of the rough positioning portion and the size of the rough positioning groove is set to be greater than that between the size of the rough positioning portion and the size of the rough positioning groove. For example, the widths of the interval B1 and the interval B2 between the rough positioning portion and the rough positioning groove can both be 2 mm, and the second space S2 can be 4 mm.

In the embodiment of the present disclosure, the combination of the accurate positioning and the rough positioning is adopted between the first sub-optical film and the second middle frame, which can not only ensure the fixation of the first sub-optical film and the second middle frame, but also ensure that the first sub-optical film is not prone to wrinkle in the high temperature and high humidity environment, and does not affect normal display.

For example, as shown in FIG. 4C to FIG. 4H, the first sub-optical film 3101 includes a plurality of outline edges corresponding to the plurality of rims 3202 of the second supporting portion 321, and the plurality of rims of the second supporting portion 321 support a plurality of first edge portions respectively. The embodiment of the present disclosure takes an example that the first sub-optical film 3101 includes four outline edges surrounding to form the first sub-optical film with a substantially rectangular shape, but is not limited thereto. The number of the outline edges can also be 3 or more, as long as the rims of the second middle frame correspond to the outline edges of the first sub-optical film one by one, which is not limited by the embodiment of the present disclosure.

For example, as shown in FIG. 4C to FIG. 4H, a plurality of outline edges of the first sub-optical film 3101 include a first sub-edge portion 0101 extending along a first direction and a second sub-edge portion 0102 extending along a second direction, and a length of the first sub-edge portion 0101 is greater than that of the second sub-edge portion 0102. The first direction and the second direction in the embodiments of the present disclosure can be interchanged. In the embodiment of the present disclosure, taking the shape of the first sub-optical film as a rectangle as an example, and then the first sub-edge portion is a long side and the second sub-edge portion is a short side.

For example, in a case where the backlight assembly provided by the embodiment of the present disclosure is applied to a display device with a large-size (for example, 20 inches or more), the length of the long side is not less than 400 mm, and the length of the short side is not less than 200 mm In the embodiment of the present disclosure, taking the rim supporting the first sub-edge portion is a curved rim, such as an arc rim as an example, the second supporting surface forms a curved surface, and the backlight assembly is a curved surface backlight assembly. At this time, the rim supporting the second sub-edge portion may be an arc rim or a straight rim. However, the embodiment of the present disclosure is not limited thereto, and the rim supporting the first sub-edge portion can also be a rim extending along a straight line, so that the second supporting surface of the second supporting portion is a plane, and the backlight assembly is a non-curved surface backlight assembly.

The outline edge of the first sub-optical film in the embodiment of the present disclosure may be a straight edge, a curved edge or a broken line edge. For example, as shown in FIG. 4D, upon the outline edge of the first sub-optical film provided by the embodiment of the present disclosure being a broken line edge, one outline edge will have a general extending direction, such as the first direction or the second direction. At least one of the first sub-edge portion extending in the first direction and the second sub-edge portion extending in the second direction in the embodiment of the present disclosure is an arc-shaped edge. For example, in an example of the embodiment of the present disclosure, the first sub-edge portion is an arc-shaped edge and the second sub-edge portion is a straight edge. In a case where the first sub-edge portion is an arc-shaped side, the extending direction of the first sub-edge portion is also an arc-shaped extending direction. At this time, the above-mentioned first space may refer to the sum of the sizes of the two intervals between the two sides of the first positioning portion and the first positioning groove in the arc extending direction. Of course, upon the curvature of the arc side being small, the difference between sizes of the two intervals in the arc extending direction and the size of the two intervals in the X direction is small.

The above-mentioned and later-mentioned "approximately rectangular" means that four sides of the film layer are not standard four straight lines, for example, the four sides of the film layer are four broken-line outline edges, and the quadrilateral formed by the four outline edges is not a rectangle in strict sense, but an approximately rectangle with four broken-line edges.

For example, as shown in FIG. 4C to FIG. 4H, the at least one second positioning portion 0120 includes a plurality of second positioning portions 0120, and the first positioning portion 0110 and the plurality of second positioning portions 0120 are located at the first sub-edge portion 0101. Therefore, the first positioning portion and the second positioning portion respectively realize the accurate positioning and rough positioning of the first sub-edge portion and the corresponding rim.

For example, as shown in FIG. 4C to FIG. 4H, the first positioning portion 0110 located on the first sub-edge portion 0101 is approximately located at the midpoint of the first sub-edge portion 0101, and the plurality of second positioning portions 0120 located on the first sub-edge portion 0101 are distributed on both sides of the first positioning portion 0110. The embodiment of the present disclosure takes the number of the first positioning portions located on the first sub-edge portion of one as an example, but is not limited thereto. In the embodiment of the disclosure, the plurality of second positioning portions located on the long side of the first sub-optical film are a plurality of rough positioning portions, and the accurate positioning portion is roughly disposed at the midpoint of the long side of the first sub-optical film, and the plurality of rough positioning portions are distributed on both sides of the accurate positioning portion, so that the first sub-optical film can expand to the left and right sides (taking the X direction as an example to the right) with the accurate positioning portion as the center in the high temperature environment; or parts of the first sub-optical film located at both sides of the accurate positioning portion shrink towards the middle in the low temperature environment. Therefore, the size change of the long side of the first sub-optical film when expanding or contracting can be minimized.

For example, as shown in FIG. 4C to FIG. 4H, in the first direction, the number of second positioning portions 0120 on both sides of the first positioning portion 0110 is equal, and the plurality of second positioning portions 0120 on both sides of the first positioning portion 0110 are symmetrically distributed with the first positioning portion 0110 as the center. Therefore, it is possible to ensure that the long side of the first sub-optical film expands or contracts symmetrically at the high temperature or the low temperature, so as to facilitate the setting of the relative positional relationship between the first sub-optical film and the second middle frame. In the embodiment shown in FIG. 4D, taking the vertical placement of the first sub-optical film as an example, the direction indicated by the arrow in the Z direction is upward with the ground as a reference. At this time, the first sub-edge portion is horizontally disposed and the second sub-edge portion is vertically disposed.

The embodiment of the present disclosure is not limited thereto. For example, FIG. 4E is a schematic plan view of the first sub-optical film provided by another example of the embodiment of the present disclosure. As shown in FIG. 4E, different from the optical film shown in FIG. 4D, a plurality of second positioning portions 0120 are located on the same side of the first positioning portions 0110 on the first sub-edge portion 0101. In the example shown in FIG. 4E, taking the vertical placement of the first sub-optical film as an example, the direction indicated by the arrow in the X direction is upward with the ground as a reference. At this time, the first sub-edge portion is vertically arranged and the second sub-edge portion is horizontally arranged. It should be noted that the example shown in FIG. 4E differs from the first sub-optical film in the example shown in FIG. 4D only in the distribution positions of the first positioning portion and the second positioning portion, that is, the distribution position relationship between the accurate positioning portion and the rough positioning portion is different, and other features of the first sub-optical film shown in FIG. 4D described later are also included in the first sub-optical film shown in FIG. 4E.

For example, as shown in FIG. 4E, the first positioning portion 0110 is disposed within a range of ⅓ of the length of the first sub-edge portion close to one end (for example, the upper end, the direction indicated by the arrow in the X direction is upward relatively to the ground) of the first sub-edge portion 0101, and at least one second positioning portion 0120 includes a plurality of second positioning portions 0120 disposed between the first positioning portion 0110 and the other end (lower end) of the first sub-edge portion 0101.

For example, in the normal temperature environment, a plurality of second spaces corresponding to the plurality of second positioning portions 0120 gradually increase from the direction close to the first positioning portion 0110 to away from the first positioning portion 0110, so that different and sufficient intervals can be reserved between the positioning portions and the positioning grooves at various positions. Therefore, it can not only ensure that each position of the first sub-optical film will not wrinkle when expanding or contracting due to temperature change in the vehicle-mounted environment, but also prevent waste of space and influence on the fixing of the first sub-optical film and the second middle frame by the accurate design of the size of the space.

For example, as shown in FIG. 4C to FIG. 4H, at least one second positioning groove 3220 includes a plurality of second positioning grooves 3220, which are arranged in one-to-one correspondence with the plurality of second positioning portions 0120 located on the first sub-edge portion 0101, and each second positioning portion 0120 is located in each second positioning groove 3220. In the normal temperature environment, the sum of the sizes of the interval B1 and the interval B2 between each second positioning portion 0120 and the corresponding second positioning groove 3220 in the first direction is the second space S2, and the second spaces S2 corresponding to the second positioning portions 0120 located on the first sub-edge portion 0101 gradually increase in the direction from the midpoint of the first sub-edge portion 0101 to the two end points. In a case where the first sub-edge portion is an arc-shaped side, the above-mentioned second space can refer to the sum of the sizes of two intervals between the two sides of the second positioning portion and the corresponding second positioning grooves in the extending direction of the arc-shaped side.

For example, one of the interval B1 and the interval B2 between each second positioning portion 0120 and the corresponding second positioning groove 3220 is an interval for providing the expansion space for the first sub-optical film 3101 (i.e., an expansion space), and the other is an interval for providing the contraction space for the first sub-optical film 3101 (i.e., a contraction space). This disclosure schematically shows that the second space between each second positioning portion and the corresponding second positioning groove includes the expansion space and the contraction space, but is not limited thereto. The second space between each second positioning portion and the corresponding second positioning groove can also include one of the expansion space and the contraction space, that is, only expansion space or contraction space.

For example, an example of the embodiment of the present disclosure is described by taking the interval B1 as the interval for providing the expansion space for the first sub-optical film 3101, and the interval B2 as the interval for providing the contraction space for the first sub-optical film 3101 as an example. In the embodiment of this disclosure, the temperature range of the vehicle-mounted environment in which the backlight assembly is applied is −40° C.~95° C., and the temperature of the normal temperature environment is 25° C., so the temperature difference of the vehicle-mounted environment in which the backlight assembly is located is 65° C. from the normal temperature to the lowest temperature and 70° C. from the normal temperature to the highest temperature. The value of the expansion design interval B1 of the first sub-optical film 3101 is greater than the expansion required gap1 of the first sub-optical film 3101, and the expansion required gap1 satisfies gap1=$\Delta T1*L*CET1$. In the above relation, $\Delta T1$ represents the high temperature difference of the vehicle-mounted environment where the first sub-optical film 3101 is located, L represents the distance between the midpoint of the second positioning portion 0120 and the midpoint of the first positioning portion 0110, and CET1 represents the thermal expansion coefficient of the first sub-optical film 3101 in the first direction. The expansion required gap1 corresponding to the interval B1 of the second positioning portion 0120 at the E2 region shown in FIG. 4F satisfies gap1=$70*L*CET1$.

The thermal expansion coefficient CET1 of the first sub-optical film 3101 in the first direction is related to the temperature range of the first sub-optical film 3101. For example, the value of the thermal expansion coefficient CET1 of the first sub-optical film 3101 in a temperature range of 75° C.~95° C. is greater than that of the first sub-optical film 3101 in a temperature range of 50° C.~75° C., and the value of thermal expansion coefficient CET1 of the first sub-optical film 3101 in a temperature range of 50° C.~75° C. is greater than that of the first sub-optical film 3101 in a temperature range of 25° C.~50° C.

In addition, the thermal expansion coefficient on the first sub-edge portion (long side) of the first sub-optical film in the embodiment of the present disclosure is smaller than that on the second sub-edge portion (short side), so that the expansion required gap of the first sub-optical film on the first sub-edge portion can be reduced.

For example, for a backlight assembly with high brightness requirements, a polarizer brightness enhancement film can be used; for a backlight assembly with conventional brightness requirements, an ordinary brightness enhancement film and a diffusion film can be used.

For example, the first sub-optical film 3101 may include at least one of a first diffuser sheet, a prism layer and a second diffuser sheet. For example, a material of the first diffuser sheet may include polyethylene terephthalate (PET), polycarbonate, or the like.

The thermal expansion coefficients of single-layer films such as an ordinary brightness enhancement film and a diffuser film can be $3.5*10^{-5}$ cm/(cm*° C.) in the short side direction and $3.0*10^{-5}$ cm/(cm*° C.) in the long side direction. Amount of shrinkage in the short side direction is about 0.5%, and amount of shrinkage in the long side direction is about 0.2%. The above-mentioned single-layer films such as the ordinary brightness enhancement film and the diffusion film have different expansion coefficients in two different stretching directions (for example, TD direction or MD direction), and the expansion coefficient and contraction coefficient in MD direction are small, so the expansion and contraction amount in TD direction is greater than that in MD direction. Generally, when designing a product, the long side is designed in the MD direction, which can minimize the expansion and contraction space of the long side.

The expansion coefficient of single-layer films such as the ordinary brightness enhancement film and the diffuser film is determined by the material (such as polymethyl methacrylate PMMA or polycarbonate PC), the stretching direction of the material (such as TD direction or MD direction) and the temperature range.

The designed interval for contraction B2 of the first sub-optical film 3101 is greater than the contraction required gap2 of the first sub-optical film 3101, and the contraction required gap2 satisfies gap2=$\Delta T2*L*CET1$. $\Delta T2$ in the above relation represents the low temperature difference of the vehicle-mounted environment where the first sub-optical film 3101 is located. Then the contraction required gap2 corresponding to the interval B2 of the second positioning portion 0120 at the E2 region shown in FIG. 4F satisfies gap2=$65*L*CET1$.

The above-mentioned interval B1 (interval B2) is not only related to the expansion required gap1 (contraction required gap2), but also related to the cutting tolerance (DBEF) of the first sub-optical film 3101 and the injection molding tolerance (DMF) of the second middle frame 320. For example, the cutting tolerance of the first sub-optical film 3101 depends on the tolerance zone corresponding to the position size of the interval B1 (interval B2) and the injection molding tolerance of the second middle frame 320 depends on the tolerance zone corresponding to the position size of the interval B1 (interval B2). The tolerance zone refers to an area defined by two straight lines representing the upper deviation and the lower deviation or the maximum limit size and the minimum limit size in the tolerance zone diagram, which can also be called the size tolerance zone.

For example, taking an example that the width of the interval providing the contraction space (the contraction interval) for the first sub-optical film is equal to the width of the interval providing the expansion space (the expansion interval) for the first sub-optical film, the cutting tolerance of the first sub-optical film 3101 at the first positioning portion 0110 is approximately 0.05 mm, the injection molding tolerance of the second middle frame 320 corresponding to the first positioning portion is approximately 0.05 mm, and the expansion required gap1 is approximately 0.07 mm, and then the interval A1 and the interval A2 should be not less than 0.17 mm, for example, the interval A1 and the interval A2 may both be 0.18 mm, and the first space may be 0.36 mm.

For example, a distance between a center of the second positioning portion 0120 in the E2 region and a center of the first positioning portion 0110 is L1, and L1 is approximately 172 mm. At a position of the second positioning portion 0120 in the E2 region, the cutting tolerance of the first sub-optical film 3101 is approximately 0.1 mm, the injection molding tolerance of the second middle frame 320 is approximately 0.15 mm, and the expansion required gap1 is approximately 0.98 mm, and then the interval B1 and the interval B2 should be not less than 1.2 mm, for example, the interval B1 and the interval B2 can be 2 mm, and the second space can be 4 mm.

For example, a distance between a center of the second positioning portion 0120 in the E3 region and the center of the first positioning portion 0110 is L2, and L2 is approximately 343 mm. At the position of the second positioning portion 0120 in the E3 region, the cutting tolerance of the first sub-optical film 3101 is approximately 0.15 mm, the injection molding tolerance of the second middle frame 320 is approximately 0.15 mm, the expansion required gap1 is approximately 1.95 mm, and then the interval for providing the expansion space corresponding to the second positioning portion 0120 in the E3 region should not be less than 2.25 mm, for example, the expansion interval in the E3 region can be 2.5 mm Upon the contraction interval in the E3 region being 2.5 mm, the second space can be 5 mm.

For example, a distance between a center of the second positioning portion 0120 in the E4 region and the center of the first positioning portion 0110 is L3, and L3 is approximately 540 mm. At the position of the second positioning portion 0120 in the E4 region, the cutting tolerance of the first sub-optical film 3101 is approximately 0.15 mm, the injection molding tolerance of the second middle frame 320 is approximately 0.15 mm, the expansion required gap1 is approximately 3.06 mm, and then the interval for providing the expansion space corresponding to the second positioning portion 0120 in the E3 region should be no less than 3.36 mm, for example, 3.4 mm, and the second space can be 6.8 mm.

With the increase of the distances between the second positioning portions and the first positioning portion, the required gaps for providing the expansion space and the contraction space corresponding to the second positioning portions gradually increase. For example, the second space between each second positioning portion and the corresponding second positioning groove includes the expansion space and the contraction space. In the normal temperature environment, in the direction from the midpoint of the first sub-edge portion to the end points at both sides, the expansion spaces corresponding to the second positioning portions gradually increase, and the contraction spaces corresponding to the second positioning portions gradually increase. Therefore, in the embodiment of the disclosure, in the direction from the midpoint of the first sub-edge to the end points at both sides, a plurality of second spaces corresponding to the plurality of second positioning portions on the first sub-edge portion are gradually increased, so that different and sufficient intervals can be reserved between the positioning portions and the positioning grooves at various positions, and furthermore, various positions of the first sub-optical film can be guaranteed not to wrinkle when expanding or contracting due to temperature changes in the vehicle-mounted environment, and space waste can be prevented by the accurate design of the size of the gap, thus preventing the influence on the fixing of the first sub-optical film and the second middle frame.

For example, in an example of the embodiment of the present disclosure, the backlight assembly is a curved surface backlight assembly, and the rim used for supporting the first sub-edge portion (the long side) of the first sub-optical film 3101 in the second supporting portion of the second middle frame 320 is a curved rim, for example, an arc rim, so that the first sub-optical film 3101 is formed into a curved structure. At this time, the extending direction of the first sub-edge portion is a curved extending direction, which is different from the X direction shown in the figure. When applied to the curved surface backlight assembly in the vehicle-mounted environment with temperature ranging from −40° C. to 100° C., humidity up to 90%, and single use time over 1000 hours, different expansion and contraction sizes will occur at different positions of the first sub-optical film. However, the general structure in which the first sub-optical film and the second middle frame are simply fixed by rough positioning and the gap between the first sub-optical film and the second middle frame is fixed at the coarse positioning position cannot guarantee the overall radian uniformity when the first sub-optical film is in a curved state, resulting in the first sub-optical film being prone to wrinkles such as local bulging.

In the embodiment of the present disclosure, in the arc direction of the backlight assembly, the first sub-optical film and the second middle frame adopt a combination of accurate positioning and rough positioning to match with the way that different and sufficient intervals are reserved between the plurality of positioning portions and corresponding positioning grooves, which can not only ensure that the first sub-optical film is in a good fixed state under long-term severe vibration conditions, but also meet the requirements of the expansion space and the contraction space of different positions in the first sub-optical film under long-term high-temperature and high-humidity vehicle-mounted environment.

For example, as shown in FIG. 4C to FIG. 4H, the first positioning portion 0110 on the first sub-edge portion 0101 includes a first protruding portion 0111, and each of the plurality of second positioning portions 0120 on the first sub-edge portion 0101 includes a second protruding portion 0121. In the embodiment of the present disclosure, the outline edges (first sub-edge portions) where the first protruding portion 0111 and the second protruding portion 0121 are located include protruding portions and straight lines (that is, connecting lines 0130) between adjacent protruding portions. Therefore, a plurality of protruding portions and a plurality of connecting lines are connected end to end to form a zigzag outline edge.

For example, as shown in FIG. 4C to FIG. 4H, the middle of the second protruding portion 0121 includes an opening 12, and the first protruding portion 0111 does not include an opening. Each of the plurality of second positioning grooves 3220 includes a boss 3221, and the opening 12 of the second protruding portion 0121 is configured to be sleeved on the boss 3221 to fix the first sub-optical film 3101 and the second middle frame 320.

For example, as shown in FIG. 4C to FIG. 4H, compared with the general way that the first sub-optical film only includes a hanger loop with an opening to fix with a structural member, the embodiment of the present disclosure uses a protruding portion without an opening (e.g., a lug) as an accurate positioning portion and a protruding portion with an opening (e.g., a hanger loop) as a rough positioning portion, which can realize the combination of accurate positioning and rough positioning of the first sub-optical film and fix the first sub-optical film on the second middle frame more stably. In the embodiment of the present disclosure, the protruding portion as the accurate positioning portion can be a solid structure without an opening, so that the structural strength of the accurate positioning portion can be increased.

For example, as shown in FIG. 3F, FIG. 4C to FIG. 4H, in the normal temperature environment, the size of each boss

3221 in the first direction is smaller than that of the corresponding opening 12 in the first direction, so that there is an interval between two sides of each boss and two inner sides of the corresponding opening in the first direction. That is, the opposite sides of each boss in the first direction are not in contact with the opposite sides of the corresponding opening in the first direction.

For example, there are two intervals between the boss 3221 and the opening 12, namely interval C1 and interval C2. When the first sub-edge portion is an arc-shaped side, the size of the interval C1 (or the interval C2) may refer to the size of the interval C1 (or the interval C2) in the extending direction of the arc-shaped side. In the normal temperature environment, one of the two intervals arranged between each boss and the corresponding opening in the first direction provides an expansion space for the first sub-optical film, and the other of the two intervals provides a contraction space for the first sub-optical film. For example, the size of the interval C1 in the first direction may be a contraction space, and the size of the interval C2 in the first direction may be an expansion space. Thus, when the backlight assembly provided by the embodiment of the present disclosure is in a high temperature environment (e.g., 50~100° C.) or a low temperature environment (e.g., 0~40° C.), there is enough expansion interval or contraction interval between the opening of the first sub-optical film and the boss of the second middle frame, thus preventing the first sub-optical film from being wrinkled due to the obstruction of the second middle frame during expansion or contraction.

For example, in the normal temperature environment, the sizes of the two intervals reserved between each boss and the two inner sides of the corresponding opening can be the same or different, and the size relationship between the two intervals can be determined according to the expansion and contraction size of the first sub-optical film in high temperature or low temperature environment. For example, in order to facilitate fabrication, the width of the interval providing expansion space for the first sub-optical film among the above two intervals between each opening and the corresponding boss may be equal to the width of the interval providing contraction space for the first sub-optical film.

As the widths of the two intervals between each opening and the corresponding boss will change to some extent when the backlight assembly provided by the embodiment of the present disclosure is in different temperature environments, for example, the gap providing expansion space for the first sub-optical film may change to 0 when the backlight assembly is in a high temperature environment, or the gap providing contraction space for the first sub-optical film may change to 0 when the backlight assembly is in a low temperature environment. Therefore, the widths of the two intervals between each opening and the corresponding boss are based on the normal temperature environment of the backlight assembly.

For example, as shown in FIG. 4C to FIG. 4H, the sum of the sizes of the interval C1 and the interval C2 between the opening 12 and the sides of the boss 3221 close to each other in the first direction is a third space S3, that is, the difference between the size of the opening and the size of the boss in the first direction is the third space, and the third space S3 is greater than the first space S1. In the direction from the midpoint of the first sub-edge portion 0101 to the end points at both sides, the third spaces corresponding to the second positioning portions gradually increase.

For example, in an example of the embodiment of the present disclosure, the interval C2 is used to provide expansion space for the first sub-optical film 3101, and the interval C1 is used to provide contraction space for the first sub-optical film 3101, so the size of the interval C2 can be the same as that of the interval B1, that is, the calculation relation of the interval C2 is the same as that of the interval B1. The size of the interval C1 may be the same as that of the interval B2, that is, the calculation relation of the interval C1 is the same as that of the interval B2.

For example, the third space S3 may be equal to the second space S2 to facilitate the design of the first sub-optical film.

For example, taking the temperature range of the vehicle-mounted environment in which the backlight assembly provided by the embodiment of the present disclosure is applied as −40° C.~95° C., and the temperature of the normal temperature environment as 25° C., the temperature difference of the vehicle-mounted environment in which the backlight assembly is located is 65° C. from the normal temperature to the lowest temperature, and the temperature difference of the vehicle-mounted environment in which the backlight assembly is located is 70° C. from the normal temperature to the highest temperature. For example, taking a gap of a contraction space for the first sub-optical film being equal to a gap of a expansion space for the first sub-optical film as an example, the interval C1 and the interval C2 should be no less than 1.23 mm at the position of the second positioning portion 0120 in the E2 region, for example, the interval C1 and the interval C2 can be 2 mm, and the third space S3 can be 4 mm.

For example, at the position of the second positioning portion 0120 in the E3 region, the gap corresponding to the second positioning portion 0120 for providing expansion space should be not less than 2.25 mm, for example, 2.5 mm, and the third space can be 5 mm. For example, at the position of the second positioning portion 0120 in the E4 region, the gap corresponding to the second positioning portion 0120 for providing expansion space should be not less than 3.36 mm, for example, 3.4 mm, and the third space can be 6.8 mm With the increase of the distances between the second positioning portions and the first positioning portion, the required spaces between the second positioning portions for providing expansion space and contraction space gradually increase. Therefore, in the embodiment of the disclosure, in the direction that the midpoint of the first sub-edge portion points to the end points of both sides, a plurality of third spaces corresponding to the plurality of second positioning portions on the first sub-edge portion are gradually increased, so that different and sufficient intervals can be reserved between bosses and openings at various positions, and further, various positions of the first sub-optical film can be guaranteed not to wrinkle when expanding or contracting due to temperature changes in the vehicle-mounted environment, and space waste can be prevented by the accurate design of the sizes of the gaps, so as to prevent the influence on the fixing of the first sub-optical film and the second middle frame.

For example, FIG. 4I is a partial enlarged view of E5 region of the backlight assembly shown in FIG. 4F, and FIG. 4J is a partial enlarged view of E6 region of the backlight assembly shown in FIG. 4F. As shown in FIG. 4C to FIG. 4J, the first edge portion includes a third positioning portion 1100 and at least one fourth positioning portion 1200 located at the second sub-edge portion 0102, and the fourth positioning portion 1200 is disposed at one side of the third positioning portion 1100 in the second direction. The rim of the first supporting portion also includes a third positioning groove 2100 and at least one fourth positioning groove 2200, the third positioning portion 1100 is located in the third positioning groove 2100, and each fourth positioning portion 1200 is located in the corresponding fourth positioning groove 2200, and the fourth positioning portion 1200 is located at one side of the third positioning portion 1100 in the second direction.

In the normal temperature environment, the sides of each fourth positioning groove 2200 opposite to each other in the second direction are not in contact with the sides of the corresponding fourth positioning portion 1200 opposite to each other in the second direction, and the difference between the sizes of the third positioning groove 2100 and the third positioning portion 1100 in the second direction is smaller than that of each fourth positioning groove 2200 and the corresponding fourth positioning portion 1200 in the second direction. Therefore, the fourth positioning portion is a rough positioning portion and the fourth positioning groove is a rough positioning groove, and the rough positioning of the first sub-optical film in the second direction is realized by the cooperation of the rough positioning portion and the rough positioning groove.

For example, the embodiment of the present disclosure schematically shows that one third positioning portion and one fourth positioning portion are arranged on a second sub-edge portion, and at this time, the third positioning portion and the fourth positioning portion can be roughly symmetrically distributed relative to the midpoint of the second sub-edge portion. The embodiment is not limited thereto, one second sub-edge portion can be provided with a plurality of fourth positioning portions, which are all located on the same side of the third positioning portion, and the third positioning portion and the fourth positioning portions are roughly evenly distributed on the second sub-edge portion.

The embodiment of the present disclosure is not limited thereto. When the number of the fourth positioning portions is more than one, the plurality of fourth positioning portions are all located on the same side of the third positioning portion, and the size differences between respective fourth positioning grooves and corresponding fourth positioning portions in the second direction can gradually increase in the direction from close to the third positioning portion to away from the third positioning portion. For example, the difference between the sizes of each fourth positioning groove and the corresponding fourth positioning portion in the second direction may include at least one of an expansion space and a contraction space. In the normal temperature environment, in the direction from close to the third positioning portion to away from the third positioning portion, the expansion distances corresponding to the fourth positioning portions gradually increase, and/or the contraction distances corresponding to the fourth positioning portions gradually increase.

For example, as shown in FIG. 4C to FIG. 4J, the plurality of fourth positioning grooves 2200 are arranged in one-to-one correspondence with the fourth positioning portions 1200 on the second sub-edge portion 0102, and the number of the fourth positioning grooves 2200 is the same as that of the fourth positioning portions 1200, and each fourth positioning portion 1200 is located in the corresponding fourth positioning groove 2200.

For example, as shown in FIG. 4C to FIG. 4J, in the normal temperature environment, there is an interval in the second direction between the two inner sides of the corresponding fourth positioning groove which are close to the two sides of each fourth positioning portion on the second sub-edge portion 0102. That is, the rough positioning portion in the rough positioning groove does not contact with the rough positioning groove in the second direction. For example, there may or may not be an interval between the two inner sides of the corresponding third positioning groove which are close to the two sides of each third positioning portion in the second direction.

For example, as shown in FIG. 4I to FIG. 4J, taking one rim extending in the Z direction among a plurality of rims 3202 as an example, the third positioning groove 2100 on the rim includes two inner sides opposite to each other in the Z direction, and the third positioning portion 1100 on the second sub-edge portion 0102 is located between the two inner sides, and there are two intervals between the third positioning portion 1100 and the two inner sides, namely an interval P1 and an interval P2. The embodiment of the present disclosure is not limited thereto, and there may be only an interval P2 between the third positioning portion 1100 and the two inner sides of the third positioning groove 2100, that is, the size of the interval P1 may be 0.

For example, each fourth positioning groove 2200 on the rim also includes two inner sides opposite to each other in the Z direction, and the fourth positioning portion 1200 on the second sub-edge portion 0102 is located between these two inner sides, and there are two intervals between the fourth positioning portion 1200 and these two inner sides, namely an interval G1 and an interval G2. For example, a size of the interval G1 in the second direction may be a contraction space, and a size of the interval G2 in the second direction may be an expansion space.

For example, on the second sub-edge portion 0102, the sum of the sizes of the intervals between sides of each fourth positioning portion 1200 and sides of the corresponding fourth positioning groove 2200 adjacent to the sides of each fourth positioning portion 1200 in the second direction is greater than the sum of the sizes of the intervals between sides of the third positioning portion 1100 and sides of the corresponding third positioning groove 2100 adjacent to the sides of the third positioning portion 1100 in the second direction. For example, the sum of the interval P1 and the interval P2 between the third positioning portion 1100 on the second sub-edge portion 0102 and the corresponding third positioning groove 2100 in the second direction is smaller than the sum of the interval G1 and the interval G2 between the fourth positioning portion 1200 on the second sub-edge portion 0102 and the corresponding fourth positioning groove 2200 in the second direction.

For example, as shown in FIG. 4D to FIG. 4H, the opening 12 of the second positioning portion 0120 on the first sub-edge portion close to the third positioning portion 1100 may contact with or keep a small distance from a side of the boss 3221 away from the third positioning portion 1100 in the second direction, and a size of the interval P1 between the side of the third positioning portion 1100 away from the fourth positioning portion 1200 and the corresponding side of the third positioning groove 2100 may be small or even zero. The size of the interval P1 between the side of the third positioning portion 1100 away from the fourth positioning portion 1200 and the corresponding side of the third positioning groove 2100 is smaller than a size of the interval P2 between the side of the third positioning portion 1100 close to the fourth positioning portion 1200 and the corresponding side of the third positioning groove 2100 to realize accurate positioning of the first sub-optical film in the second direction; sizes of an interval G1 and an interval G2 between the two sides of the fourth positioning portion 1200 and the corresponding fourth positioning groove 2200 are both greater than the size of the interval P1. Therefore, in the embodiment of the present disclosure, the first positioning portion and the third positioning portion together serve as an accurate positioning portion, and the fourth positioning portion serves as a rough positioning portion. In the embodiment of the present disclosure, the combination of accurate positioning and rough positioning is adopted between the second sub-edge portion of the first sub-optical film extending in the second direction and the rim of the second middle frame, which can not only ensure the fixation of the first sub-optical film and the second middle frame, but also ensure that the first sub-optical film in high temperature and high humidity environment is not easy to wrinkle in the second direction, and does not affect normal display.

In the embodiment of the present disclosure, under the condition that the size of the second sub-edge portion is small, one accurate positioning portion and at least one rough positioning portion can be disposed on the second sub-edge portion, which can make the first sub-optical film expand to one side with the accurate positioning portion as the center in high temperature environment; or a part of the first sub-optical film located at one side of the accurate positioning portion shrinks toward the accurate positioning portion under a low temperature environment. Of course, the embodiments of the present disclosure are not limited thereto. In a case where the length of the second sub-edge portion is long and the number of rough positioning portions is large, the rough positioning portions can also be distributed on both sides of the accurate positioning portions to minimize the size change of the second sub-edge portion of the first sub-optical film when expanding or contracting.

For example, as shown in FIG. 2A, FIG. 4C, FIG. 4D and FIG. 4F to FIG. 4J, taking the vertical placement of the first sub-optical film provided by the embodiment of the present disclosure as an example, the direction indicated by the arrow in the Z direction is upward with the ground as a reference. At this time, the first sub-edge portion is horizontally disposed and the second sub-edge portion is vertically disposed. An example of the embodiment of the present disclosure is described by taking the interval P2 and the interval G2 as the intervals for providing expansion space for the first sub-optical film 3101, and the interval P1 and the interval G1 as the intervals for providing contraction space for the first sub-optical film 3101 as an example for description. Taking the temperature range of the vehicle-mounted environment in which the backlight assembly provided by the embodiment of the disclosure is applied as −40° C.~95° C., and the temperature of the normal temperature environment as 25° C., the temperature difference of the vehicle-mounted environment in which the backlight assembly is located is 65° C. from the normal temperature to the lowest temperature, and the temperature difference of the vehicle-mounted environment in which the backlight assembly is located is 70° C. from the normal temperature to the highest temperature. The interval P2 of the first sub-optical film 3101 is greater than the expansion demand gap3 of the first sub-optical film 3101, and the expansion demand gap3 satisfies gap3=$\Delta$ T1*V1*CET2.

$\Delta$ T1 represents the high temperature difference of the vehicle-mounted environment where the first sub-optical film 3101 is located; as shown in FIG. 4D, V1 represents a distance between an edge of the third positioning portion 1100 away from the fourth positioning portion 1200 and a side of the protrusion of the first sub-edge portion 0101, which is close to the third positioning portion 1100, away from the third positioning portion 1100 in the second direction, and CET2 represents the thermal expansion coefficient of the first sub-optical film 3101 in the second direction. The expansion demand gap3 corresponding to the interval P2 of the third positioning portion 1100 at the E5 position shown in FIG. 4F satisfies the relational of gap3=70*V1*CET2.

The thermal expansion coefficient CET2 of the first sub-optical film 3101 in the second direction is related to the temperature range of the first sub-optical film 3101. For example, the value of the thermal expansion coefficient CET2 of the first sub-optical film 3101 at 75° C.~95° C. is greater than that of the first sub-optical film 3101 at 50° C.~75° C., and the value of thermal expansion coefficient CET2 of the first sub-optical film 3101 at 50° C.~75° C. is greater than that of the first sub-optical film 3101 at 25° C.~50° C. The interval P1 of the first sub-optical film 3101 is greater than the contraction required gap4 of the first sub-optical film 3101, and the contraction required gap4 satisfies gap4=$\Delta$ T2*V2*CET2.

$\Delta$T2 in the above relational expression represents the low temperature difference of the vehicle-mounted environment where the first sub-optical film 3101 is located, and V2 represents a distance between an edge of the third positioning portion 1100 close to the fourth positioning portion 1200 and the edge of the protruding portion of the first sub-edge portion 0101 away from the third positioning portion 1100 in the second direction, so that the contraction required gap4 corresponding to the interval P1 of the third positioning portion 1100 at the E5 position shown in FIG. 4F satisfies the relational of expression gap4=65*V2*CET2.

The interval G2 of the first sub-optical film 3101 is greater than the expansion required gap5 of the first sub-optical film 3101, and the expansion required gap5 satisfies gap5=$\Delta$T1*V3*CET2. V3 represents a distance between the edge of the fourth positioning portion 1200 close to the third positioning portion 1100 and the side of the protruding portion of the first sub-edge portion 0101 away from the third positioning portion 1100 in the second direction.

In the same way, the interval G1 of the first sub-optical film 3101 is greater than the contraction required gap6 of the first sub-optical film 3101, and the contraction required gap6 satisfies gap6=$\Delta$T2*V4*CET2. V4 represents a distance between the edge of the fourth positioning portion 1200 away from the third positioning portion 1100 and the side of the protruding portion of the first sub-edge portion 0101 (the first sub-edge portion close to the third positioning portion) away from the third positioning portion 1100 in the second direction.

The width of each interval is related to not only the expansion gap and the contraction required gap, but also the cutting tolerance (DBEF) of the first sub-optical film 3101 and the injection molding tolerance (DMF) of the second middle frame 320. For example, the cutting tolerance of the first sub-optical film 3101 depends on the tolerance zone corresponding to the position size of each interval, and the injection molding tolerance of the second middle frame 320 depends on the tolerance zone corresponding to the position size of each interval.

For example, at the position of an edge of the third positioning portion 1100 away from the fourth positioning portion 1200, the cutting tolerance of the first sub-optical film 3101 is approximately 0.2 mm, the injection molding tolerance of the second middle frame 320 is approximately 0.15 mm, V1 is approximately 51 mm, and the contraction demand gap is approximately 0.2 mm, so the interval P1 should be no less than 0.55 mm, for example, the interval P1 can be 0.6 mm as the accurate positioning position.

For example, at the position of the edge of the third positioning portion 1100 close to the fourth positioning portion 1200, the cutting tolerance of the first sub-optical film 3101 is approximately 0.2 mm, the injection molding tolerance of the second middle frame 320 is approximately 0.15 mm, V2 is approximately 75 mm, and the expansion required gap is approximately 0.3 mm, so the interval P2 should be not less than 0.65 mm, for example, the interval P2 can be 1.5 mm.

For example, at the position of the edge of the fourth positioning portion 1200 close to the third positioning portion 1100, the cutting tolerance of the first sub-optical film 3101 is approximately 0.2 mm, the injection molding tolerance of the second middle frame 320 is approximately 0.15 mm, V3 is approximately 165 mm, and the contraction required gap is approximately 0.6 mm, so the interval G1 should be no less than 0.95 mm, for example, the interval G1 may be 1.5 mm.

For example, at the position of the edge of the fourth positioning portion 1200 away from of the third positioning portion 1100, the cutting tolerance of the first sub-optical film 3101 is approximately 0.1 mm, the injection molding tolerance of the second middle frame 320 is approximately 0.15 mm, V4 is approximately 188 mm, and the expansion required gap is approximately 0.79 mm, so the interval G2 should be not less than 1.04 mm, for example, the interval G2 can be 1.5 mm.

For example, as shown in FIG. 4C to FIG. 4J, the third positioning portion 1100 on the second sub-edge portion 0102 includes a third protruding portion 0112, and the fourth positioning portion 1200 on the second sub-edge portion 0102 includes a fourth protruding portion 0122. In the embodiment of the present disclosure, the outline edges (second sub-edge portions) where the third protruding portion 0112 and the fourth protruding portion 0122 are located include protruding portions and linear connecting lines between adjacent protruding portions, so that a plurality of protruding portions and connecting lines are connected end to end to form a zigzag outline edge. In the embodiment of the present disclosure, the third protruding portion and the fourth protruding portion are protruding portions without openings. Of course, the embodiment of the present disclosure is not limited thereto, and the fourth protruding portion may also be a protruding portion with an opening. At this time, the fourth positioning groove where the fourth protruding portion is located needs to be provided with a boss corresponding to the opening, so that the opening can be sleeved on the boss.

FIG. 4K is a partial enlarged view of E7 region of the backlight assembly shown in FIG. 4F, and FIG. 4L is a partial enlarged view of E8 region of the backlight assembly shown in FIG. 4F. For example, as shown in FIG. 4C to FIG. 4L, taking the vertical placement of the first sub-optical film provided by the embodiment of the present disclosure as an example, the direction indicated by the arrow in the Z direction is upward with the ground as a reference. At this time, a distance between the opening 12 of the second protruding portion 0121 of the second positioning portion 0120 in the E2 region and an upper side of the boss 3221 is 0. That is, the distance between the opening of the second protruding portion on the upper side of the first sub-optical film and the upper side of the corresponding boss is 0, and the first sub-optical film is hung on the protrusion, which supports the first sub-optical film in Z direction.

For example, the interval 12 between the opening 12 of the second protruding portion 0121 of the second positioning portion 0120 in the E8 region and the upper side of the boss 3221 is used to provide expansion space for the first sub-optical film 3101 in the second direction, and the interval I1 between the opening 12 of the second protruding portion 0121 of the second positioning portion 0120 in the E8 region and the lower side of the boss 3221 is used to provide contraction space for the first sub-optical film 3101 in the second direction. The value of the interval 12 can be calculated to be 1.35 mm, and the value of the interval I1 can be calculated to be 0.83 mm according to references such as the cutting tolerance (DBEF) of the first sub-optical film 3101 at the position of the second positioning portion 0120 in the E8 region, the injection molding tolerance (DMF) of the second middle frame 320, the expansion coefficient of the first sub-optical film 3101, the changing temperature difference of the environment where the backlight assembly is located, and a distance between a middle point of the second positioning portion 0120 in the E8 region and an edge of the second positioning portion 0120 in the E2 region away from the E8 region.

For example, as shown in FIG. 4C to FIG. 4L, a plurality of blocking walls 3230 are further included around the second middle frame 320. Each of the plurality of blocking walls 3230 includes two sub-blocking walls 3231 arranged in the extending direction (the first direction or the second direction) of the rim where the blocking wall 3230 is located, and the first positioning groove 32100, the second positioning groove 3220, the third positioning groove 2100 or the fourth positioning groove 2200 are arranged between the two sub-blocking walls 3231. In the embodiment of the present disclosure, the relatively concave portion between two sub-blocking walls included in each blocking wall is the positioning groove as mentioned above, that is, the positioning groove is formed due to the existence of the blocking wall, and the positioning groove is not obtained by grooving the second middle frame.

In the embodiment of the present disclosure, in the same blocking wall on the rim extending in the first direction, the interval between two sub-blocking walls forms a concave portion, which is the first positioning groove configured to place the first protruding portion or the second positioning groove configured to place the second protruding portion; in the same blocking wall on the rim extending in the second direction, the interval between two sub-blocking walls forms a concave portion, which is the third positioning groove configured to place the third protruding portion or the fourth positioning groove configured to place the fourth protruding portion. Therefore, the blocking walls arranged around the second middle frame correspond to the connecting lines between two adjacent positioning portions of the first sub-optical film, and a certain interval should be set between the connecting line extending in the first direction and the corresponding blocking wall to provide deformation space for the first sub-optical film to expand or contract in the second direction. In the same way, a certain interval should be set between the connecting portion extending in the second direction and the corresponding blocking wall to provide deformation space for the first sub-optical film to expand or contract in the first direction, thus preventing the first sub-optical film from wrinkling due to the obstruction of the blocking wall on the second middle frame when it is deformed due to the change of ambient temperature.

For example, as shown in FIG. 4F to FIG. 4L, a boss 3221 is provided in the second positioning groove 3220 between two sub-blocking walls 3231 in the E2 region to the E4 region. The length of the boss 3221 in the extending direction of the first sub-edge portion 0101 of the first sub-optical film 3101 may be 9.49 mm, the width of the boss 3221 may be 0.72 mm, and the height of the boss 3221 perpendicular to the second supporting surface may be 2 mm. For example, the boss 3221 located in the second positioning grooves 3220 may be located approximately in the middle of the second positioning grooves 3220, so as to facilitate the design of the interval between the second protruding portion 0121 and the boss 3221. In the embodiment of the present disclosure, the sizes of the boss 3221 in respective second positioning grooves 3220 are the same, and the groove lengths of respective second positioning grooves 3220 in the extending direction of the first sub-edge portion 0101 are the same, so the size of the reserved interval between the second protruding portions 0121 and the boss 3221 can be changed by changing the size of the parts of the second protruding portions 0121 located on both sides of the opening 12 in the extending direction of the first sub-edge portion 0101. For example, the length of the first positioning groove 32100 between two sub-blocking walls 3231 in the E1 region in the extending direction of the first sub-edge portion 0101 may be 25.2 mm, and its depth may be 1.1 mm.

For example, as shown in FIG. 4F to FIG. 4L, the positioning groove between two sub-blocking walls 3231 in the E5 region and the E6 region in the extending direction of the second sub-edge portion 0102 of the first sub-optical film 3101 may have a length of 26.2 mm, and a depth of 1.1 mm. For example, the length of the first positioning groove 32100 between two sub-blocking walls 3231 in the E5 region is the same as that of the second positioning groove 3220 in the E6 region, the sizes of the positioning portions located in different positioning grooves in the extending direction of the second sub-edge portion can be adjusted so that the sizes of the intervals between different positioning grooves and corresponding positioning portions are different, thus realizing the combination of accurate positioning and rough positioning.

For example, as shown in FIG. 4F and FIG. 4H, taking the vertical placement of the first sub-optical film as an example, the direction indicated by the arrow in the Z direction is upward with the ground as a reference. At this time, the first sub-edge portion is horizontally disposed and the second sub-edge portion is vertically disposed. For example, there is an interval D between the connecting line 0130 on the first sub-edge portion 0101 on the upper side of the first sub-optical film 3101 and opposite sides of the corresponding sub-blocking wall 3231, which is a contraction space reserved for the first sub-optical film 3101 to contract in the second direction. For example, the value of the interval D may be approximately 1.5 mm.

For example, as shown in FIG. 4F and FIG. 4L, there is an interval J between the connecting line 0130 on the first sub-edge portion 0101 on the lower side of the first sub-optical film 3101 and opposite sides of the corresponding sub-blocking wall 3231, and the interval J is an expansion space reserved for the first sub-optical film 3101 to expand in the second direction. For example, the value of the interval J may be approximately 2 mm.

For example, as shown in FIG. 4F, FIG. 4I and FIG. 4K, there is an interval F between the connecting line 0130 located on one second sub-edge portion 0102 of the first sub-optical film 3101 and opposite sides of the corresponding sub-blocking wall 3231, which is an expansion space reserved for the first sub-optical film 3101 to expand in the first direction. For example, the value of the interval F may be in a range of 2.4~2.9 mm. Similarly, there is an interval H between the connecting line 0130 located on the other second sub-edge portion 0102 of the first sub-optical film 3101 and opposite sides of the corresponding sub-blocking wall 3231, which is an expansion space reserved for the first sub-optical film 3101 to expand in the first direction. For example, the value of the interval H may be in a range of 2.4~2.9 mm.

Figure 4N:
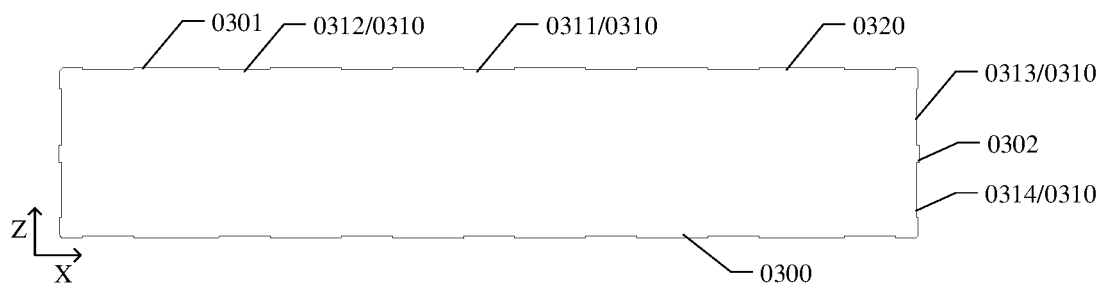
FIG. 4N is a schematic diagram of a planar structure of a second sub-optical film provided by an embodiment of the present disclosure.
Figure 4O:
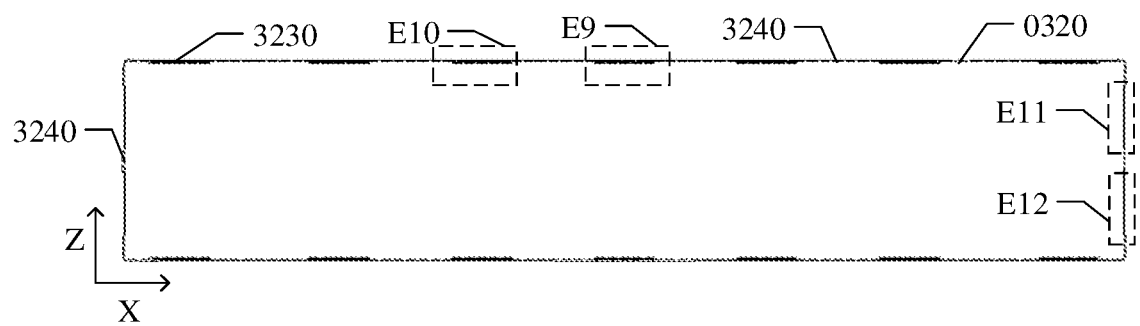
FIG. 4O is a schematic diagram of a planar structure in which a second sub-optical film is matched with a second middle frame provided by an embodiment of the present disclosure.

FIG. 4M is a schematic diagram of a partial cross-sectional structure of a backlight assembly provided by an embodiment of the present disclosure, FIG. 4N is a schematic diagram of a planar structure of a second sub-optical film provided by an embodiment of the present disclosure, and FIG. 4O is a schematic diagram of a planar structure in which a second sub-optical film is matched with a second middle frame provided by an embodiment of the present disclosure. As shown in FIG. 4M to FIG. 4O, the backlight assembly further includes a second sub-optical film 0300 including a plurality of second edge portions. The second sub-optical film 0300 is located between the first sub-optical film 3101 and the second supporting surface 3215 of the second middle frame 320, and the second supporting surface 3215 is configured to support the second sub-optical film 0300 and the first sub-optical film 3101.

For example, the second sub-optical film 0300 may be a diffuser plate. For example, the thickness of the second sub-optical film 0300 is greater than that of the first sub-optical film 3101. For example, the second sub-optical film 0300 can be made of transparent materials such as polymethyl methacrylate (PMMA) or polycarbonate (PC), and its thickness is thicker (for example, in a range of 0.125~0.4 mm), and its light transmittance can be greater than 90%.

For example, as shown in FIG. 4C to FIG. 4O, the periphery of the second sub-optical film 0300 includes a plurality of concave portions 0310, which are arranged in one-to-one correspondence with the plurality of blocking walls 3230, and each concave portion 0310 is configured to be engaged with a corresponding blocking wall 3230 to fix the second sub-optical film 0300. For example, each blocking wall 3230 is an inward protruding portion located in the rim of the second supporting portion 321, and each concave portion 0310 is an inward concave portion located at the edge of the second sub-optical film 0300.

In the embodiment of the present disclosure, the blocking wall 3230 protruding inward from the second supporting portion 321 is embedded into the concave portion 0310 of the second sub-optical film 0300 to fix the position of the second sub-optical film 0300. In the embodiment of the present disclosure, the outline edge of the second sub-optical film (i.e., the second edge portion) is set into an irregular shape, that is, the outline edge of the second sub-optical film is no longer a straight line, but a broken line matched with the second middle frame, so that the second sub-optical film and the second middle frame can be directly fixed without double-sided adhesive tape. Therefore, a certain movable space can be reserved for the second sub-optical film, and the display is prevented from being affected by deformation such as wrinkles caused by the restriction of the second middle frame when the second sub-optical film expands or contracts.

For example, as shown in FIG. 4C to FIG. 4O, the second sub-optical film 0300 includes a plurality of outline edges (i.e., a plurality of second edge portions) corresponding to the plurality of rims 3202 of the second supporting portion 321 one by one. The embodiment of the present disclosure takes an example that the second sub-optical film 0300 includes four outline edges, and the four outline edges enclose to form the second sub-optical film with a substantially rectangular shape, but is not limited thereto. As long as a plurality of rims of the second middle frame correspond to a plurality of outline edges of the second sub-optical film one by one.

For example, as shown in FIG. 4C to FIG. 4O, the plurality of outline edges of the second sub-optical film 0300 include a third sub-edge portion 0301 extending in the first direction and a fourth sub-edge portion 0302 extending in the second direction. For example, the length of the third sub-edge portion 0301 is greater than that of the fourth sub-edge portion 0302. In the embodiment of the present disclosure, taking the shape of the second sub-optical film being a rectangular as an example, the third sub-edge portion is a long side and the fourth sub-edge portion is a short side.

For example, as shown in FIG. 4N to FIG. 4O, the third sub-edge portion 0301 includes a plurality of concave portions 0310 and a convex structure 0320 located between adjacent concave portions. Therefore, the plurality of concave portions 0310 and the plurality of convex structures 0320 are connected end to end to form a zigzag outline edge. In the same way, the fourth sub-edge portion 0302 is also a zigzag outline edge formed by connecting the plurality of concave portions 0310 and the plurality of convex structures 0320 end to end.

For example, as shown in FIG. 4N to FIG. 4O, the plurality of concave portions 0310 include a first sub-concave portion 0311 and a plurality of second sub-concaves 0312 located on the third sub-edge portion 0301. The blocking wall 3230 located in the first sub-concave portion 0311 is the first blocking wall and the blocking wall 3230 located in the second sub-concave portion 0312 is the second blocking wall.

For example, as shown in FIG. 4N to FIG. 4O, the blocking wall 3230 located on the rim 3202 extending in the first direction includes two outer sides opposite to each other in the first direction, and the concave portion 0310 located on the third sub-edge portion 0301 includes two inner sides opposite to each other in the first direction, and the two outer sides of the blocking wall 3230 corresponding to one concave portion 0310 are located between the two inner sides of the concave portion 0310.

For example, as shown in FIG. 4N to FIG. 4O, in the normal temperature environment, there is an interval between two sides of the second sub-concave portion and two sides of the corresponding blocking wall 3230 which are close to the two sides of the second sub-concave portion in the first direction. For example, there may or may not be at least one interval between each first sub-concave and the corresponding blocking wall in the first direction. For example, there are two intervals between each concave portion and the blocking wall located in it, that is, there is no contact. One of the two intervals provides an expansion space for the second sub-optical film, and the other provides a contraction space for the second sub-optical film. Thus, when the backlight assembly provided by the embodiment of the present disclosure is in a high temperature environment (e.g., 50~100° C.) or a low temperature environment (e.g., 0~40° C.), there is enough expansion or contraction space between the concave portion of the second sub-optical film and the blocking wall of the second middle frame, so that the second sub-optical film can be prevented from being deformed due to the obstruction of the second middle frame during expansion or contraction.

For example, in order to facilitate fabrication, the width of the interval for providing expansion space for the second sub-optical film may be equal to the width of the interval for providing contraction space for the second sub-optical film.

Figure 4P:
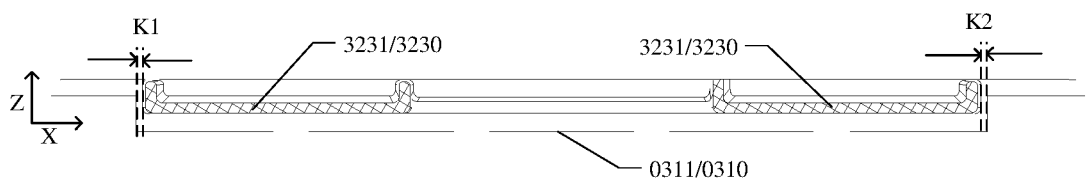
FIG. 4P is a partial enlarged view of E9 region in the backlight assembly shown in FIG. 4O.
Figure 4Q:
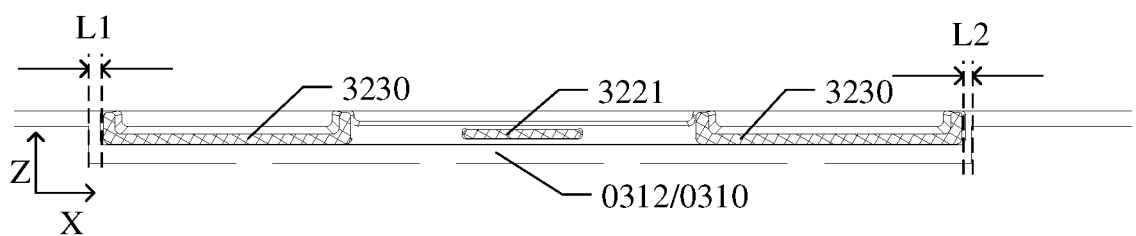
FIG. 4Q is a partial enlarged view of E10 region in the backlight assembly shown in FIG. 4O.

For example, FIG. 4P is a partial enlarged view of E9 region in the backlight assembly shown in FIG. 4O, and FIG. 4Q is a partial enlarged view of E10 region in the backlight assembly shown in FIG. 4O. As shown in FIG. 4N to FIG. 4Q, the first sub-concave portion 0311 located on the third sub-edge portion 0301 includes two inner sides opposite to each other in the first direction, and the first blocking wall is located between the two inner sides, and there are an interval K1 and an interval K2 between the first blocking wall and the two inner sides, respectively. A sum of the sizes of intervals in the first direction between the first sub-concave portion 0311 and the sides of the corresponding blocking wall (i.e., the first blocking wall) close to the first sub-concave portion (i.e., the sum of sizes of the interval K1 and the interval K2) is a fourth space S4, that is, the difference between the sizes of the first sub-concave portion 0311 and the corresponding blocking wall in the first direction is the fourth space S4.

Each second sub-concave portion 0312 located on the third sub-edge portion 0301 includes two inner sides opposite to each other in the second direction, and each second blocking wall is located in the two inner sides, there are an interval L1 and an interval L2 between the second blocking wall and the two inner sides, respectively. The sum of sizes of intervals in the first direction between the second sub-concave portion 0312 and the sides of the corresponding blocking wall (i.e., the second blocking wall) close to the second sub-concave portion (i.e., the sum of sizes of the interval L1 and the interval L2) is a fifth space S5. That is, the difference between the sizes of the second sub-concave portion 0312 and the corresponding blocking wall in the first direction is the fifth space S5. The fourth space S4 is smaller than the fifth space S5. Therefore, the first sub-concave portion is a concave portion for accurate positioning, and the second sub-concave portion is a concave portion for rough positioning. When the third sub-edge portion is an arc-shaped edge portion, the fourth space and the fifth space are sizes in the extending direction of the arc-shaped edge portion.

In the embodiment of the present disclosure, the combination of accurate positioning and rough positioning is adopted between the second sub-optical film and the second middle frame, which can not only ensure the fixation of the second sub-optical film and the second middle frame, but also ensure that the second sub-optical film is not prone to wrinkle in high temperature and high humidity environment, and does not affect normal display.

For example, as shown in FIG. 4N to FIG. 4Q, the first sub-concave portion 0311 is located approximately at the midpoint of the third sub-edge portion 0301, and a plurality of second sub-concaves 0312 are located on both sides of the first sub-concave portion 0311. In the embodiment of the disclosure, the first concave portion as the accurate positioning concave portion is roughly arranged at the middle point of the third sub-edge portion of the second sub-optical film, and a plurality of rough positioning concave portions are distributed on both sides of the accurate positioning concave portion, so that the second sub-optical film can expand to the left and right (taking the X direction as the right as an example) with the accurate positioning concave portion as the center in high temperature environment; or the parts of the second sub-optical film located at both sides of the accurate positioning concave portion contract towards the middle under the low temperature environment. Therefore, wrinkling of the long side of the second sub-optical film during expansion or contraction can be avoided as much as possible.

For example, as shown in FIG. 4N to FIG. 4Q, the number of second sub-concaves 0312 located on both sides of the first sub-concave portion 0311 in the first direction is equal, and the plurality of second sub-concaves 0312 located on both sides of the first sub-concave portion 0311 are symmetrically distributed with the first sub-concave portion 0311 as the center. Therefore, it is possible to ensure that the third sub-edge portion of the second sub-optical film expands or contracts symmetrically at high temperature or low temperature, so as to facilitate the setting of the relative positional relationship between the second sub-optical film and the second middle frame.

For example, as shown in FIG. 4N to FIG. 4Q, in the direction from the midpoint of the third sub-edge portion 0301 to the end points at both sides, the fifth spaces S5 corresponding to the second sub-concaves 0312 gradually increase to ensure that the second sub-optical film expands from the center to both sides in the high temperature and high humidity environment. The closer to the edges of the second sub-optical film, the greater the expansion of the second sub-optical film in the direction from the midpoint of the third sub-edge to the end points at both sides. Therefore, the closer to the edges of the second sub-optical film, the size of the reserved interval between the second sub-concave portion and the corresponding blocking wall presents an increasing trend, so as to ensure that each position of the second sub-optical film will not have deformation such as wrinkles which affects the display when expanding or contracting due to temperature change in the vehicle-mounted environment.

For example, as shown in FIG. 4F to FIG. 4Q, the embodiment of the present disclosure takes the rim of the second supporting portion 321 extending in the first direction arranged with seven blocking walls 3230 as an example, and the above seven blocking walls 3230 are centered on the fourth blocking wall 3230 (the blocking wall 3230 in the E1 region), and three blocking walls respectively on the left side and right side are symmetrically distributed relative to the fourth blocking wall. The embodiment of the present disclosure does not limit the number of blocking walls, and the number of blocking walls can be adjusted according to the length and radian of the second middle frame. For example, in the direction perpendicular to the second supporting surface, the height of the blocking wall 3230 may be 3.29 mm.

For example, as shown in FIG. 4F to FIG. 4Q, in an example of the embodiment of the present disclosure, the backlight assembly is a curved surface backlight assembly, and the length of the blocking wall 3230 in the E4 region in the extending direction of the third sub-edge portion 0301 may be 68.22 mm, and the length of the blocking wall 3230 in the E3 region in the extending direction of the third sub-edge portion 0301 may be 69.33 mm, the length of the blocking wall 3230 in the E2 region in the extending direction of the third sub-edge portion 0301 may be 70.04 mm, and the length of the blocking wall 3230 in the E1 region in the extending direction of the third sub-edge portion 0301 may be 69.21 mm In the embodiment of the disclosure, the design of different lengths of blocking walls at different positions can ensure that the second middle frame can better keep the uniformity of curved surface radian and improve the yield of molding process, and can also reserve enough contraction space and expansion space for different positions of the second sub-optical film.

For example, as shown in FIG. 4F to FIG. 4Q, in the embodiment of the present disclosure, the third sub-edge portion of the second sub-optical film 0300 is provided with seven concave portions corresponding to the seven blocking walls 3230 one by one as an example, and the length of the second sub-concave portion 0312 in the E4 region in the extending direction of the third sub-edge portion 0301 may be 71.32 mm, and sizes of the two intervals between the second sub-concave portion 0312 and the blocking walls 3230 located in it can both be 1.55 mm; the length of the second sub-concave portion 0312 in the E3 region in the extending direction of the third sub-edge portion 0301 may be 71.72 mm, and sizes of the two intervals between the second sub-concave portion 0312 and the blocking wall 3230 located in it may both be 1.19 mm; the length of the second sub-concave portion 0312 in the E2 region in the extending direction of the third sub-edge portion 0301 may be 71.92 mm, and sizes of the two intervals between the second sub-concave portion 0312 and the blocking wall 3230 located in it may both be 0.96 mm; the length of the first sub-concave portion 0311 in the E1 region in the extending direction of the third sub-edge portion 0301 may be 70.79 mm, and sizes of the two intervals between the first sub-concave portion 0311 and the blocking wall 3230 located in it may both be 0.79 mm.

The first sub-concave portion 0311 in the E1 region is taken as the accurate positioning concave portion of the second sub-optical film 0300, and the rough positioning concave portions on both sides are symmetrically distributed relative to the accurate positioning concave portion, and the reserved sizes of the intervals from the middle to both sides is from small to large, so as to ensure that the second sub-optical film expands from the center to both sides in high temperature and high humidity environment. From the middle point to the both end points of the third sub-edge portion, the closer it is to the edges of the second sub-optical film, the greater the expansion size of the second sub-optical film, and the closer it is to the edges of the second sub-optical film, the reserved sizes of the intervals between the second sub-concave portions and the corresponding blocking walls show an increasing trend, which can ensure that respective positions of the second sub-optical film will not have deformation such as wrinkles when expanding or contracting due to temperature change in the vehicle-mounted environment.

For example, the depth by each concave portion 0310 on the third sub-edge portion 0301 concaved towards the center of the second sub-optical film 0300 may be 3 mm.

Figure 4R:
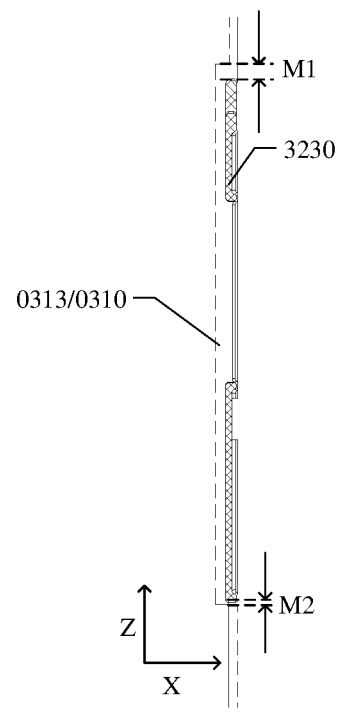
FIG. 4R is a partial enlarged view of E11 region of the backlight assembly shown in FIG. 4O.
Figure 4S:
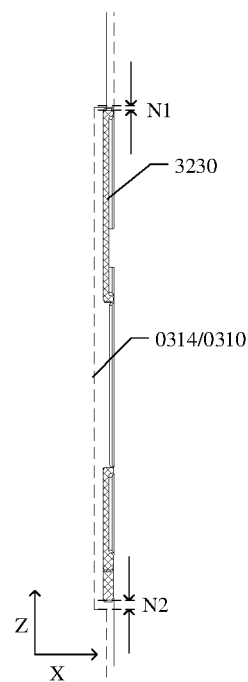
FIG. 4S is a partial enlarged view of E12 region of the backlight assembly shown in FIG. 4O.

For example, FIG. 4R is a partial enlarged view of E11 region of the backlight assembly shown in FIG. 4O, and FIG. 4S is a partial enlarged view of E12 region of the backlight assembly shown in FIG. 4O. As shown in FIG. 4N to FIG. 4S, the plurality of concave portions 0310 include a third sub-concave portion 0313 and at least one fourth sub-concave portion 0314 located on the fourth sub-edge portion 0302, and the at least one fourth sub-concave portion 0314 is located at one side of the third sub-concave portion 0313 in the second direction. For example, the embodiment of the present disclosure schematically shows that one third sub-concave portion and one fourth sub-concave portion are arranged on the fourth sub-edge portion. At this time, the third sub-concave portion and the fourth sub-concave portion can be distributed approximately symmetrically with respect to the midpoint of the fourth sub-edge portion. The present disclosure is not limited thereto, one fourth sub-edge can be provided with a plurality of fourth sub-concave portions, which are all located on the same side of the third sub-concave portion, and the third sub-concave portion and the plurality of fourth sub-concave portions are roughly evenly distributed on the fourth sub-edge portion.

For example, as shown in FIG. 4N to FIG. 4S, in the normal temperature environment, there are intervals between the two sides of the blocking wall located in each concave portion on the fourth sub-edge portion 0302 and the corresponding two sides of the concave portion in the second direction. That is, there are two intervals arranged along the second direction between the concave portion on the fourth sub-edge portion and the corresponding blocking wall.

For example, as shown in FIG. 4N to FIG. 4S, taking one rim extending in the second direction among the plurality of rims 3202 as an example, the blocking wall 3230 on the rim includes two opposite sides in the second direction, and the blocking wall 3230 is located in the third sub-concave portion 0313 on the fourth sub-edge portion 0302, and there are two intervals between the third sub-concave portion 0313 and the blocking wall, namely, an interval M1 and an interval M2. There are two intervals between the fourth sub-concave portion 0314 located on the fourth sub-edge portion 0302 and the blocking wall located therein, namely, an interval N1 and an interval N2.

In the normal temperature environment, one of the two intervals arranged between each concave portion and the corresponding blocking wall in the second direction provides an expansion space for the second sub-optical film, and the other provides a contraction space for the second sub-optical film. Therefore, upon the backlight assembly provided by the embodiment of the present disclosure being in a high-temperature environment or a low-temperature environment, there is enough expansion space or contraction space between the second sub-optical film and the blocking wall of the second middle frame, so that it is possible to prevent the second sub-optical film from being hindered by the second middle frame during expansion or contraction, resulting in wrinkles and other deformation affecting display.

For example, in order to facilitate fabrication, among the above two intervals between each concave portion and the corresponding blocking wall, the width of the interval providing expansion space for the second sub-optical film may be equal to the width of the interval providing contraction space for the second sub-optical film.

For example, in the normal temperature environment, the sum of the sizes of the intervals in the second direction between sides of the third sub-concave portion 0313 and sides of the corresponding blocking walls 3230 close to the sides of the third sub-concave portion 0313 is smaller than the sum of the sizes of the intervals in the second direction between sides of the fourth sub-concave portion 0314 and sides of the corresponding blocking walls 3230 close to the sides of the fourth sub-concave portion 0314. For example, the sum of the sizes of the interval M1 and the interval M2 between the third sub-concave portion 0313 and the corresponding blocking wall 3230 in the second direction is smaller than the sum of the sizes of the interval N1 and the interval N2 between the fourth sub-concave portion 0314 and the corresponding blocking wall 3230 in the second direction, so that the third sub-concave portion 0313 is an accurate positioning concave portion and the fourth sub-concave portion 0314 is a rough positioning concave portion. In the embodiment of the present disclosure, the combination of accurate positioning and coarse positioning is adopted between the fourth sub-edge portion of the second sub-optical film extending in the second direction and the rim of the second middle frame extending in the second direction, which can not only ensure the fixation between the second sub-optical film and the second middle frame, but also ensure that the second sub-optical film in the high-temperature and high-humidity environment is not easily deformed in the second direction.

In the embodiment of the disclosure, under the condition that the size of the fourth sub-edge portion is small, the fourth sub-edge portion can be provided with one accurate positioning concave portion and at least one rough positioning concave portion, so that the diffuser sheet can expand to one side with the accurate positioning concave portion as the center in a high temperature environment; or a part of the diffuser sheet at one side of the accurate positioning concave portion contracts to the accurate positioning concave portion when the diffuser sheet is in a low temperature environment. Of course, the embodiments of the present disclosure are not limited thereto. Upon the length of the fourth sub-edge portion being long and the number of rough positioning concave portions is large, the rough positioning concave portions can also be distributed on both sides of the accurate positioning concave portion to minimize the size change of the second sub-edge portion of the second sub-optical film when expanding or contracting.

For example, an example of the embodiment of the present disclosure is described by taking two blocking walls 3230 arranged on the rim extending in the second direction of the second supporting portion 321 as an example. For example, in the direction perpendicular to the second supporting surface, the height of the blocking wall 3230 may be 3.29 mm.

For example, as shown in FIG. 4N to FIG. 4S, in an example of the embodiment of the present disclosure, the backlight assembly is a curved surface backlight assembly, and the length of the blocking wall 3230 in the E11 region in the extending direction of the fourth sub-edge portion 0302 may be 74.76 mm, and the length of the blocking wall 3230 in the E12 region in the extending direction of the fourth sub-edge portion 0302 may be 77.46 mm Taking the vertical placement of the second sub-optical film provided by the embodiment of the present disclosure as an example, the blocking wall in the E11 region is located at the upper side and the blocking wall in the E12 region is located at the lower side, and the length of the blocking wall in the E12 region is longer than that in the E11 region, which can ensure that the second middle frame provides a better load-supporting function for the second sub-optical film, so as to ensure that the second sub-optical film can maintain stability when the backlight assembly is applied to high-intensity vibration conditions.

For example, as shown in FIG. 4N to FIG. 4S, a case that the fourth sub-edge portion of the second sub-optical film 0300 is provided with two concave portions corresponding to two blocking walls 3230 one by one is taken as an example, the length of the third sub-concave portion 0313 in the E11 region in the extending direction of the fourth sub-edge portion 0302 may be 76 mm, and the sizes of the two intervals between the third sub-concave portion 0313 and the blocking wall 3230 located in it may be 0.62 mm; the length of the fourth sub-concave portion 0314 in the E12 region in the extending direction of the fourth sub-edge portion 0302 may be 79.2 mm, and the sizes of the two intervals between the fourth sub-concave 0314 and the blocking wall 3230 located in it may both be 0.87 mm. The third sub-concave portion 0313 in the E11 region is used as the accurate positioning concave portion of the second sub-optical film 0300, and a rough positioning concave portion is arranged on one side of the accurate positioning concave portion to ensure that the second sub-optical film has enough expansion and contraction space in the extending direction of the fourth sub-edge portion in the high temperature and high humidity environment, and the second sub-optical film is not easy to have wrinkles and other deformation affecting the display.

For example, the depth of each concave portion 0310 located on the fourth sub-edge portion 0302 to the center of the second sub-optical film 0300 may be 3.2 mm.

For example, as shown in FIG. 4N to FIG. 4S, a fifth positioning groove 3240 is included between two adjacent blocking walls 3230 in the plurality of blocking walls 3230, and a convex structure 0320 is included between two adjacent concave portions 0310 in the plurality of concave portions 0310, and the convex structure 0320 is located in the fifth positioning groove 3240.

For example, as shown in FIG. 4N to FIG. 4S, the lengths of the concave portions 0310 located on the third sub-edge portion 0301 of the second sub-optical film 0300 in the first direction are all smaller than the sizes of the convex structures 0320 located on the third sub-edge portion 0301 in the first direction. For example, the lengths of the concave portions 0310 located on the fourth sub-edge portion 0302 of the second sub-optical film 0300 in the second direction are all greater than the size of the convex structure 0320 located on the fourth sub-edge portion 0302 in the second direction.

For example, as shown in FIG. 4N to FIG. 4S, the length of the fifth positioning groove 3240 formed between two adjacent blocking walls 3230 arranged on the rim extending in the second direction of the second middle frame 320 may be 25.58 mm in the second direction.

For example, in order to further ensure the stability of the second sub-optical film, an adhesive may be provided between the second sub-optical film and the second supporting surface to bond the second sub-optical film to the second middle frame. For example, the adhesive material can be located in the middle of the third sub-edge portion of the second sub-optical film to reduce the influence of the position of the adhesive material on the deformation trend of the second sub-optical film when expanding or contracting.

Figure 4T:
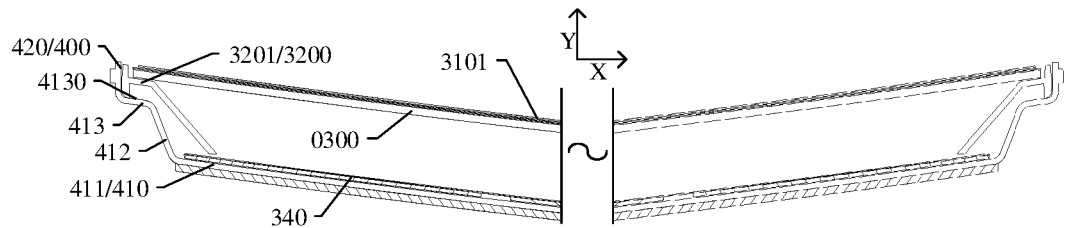
FIG. 4T is a partial cross-sectional view of a backlight assembly including a back plate provided by an embodiment of the present disclosure.

For example, FIG. 4T is a partial cross-sectional view of a backlight assembly including a back plate provided by an embodiment of the present disclosure. Except for the matching relationship with the first sub-optical film and the second sub-optical film, the back plate in the embodiment of the present disclosure may have the same characteristics as the back plate shown in FIG. 1A. For example, as shown in FIG. 4T, at least part of the back plate 400 of the backlight assembly is located on the side of the second middle frame 320 away from the first sub-optical film 3101.

For example, the side plate 420 of the back plate 400 extends from the outer edge of the second supporting portion 413 toward the first sub-optical film 3101. For example, the side plate 420 may have an annular structure that surrounds the first sub-optical film 3101.

For example, the first supporting portion 413 is used to support the first sub-optical film 3101 and the second sub-optical film 0300.

Figure 4U:
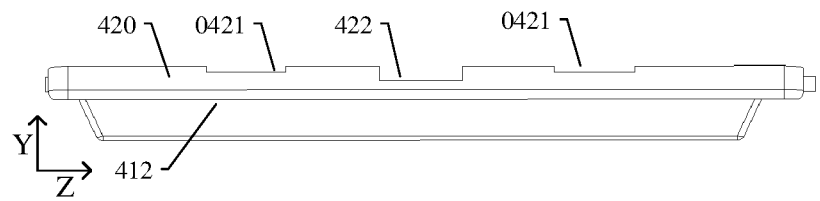
FIG. 4U and FIG. 4V are two side views of a back plate.
Figure 4V:
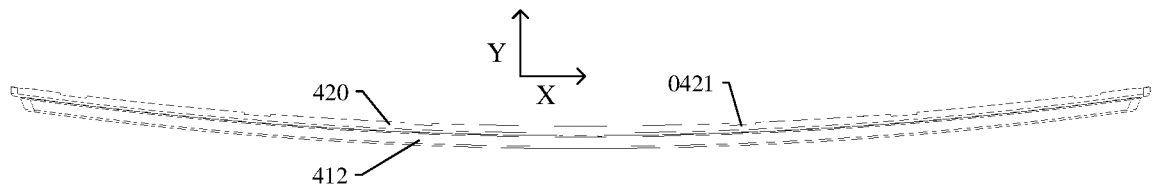
Figure 4W:
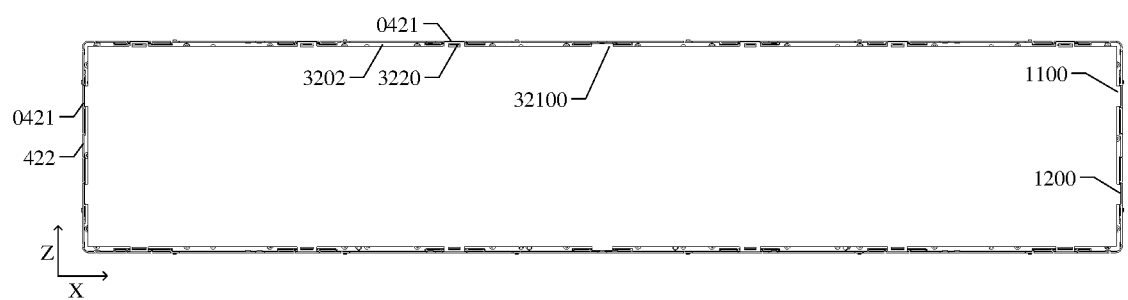
FIG. 4W is a schematic diagram of a positional relationship among a first sub-optical film, a second middle frame and a back plate.
Figure 4X:
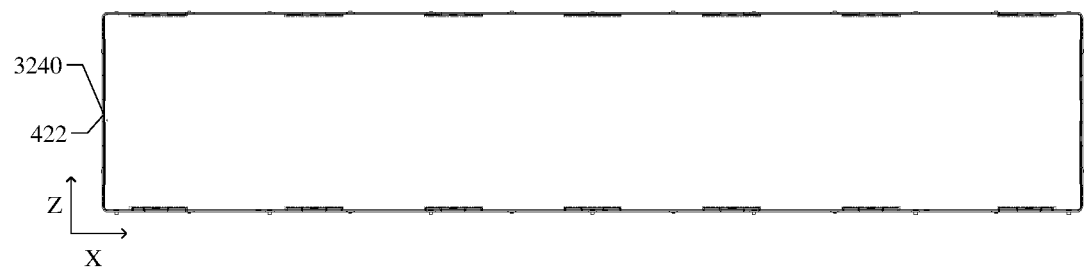
FIG. 4X is a schematic diagram of a positional relationship among a second sub-optical film, a second middle frame and a back plate.

For example, FIG. 4U and FIG. 4V are two side views of the back plate, FIG. 4U is a schematic diagram of the positional relationship among a first sub-optical film, a second middle frame and a back plate, and FIG. 4X is a schematic diagram of the positional relationship among a second sub-optical film, a second middle frame and a back plate. FIG. 4U is a side view of the back plate located at the outer side of the second sub-edge portion of the first sub-optical film, and FIG. 4V is a side view of the back plate located at the outer side of the first sub-edge portion of the first sub-optical film. As shown in FIG. 4U to FIG. 4X, the side plate 420 is located at the outer side of the second supporting portion 321 and surrounds the second middle frame 320. The side plate 420 includes a first side plate rim extending in the first direction and a second side plate rim extending in the second direction. The first side plate rim is located at the outer side of the rim extending in the first direction of the second middle frame 320, and the second side plate rim is located at the outer side of the rim extending in the second direction, so the length of the first side plate rim is greater than that of the second side plate rim. In the embodiment of the present disclosure, taking the side plates including two first side plate rims and two second side plate rims as an example, the four side plate rims surround to form the side plates of the back plate, and the side plates of the back plate enclose the second supporting portion.

For example, as shown in FIG. 4U to FIG. 4X, a plurality of first avoiding grooves 0421 provided on the side plate 420 include a part located on the first side plate rim and another part located on the second side plate rim.

For example, as shown in FIG. 4U to FIG. 4X, the plurality of first avoiding grooves 0421 on the first side plate rim extending in the first direction are opposite to the second positioning grooves 3220, and a part of the orthographic projection of the second positioning portion 0120 on the plane where the second supporting surface is located is in the corresponding second positioning groove 3220 and first avoiding groove 0421. That is, the second positioning portion 0120 passes through the corresponding second positioning groove 3220 and then extends into the first avoiding groove 0421. For example, in the normal temperature environment, a part of the first avoiding groove 0421 close to the outer edge is not covered by the second positioning portion 0120, and a certain gap is reserved for the expansion space when the first sub-optical film expands.

For example, as shown in FIG. 4U to FIG. 4X, in an example of the embodiment of the present disclosure, the first sub-edge portion 0101 of the first sub-optical film 3101 is provided with one first positioning portion 0110 (i.e., the first protruding portion 0111) located in the center and three second positioning portions 0120 (i.e., second protruding portions 0121 including openings 12) located on both sides of the first positioning portion 0110. The rim of the second middle frame 320 extending in the first direction is provided with one first positioning groove 32100 for placing one first positioning portion 0110 and six second positioning grooves 3220 for placing six second positioning portions 0120, respectively. The first side plate rim of the side plate 420 of the back plate 400 extending in the first direction can be provided with six first avoiding grooves 0421 corresponding to the six second positioning grooves 3220 one by one, for the avoidance of the second protruding portion 0121 of the first sub-optical film 3101. That is, the second protruding portion 0121 protrudes away from the center of the first sub-optical film 3101, passes through the second positioning groove of the rim of the second middle frame 320, and extends into the notch (i.e., the first avoiding groove 0421) provided by the side plate 420.

For example, the first protruding portion 0111 of the first sub-optical film 3101 protrudes away from the center of the first sub-optical film 3101, but does not exceed the first positioning groove 32100 of the second middle frame 320. The size of the first protruding portion 0111 in the second direction is smaller than that of the second protruding portion 0121 including the opening (this size includes the size of the opening), therefore, the side plate 420 is not provided with an avoiding groove at the position directly opposite to the first protruding portion 0111.

For example, the width of the first avoiding groove 0421 provided on the first side plate rim extending in the first direction may be 28 mm, and the depth of the first avoiding groove 0421 in the direction perpendicular to the second supporting surface 3215 may be 2.3 mm. For example, among the six first avoiding grooves 0421 arranged on the first side plate rim extending in the first direction, the positions of the three first avoiding grooves 0421 located on one side of the first protruding portion 0111 are respectively $\frac{1}{15}$ of the length of the first side plate rim, $\frac{1}{4}$ of the length of the first side plate rim and $\frac{1}{3}$ of the length of the first side plate rim.

For example, as shown in FIG. 4U to FIG. 4X, the first avoiding groove 0421 on the second side plate rim extending in the second direction is opposite to the third positioning groove 2100 or the fourth positioning groove 2200, and a part of the orthographic projection of the third positioning portion 1100 on the plane where the second supporting surface 3215 is located is in the third positioning groove 2100 and the corresponding first avoiding groove 0421, and a part of the orthographic projection of the fourth positioning portion 1200 on the plane where the second supporting surface 3215 is located is in the fourth positioning groove 2200 and the corresponding first avoiding groove 0421. That is, the third positioning portion 1100 extends into the corresponding first avoiding groove 0421 after passing through the third positioning groove 2100, and the fourth positioning portion 1200 extends into the corresponding first avoiding groove 0421 after passing through the fourth positioning groove 2200.

For example, in the normal temperature environment, the part of the first avoiding groove 0421 close to the outer edge is not covered by the second positioning portion 0120, the third positioning portion 1100 or the fourth positioning portion 1200, and a certain gap is reserved for the expansion space when the first sub-optical film expands.

For example, as shown in FIG. 4U to FIG. 4X, in an example of the embodiment of the present disclosure, one third positioning portion 1100 (i.e., the third protruding portion 0112) and one fourth positioning portion 1200 (i.e., the fourth protruding portion 0122) located at one side of the third positioning portion 1100 are provided at the second sub-edge portion 0102 of the first sub-optical film 3101, and a rim extending in the second direction of the second middle frame 320 is provided with one third positioning groove 2100 for placing the third positioning portion 1100 and one fourth positioning groove for placing the fourth positioning portion 1200. The second side plate rim of the side plate 420 of the back plate 400 extending in the second direction is provided with two first avoiding grooves 0421 corresponding to the two positioning grooves one by one, for avoiding the third protruding portion 0112 and the fourth protruding portion 0122 of the first sub-optical film 3101. That is, the third protruding portion 0112 and the fourth protruding portion 0122 protrude away from the center of the first sub-optical film 3101, pass through the positioning groove of the rim of the second middle frame 320, and extend into the notch (i.e., the first avoiding groove 0421) provided by the side plate 420.

For example, the width of the first avoiding groove 0421 provided on the second side plate rim extending in the second direction may be 26 mm, and the depth of the first avoiding groove 0421 in the direction perpendicular to the second supporting surface 3215 may be 2.1 mm. For example, the positions of the two first avoiding grooves 0421 provided on the second side plate rim extending in the second direction are $\frac{1}{3}$ of the length of the second side plate rim and $\frac{2}{3}$ of the length of the second side plate rim, respectively.

For example, as shown in FIG. 4U to FIG. 4X, the side plate 420 further includes a plurality of second avoiding grooves 422, each of which is located on the second side plate rim extending in the second direction and corresponds to the fifth positioning groove 3240 of the second middle frame 320, and a part of the orthographic projection of the convex structure 0320 on the plane where the second supporting surface 3215 is located is in the corresponding fifth positioning groove 3240 (i.e., the space between two blocking walls) and the second avoiding groove. For example, in the normal temperature environment, in the direction perpendicular to the second supporting surface, the edge of the second avoiding groove 422 close to the outer side is flush with the outer side edge of the convex structure 0320.

For example, as shown in FIG. 4U to FIG. 4X, in an example of the embodiment of the present disclosure, the edge of the second sub-optical film 0300 extending in the second direction is provided with one convex structure 0320, and the rim of the second middle frame 320 extending in the second direction is provided with one fifth positioning groove 3240 for placing the convex structure 0320. The second side plate rim of the side plate 420 of the back plate 400 extending in the second direction is provided with one second avoiding groove 422 corresponding to the fifth positioning groove 3240, which is used for avoiding the convex structure 0320 of the second sub-optical film 0300. That is, the convex structure 0320 protrudes away from the center of the second sub-optical film 0300, passes through the fifth positioning groove of the rim of the second middle frame 320, and extends into the notch (i.e., the second avoiding groove 422) provided on the side plate 420.

For example, the width of the second avoiding groove 422 disposed on the second side plate rim extending in the second direction may be 27 mm, and the depth of the second avoiding groove 422 in the direction perpendicular to the second supporting surface 3215 may be 4.8 mm Because the second sub-optical film is located between the first sub-optical film and the second middle frame, the depth of the second avoiding groove for avoiding the convex structure of the second sub-optical film is deeper than that of the first avoiding groove for avoiding the protruding portions of the first sub-optical film.

For example, as shown in FIG. 4U to FIG. 4X, the second side plate rim of the side plate 420 extending in the second direction includes two first avoiding grooves 0421 and one second avoiding groove 422, and the second avoiding groove 422 is located between the two first avoiding grooves 0421. For example, the second avoiding groove 422 is located in the middle of the second side plate rim, and the three avoiding grooves located on the second side plate rim are arranged at equal intervals.

The embodiment of the present disclosure is described by taking the back plate 400 as a structure in a backlight assembly as an example. But the embodiment is not limited thereto, for example, the back plate can also be a structure outside the backlight assembly and is the back plate of the display device. The second middle frame located in the backlight assembly in the embodiment of the present disclosure may be another middle frame in the display device, so the display device provided by the embodiment of the present disclosure includes two middle frames. In the present disclosure, two middle frames are disposed in the curved surface display device and only the second middle frame is fixed on the bottom plate of the back plate, the assembly tolerance can be minimized, and then the curvature accuracy of the display device can be improved.

For example, the curved surface display device provided by the embodiment of the present disclosure can be a vehicle-mounted curved surface display device applied to an automobile.

Figure 5A:
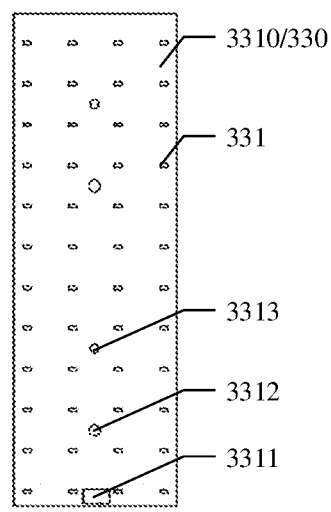
FIG. 5A is a schematic plan view of a strip-shaped lamp plate in a light source component shown in FIG. 1A and FIG. 1B.
Figure 5B:
FIG. 5B is a schematic plan view of an adapter plate connected with the strip-shaped lamp plate shown in FIG. 5A.
Figure 5C:
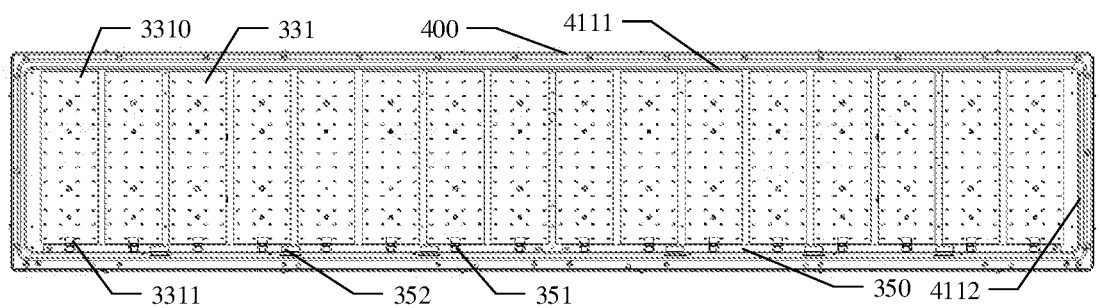
FIG. 5C is a schematic diagram of assembling a back plate and a light source component in the curved surface display device shown in FIG. 1A.

For example, FIG. 5A is a schematic plan view of a strip-shaped lamp plate in a light source component shown in FIG. 1A and FIG. 1B, FIG. 5B is a schematic plan view of an adapter plate connected with the strip-shaped lamp plate, and FIG. 5C a schematic diagram of assembling a back plate and a light source component. As shown in FIGS. 3C and 5A-5C, the light source component 330 included in the backlight assembly includes a plurality of strip-shaped lamp plates 3310, and light emitting diodes 331 are arranged on each strip-shaped lamp plate 3310 in an array. The reflective sheet 340 is located on a light emitting surface of the light source component 330 and exposes the light emitting diodes 331, that is, the reflective sheet is located on a side of the light source component facing the display panel, and includes a plurality of openings for exposing a plurality of light emitting diodes, so that the light emitted by the light emitting diodes will not be blocked by the reflective sheet.

For example, as shown in FIG. 5A to FIG. 5C, the strip-shaped lamp plate 3310 includes a positioning hole 3312, and a positioning protrusion corresponding to the positioning hole 3312 is arranged on one side of the bottom wall of the back plate facing the light source component 330, and the positioning hole 3312 is matched with the positioning protrusion (for example, the positioning hole is sleeved on the positioning protrusion) to realize the positioning of the strip-shaped lamp plate. One side of the strip-shaped lamp plate 3310 facing the bottom wall can be provided with double-sided adhesive tape, and the strip-shaped lamp plate 3310 is positioned through the positioning hole 3312 and fixedly connected with the bottom wall through the double-sided adhesive tape.

For example, as shown in FIG. 5A to FIG. 5C, the strip-shaped lamp plate 3310 further includes a third fixing hole 3313, and the reflective sheet 340 located on the side of the strip-shaped lamp plate 3310 away from the bottom wall can be fixedly connected with the bottom wall through the third fixing hole 3313, thereby further fixing the strip-shaped lamp plate 3310.

For example, as shown in FIG. 3E and FIG. 5A, the reflective sheet 340 includes a fourth fixing hole 341 corresponding to the third fixing hole 3313, and the reflective sheet 340 and the strip-shaped lamp plate 3310 can be fixed on the back plate by using nylon rivets penetrating through the fourth fixing hole and the third fixing hole.

For example, as shown in FIG. 5C, the extending direction of each strip-shaped lamp plate 3310 is parallel to the second edge 4112, that is, the extending direction of the strip-shaped lamp plate 3310 intersects with the extending direction of the first side 4111 with an arc shape, so that the curved surface bottom wall of the back plate can be prevented from being deformed or damaged due to the stress difference with the strip-shaped lamp plate. For example, the plurality of strip lamps 3310 may be arranged in the extending direction of the first side 4111, but not limited thereto, and the plurality of strip lamps may also be arranged in an array.

For example, as shown in FIG. 5A to FIG. 5C, each strip-shaped lamp plate 3310 further includes an adapter plate connector 3311. The backlight assembly also includes at least one strip-shaped adapter plate 350 located on the side of the bottom wall facing the display panel. Each adapter plate 350 includes a plurality of light bar connectors 351 to connect the adapter plate connectors 3311 of a plurality of strip-shaped lamp plate 3310. That is, each adapter plate 350 is connected with a plurality of strip-shaped lamp plates 3310.

For example, each adapter plate 350 extends in the extending direction of the first side 4111, and a plurality of adapter plates 350 are arranged in the extending direction of the first side 4111 and extends along the second edge 4112 of the bottom wall, and the adapter plates 350 are all located at one side of the light source component 330.

For example, the material of the adapter plate has flexible characteristics, and is arranged on the curved surface bottom wall 411 to form an arc-shaped adapter plate with a certain curvature.

For example, the edge of the reflective sheet 340 extending in the extending direction of the first side of the bottom wall may be provided with a slot, the edge provided with the slot corresponds to the adapter plate, and the slot is used to avoid the connection position between the adapter plate connector 3311 and the light bar connector 351.

For example, as shown in FIG. 5A to FIG. 5C, the adapter plate 350 is also provided with an adapter plate fixing hole 353 to realize the fixed connection with the bottom wall.

For example, the reflective sheet arranged on the bottom wall may include two sub-reflective sheets which are arranged along the first direction, and each sub-reflective sheet is fixed on the curved surface bottom wall by adhesive materials (such as double-sided adhesive) and fixing members (such as nylon rivets). For example, the reflective sheets are spliced in sections, and the splice between two sub-reflective sheets is attached to the bottom wall with double-sided adhesive tape. The above-mentioned sectional design can ensure that the reflective sheets are not prone to bump on the curved surface bottom wall. For example, push-in self-locking nylon rivets can be used to fix the reflective sheet and light source components (such as light bars) on the curved surface bottom wall of the back plate. For example, the fixing holes provided on the reflective sheet which are penetrated by nylon rivets are arrayed along the first direction and the second direction. For example, the interval between two adjacent fixing holes arranged in the first direction can be 72 mm, and the interval between two adjacent fixing holes arranged in the second direction can be 96 mm. For example, the edge of the reflective sheet extending in the extending direction of the curved long side of the bottom wall may be provided with a T-shaped groove, which is used to avoid the connection position between the adapter plate connector (not shown) of the light source component and the light bar connector (not shown), so as to avoid structural interference between the reflective sheet and the connector.

Figure 5D:
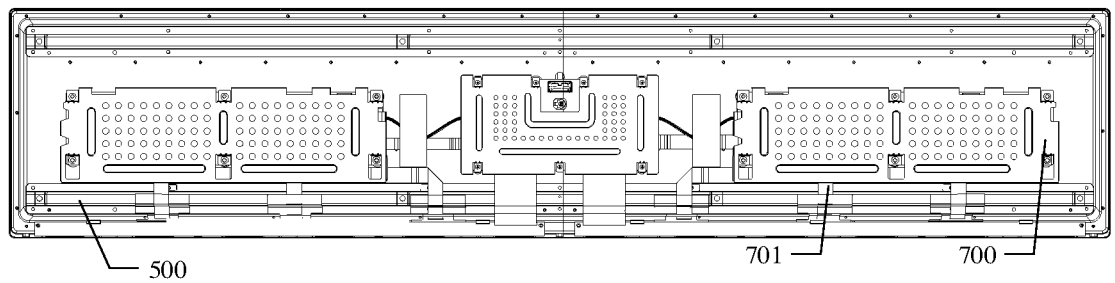
FIG. 5D is a plan view of a side of a back plate away from a display panel in the curved surface display device shown in FIG. 1A.

For example, FIG. 5D is a plan view of a side of the back plate away from the display panel. For example, as shown in FIG. 5A to FIG. 5D, the adapter plate 350 further includes a driving connector 352 to connect the strip-shaped lamp plate 3310 to the light source driving plate 700 located on the side of the back plate away from the display panel. For example, the driving connector 352 may be connected to the light source driving plate 700 through a Flexible Flat Cable (FFC) 701.

For example, at least two strip-shaped lamp plates 3310 connected with each adapter plate 350 can reduce the number of strip-shaped lamp plate output lines by connecting to the adapter plates 350, thereby reducing the number of strip-shaped lamp plate output ports, that is, reducing the number of driving connectors 352.

For example, one adapter plate 350 may be provided with eight light bar connectors 351 to be connected with the adapter plate connectors 3311 of eight light bar plates 3310 to reduce the number of output ports of the light bar plates to three. That is, the adapter plate 350 connected with the eight strip-shaped lamp plates 3310 may be provided with three driving connectors 352 as output ports of the eight strip-shaped lamp plates 3310, thereby reducing the output ports of the strip-shaped lamp plates. The embodiment of the present disclosure schematically shows that the number of the output ports of eight strip-shaped lamp plates is reduced to three, but it is not limited thereto, and the number of the output ports can also be one, two, four, etc., as long as the number of the output ports of the strip-shaped lamp plates is less than the number of the strip-shaped lamp plates. FIG. 5C schematically shows a case where two adapter plates are connected with sixteen strip-shaped lamp plates, the number of the strip-shaped lamp plates connected with the adapter plates is not limited in the embodiment of the present disclosure, and can be set according to actual product requirements.

Figure 5E:
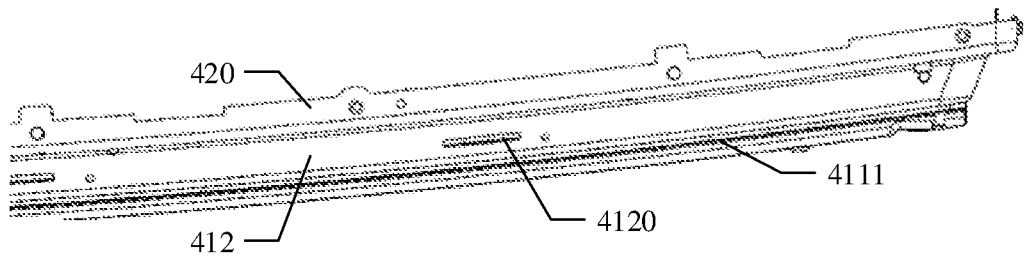
FIG. 5E is a partial side view of a connecting portion of a back plate shown in FIG. 1A.

For example, FIG. 5E is a partial side view of the connecting portion of the back plate shown in FIG. 1A. As shown in FIG. 5D to FIG. 5E, a strip-shaped outlet hole 4120 is formed at the part of the connecting portion 412 connecting with one of the two first edges 4111 of the bottom wall 411, and a major axis of the strip-shaped outlet hole 4120 is parallel to the first side 4111. For example, a flexible cable 701 passes through the strip-shaped outlet hole 4120 to realize the connection between the light source component 330 and the light source driving plate 700. In the embodiment of the disclosure, the strip-shaped outlet hole with the major axis parallel to the first side is arranged at the connecting portion, so that the influence of the outlet hole on the strength of the connecting portion can be reduced.

For example, the driving connector 352 of the adapter plate 350 can be connected with a flexible flat cable 701, which passes through the strip-shaped outlet hole 4120 provided on the connecting portion 412 and extends to the side of the bottom wall 411 away from the display panel to be connected with the light source driving plate 700 located on the back of the display device. In the embodiment of the present disclosure, the strip-shaped outlet hole is arranged at the connecting portion, so that the lamp wire connecting the light source component and the light source driving plate passes through the connecting portion instead of the bottom wall, and the influence of the outlet hole on the strength and curvature of the bottom wall can be reduced.

For example, the light source driving plate 700 can be connected with an external power supply to drive each light emitting diode by voltage signals such as partitioning and/or time sharing.

For example, the light source driving plate 700 may be connected through signal lines such as power lines, clock lines, input/output lines (I/O lines) to control the operation timing of the light source driving plate 700. For example, the display device can achieve the effects of good contrast and high brightness by controlling the light-emitting diodes in different areas.

Upon the brightness of the light source of the backlight assembly is required to be high, the number of light emitting diodes needs to be set up more. Assuming that each strip-shaped lamp plate is connected to the light source driving plate on the side of the back plate away from the display panel through a signal line, it is necessary to open a plurality of connection vias in the bottom wall of the back plate, which will affect the strength of the bottom wall. In the embodiment of the disclosure, by arranging the adapter plates corresponding to the plurality of strip-shaped lamp plates, the number of output ports of the strip-shaped lamp plates can be reduced, thereby reducing the number of openings on the back plate to ensure the strength of the back plate.

Based on the above embodiments, the present disclosure also provides such a technical scheme that a display device includes a display panel; a backlight assembly located on a non-display side of the display panel and including a plurality of strip-shaped lamp plates, each of the plurality of strip-shaped lamp plates extends along a first direction; a back plate, at least part of the back plate being located at a side of the backlight assembly away from the display panel, wherein the back plate includes a bottom wall and a side wall connected with the edge of the bottom wall; the plurality of strip-shaped lamp wall are located on a side of the bottom wall facing the display panel, the backlight assembly further includes at least one adapter plate on the side of the bottom wall facing the display panel, the adapter plate extends along a second direction intersecting with the first direction, and each adapter plate is connected with at least two strip-shape lamp plates to provide driving signals for them.

In some examples, each strip-shaped lamp plate includes an adapter plate connector, and each adapter plate includes a plurality of light bar connectors to connect the adapter plate connectors of the plurality of strip-shaped lamp plates, respectively.

In some examples, the bottom wall includes a first bottom edge extending along the first direction and a second bottom edge extending along the second direction, and a part of the side wall connected with the second bottom edge close to the adapter plate is provided with an outlet hole; the display device further includes a light source driving plate, located at a side of the bottom wall away from the display panel, and the adapter plate being connected with the light source driving plate through a wire led out from the outlet hole.

In some examples, the bottom wall is a curved structure, and the second bottom edge is a curved edge.

In some examples, the outlet hole is a strip-shaped outlet hole, and a major axis of the strip-shaped outlet hole is parallel to the second bottom edge.

In some examples, the backlight assembly further includes an optical film and a middle frame, the middle frame being located at a side of the optical film away from the display panel and being configured to support the optical film.

It should be noted that the side wall provided with the outlet hole in this technical scheme is the connecting portion 412 in the embodiment shown in FIG. 5E; the first bottom edge of the bottom wall in this technical scheme is the second edge 4112 in the embodiment shown in FIG. 2A, and the second bottom edge is the first edge 4111 in the embodiment shown in FIG. 2A; the middle frame in this technical scheme is the second middle frame 320 in the embodiment shown in FIG. 1A. Other technical features not described in detail can refer to the above embodiments.

Figure 6A:
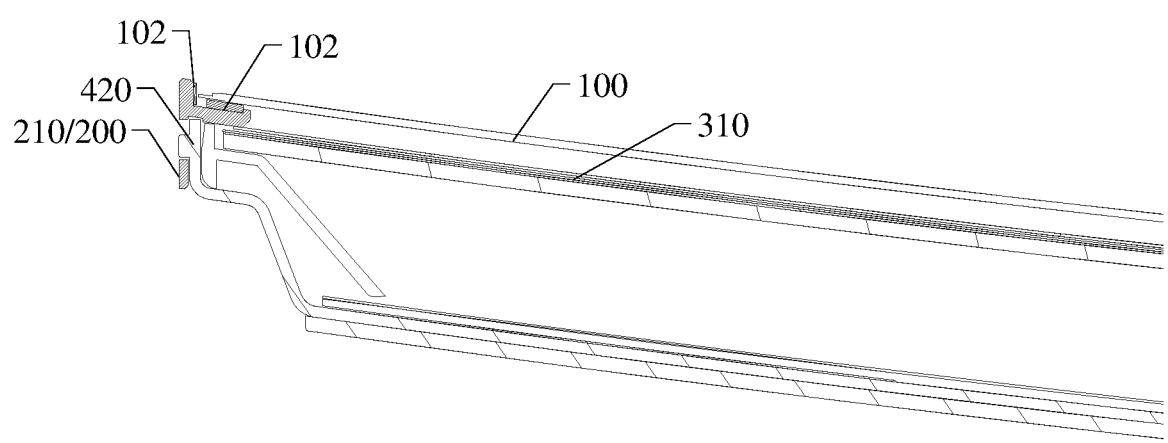
FIG. 6A is a schematic partial cross-sectional view of the assembly of a first middle frame, a backlight assembly and a back plate in the curved surface display device shown in FIG. 1A.

For example, FIG. 6A is a schematic partial cross-sectional view of the assembly of the first middle frame, the backlight assembly and the back plate. As shown in FIG. 6A, a side of the first middle frame 200 away from the display panel 100 in the embodiment of the present disclosure presses against the optical film 310, that is, the surface of the first middle frame 200 away from the display panel 100 contacts the optical film 310 to press and fix the optical film 310 to ensure the flatness of the optical film 310.

Figure 6B:
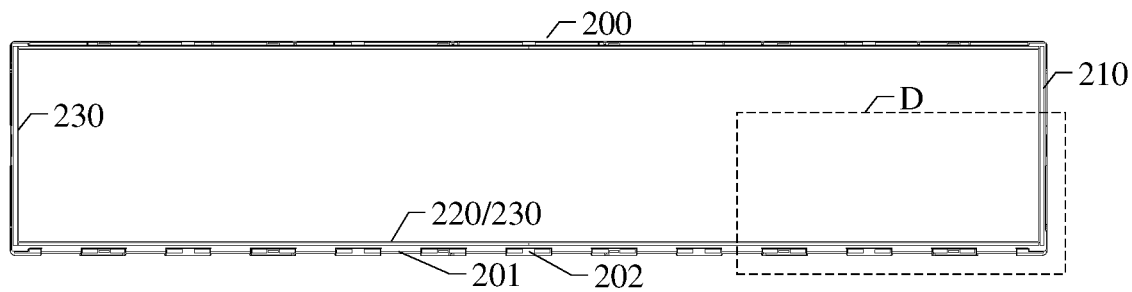
FIG. 6B is a schematic plan view of a first middle frame shown in FIG. 1A.
Figure 6C:
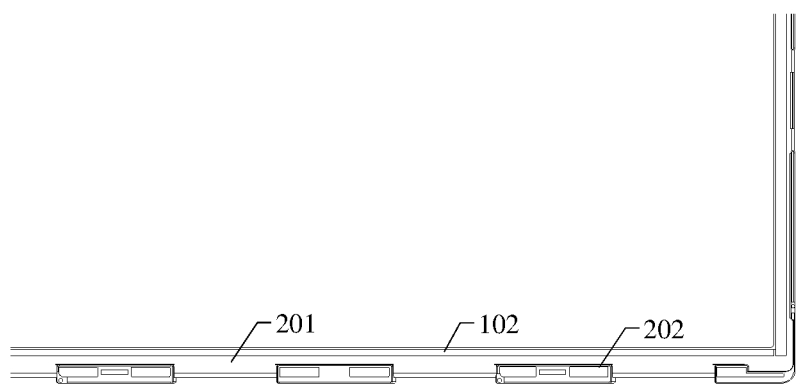
FIG. 6C is an enlarged schematic diagram at a position D in FIG. 6B.
Figure 6D:
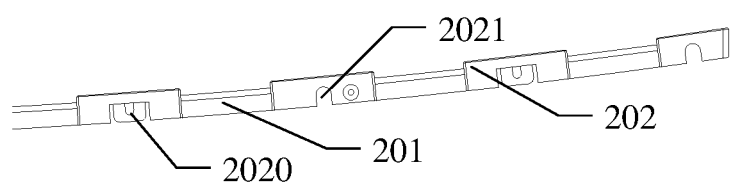
FIG. 6D is a schematic side view of a first middle frame in FIG. 6C.

For example, FIG. 6B is a schematic plan view of the first middle frame shown in FIGS. 1A and 1B, FIG. 6C is a partially enlarged schematic view at a position D in FIG. 6B, and FIG. 6D is a schematic side view of the first middle frame in FIG. 6C. As shown in FIG. 1B and FIG. 6A to FIG. 6D, the first middle frame 200 may be a continuous ring structure that surrounds the display panel 100.

For example, as shown in FIGS. 6A and 6B, the first middle frame 200 includes an outer rim 210 surrounding the display panel 100, and at least part of the outer rim 210 is located at the outer side of the side plate 420 of the back plate 400 and fixedly connected with the side plate 420. For example, a part of the outer rim of the first middle frame can be connected with the side plate to realize the positioning of the first middle frame, and another part of the outer rim of the first middle frame can be fixedly connected with the side plate to realize the position fixing. For example, FIG. 6D shows a snap hole 2020 on the outer rim of the first middle frame, and a snap protrusion corresponding to the snap hole 2020 is also arranged on the side plate of the back plate to be matched with the snap hole to realize rough positioning of the first middle frame. That is, the snap hole of the outer rim is sleeved on the snap protrusion on the side plate to realize the coarse positioning of the first middle frame.

For example, in a direction perpendicular to the bottom wall, the first middle frame may be supported by the side plate of the back plate. The outer rim of the first middle frame includes a connecting hole 2021, and the side plate of the back plate includes a screw hole opposite to the connecting hole 2021 of the outer rim. Screws can be used to penetrate through the connecting holes and screw holes, and the screws penetrate through the connecting holes 2021 of the outer rim to engage with the screw holes of the side plate, so that the first middle frame and the side plate of the back plate are fixedly connected, and the fixing direction is perpendicular to the side plate. In the embodiment of the present disclosure, the connecting hole in the first middle frame (the connecting hole 2021 shown in FIG. 6D) is only a via hole penetrated by a screw, rather than a threaded hole for engaging connection with a screw, so even if the expansion and contraction displacement generated by the first middle frame around the screw is large, the obstruction of the screw may cause large deformation of the connecting hole, and there will be no failure of the connecting hole.

For example, the material of the first middle frame 200 may be a light shielding material to shield an edge region of the display panel 100. For example, the material of the first middle frame 200 may be a flexible material to bend as other structures bend. For example, the material of the first middle frame 200 may be polycarbonate (PC).

For example, the hardness of the material of the second middle frame 320 in the embodiment of the present disclosure is greater than that of the material of the first middle frame 200.

In the embodiment of the present disclosure, because the positions and supported film layers of the first middle frame and the second middle frame are different, the hardness of the two materials is different. The hardness of the material selected for the first middle frame is low, so that the curvature of the first middle frame can be determined by the curvature of the front frame on a side of the first middle frame away from the display panel. Even when deformation such as expansion with heat and contraction with cold occurs, the front frame is pressed with the first middle frame, so that the variation of curvature of the first middle frame can be minimized In addition, the thickness of the first middle frame provided by the embodiment of the present disclosure is thin, for example, the thickness of the first middle frame is 0.8 mm, which can improve its curved surface forming rate. The second middle frame is located on the bottom plate of the back plate, which plays a role in supporting the optical film by adopting a material with higher hardness, and can be stably arranged on the bottom plate to prevent unnecessary deformation caused by soft material of the second middle frame, thereby ensuring the curvature accuracy of the optical film.

The first middle frame and the second middle frame which are separated from each other in the display device provided by the embodiment of the disclosure can ensure the curvature precision of each middle frame after the curved surface is formed; in addition, the first middle frame and the second middle frame can be formed by using different materials, and are formed with different thicknesses to ensure a good fit with the curvatures of other structures, so that the assembly tolerance can be reduced and the curvature accuracy of the display device can be improved.

For example, as shown in FIG. 6A to FIG. 6D, the first middle frame 200 includes a third supporting portion 230 configured to support the display panel 100, and the third supporting portion 230 includes a second arc strip portion 220 corresponding to the first arc strip portion 4131, and the second arc strip portion 220 has the same bending direction as the first arc strip portion 4131. According to the embodiment of the present disclosure, by setting the first middle frame supporting the display panel as a curved surface structure, the display panel can be guaranteed to have a predetermined curvature.

For example, the third supporting portion 230 includes two second arc strip portions 220 opposite to each other, and the two second arc strip portions 220 correspond to two first edges of the bottom wall. Upon the second edge of the bottom wall being an arc-shaped edge, the third supporting portion may also include two other arc strip portions opposite to each other; upon the second edge of the bottom wall being a straight edge, the other two opposite strip portions included in the third supporting portion are linear strip portions, the embodiment of the present disclosure is not limited thereto.

For example, as shown in FIG. 6A to FIG. 6D, the third supporting portion 230 has a third supporting surface facing the display panel 100, and the third supporting surface is provided with a buffer 102, which can release the acting force between the display panel and the first middle frame when the display device is in a vibrating state, so as to prevent the display panel 100 from being damaged due to external force. For example, the buffer can be made of flexible materials such as foam or rubber.

For example, as shown in FIG. 6A to FIG. 6D, an inner side of the outer rim 210 surrounding the sides of the display panel 100 may also be provided with the buffer 102. Therefore, when the side of the display panel faces the ground, the inner side of the first middle frame plays a supporting role on the display panel, and the buffer provided on the inner side of the first middle frame can play a protective role on the display panel.

For example, as shown in FIG. 6A to FIG. 6D, one edge of the outer rim 210 of the first middle frame 200 may be provided with side wall barricades 202 and side wall openings 201 between adjacent side wall barricades 202, and other edges of the outer rim 210 of the first middle frame 200 may be a continuous structure including connecting holes for fixing with the back plate. For example, the outer rim 210 where the side wall barricade 202 is located can be an arc-shaped outer rim corresponding to the first arc-shaped strip, and the side wall barricade 202 is used to support the display panel when a side of the display panel facing the side wall barricade 202 faces the ground. Therefore, the buffer arranged inside the outer rim can be the buffer arranged on an inner side of the side wall barricade.

For example, the display device further includes a circuit board (not shown) located on a surface of the first supporting portion away from the display panel and at the outer side of the connecting portion, and the circuit board is connected with the display panel through wires led out from the side wall opening of the outer rim of the first middle frame.

Figure 7A:
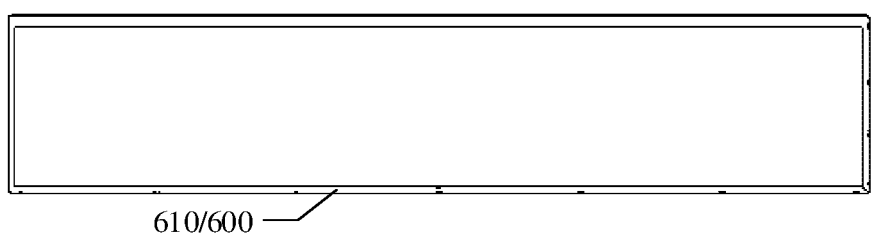
FIG. 7A is a schematic plan view of a front frame shown in FIG. 1A.
Figure 7B:
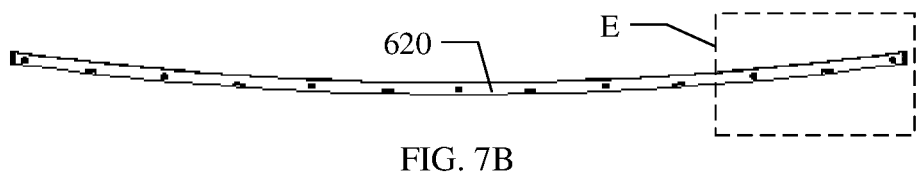
FIG. 7B is a structural schematic diagram of a front frame side wall of the front frame shown in FIG. 7A.
Figure 7C:
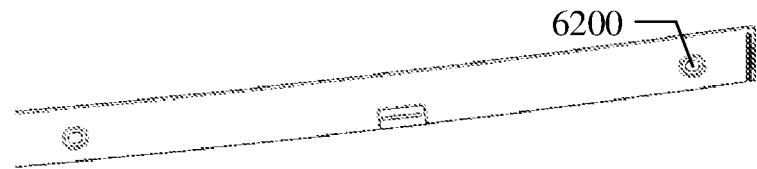
FIG. 7C is an enlarged schematic diagram at a position E in a front frame side wall shown in FIG. 7A.
Figure 7D:
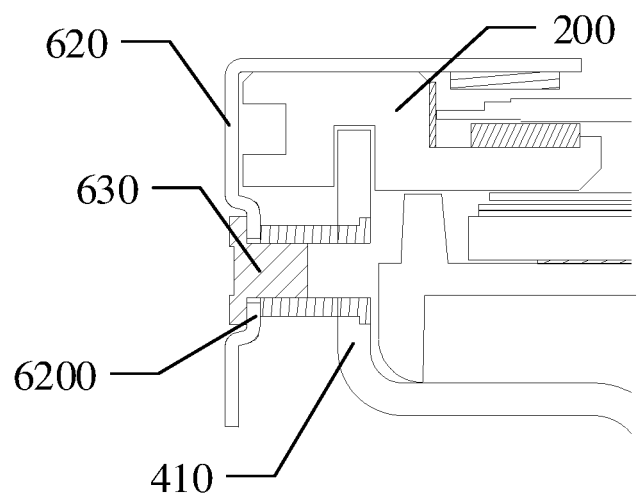
FIG. 7D is a partial structural diagram of a connection between a front frame and a back plate shown in FIG. 1A.

For example, FIG. 7A is a schematic plan view of a front frame shown in FIG. 1A and FIG. 1B, FIG. 7B is a structural schematic diagram of a front frame side wall of the front frame shown in FIG. 7A, FIG. 7C is an enlarged schematic diagram at a position E in a front frame side wall, and FIG. 7D is a partial structure diagram of a connection between the front frame and the back plate. As shown in FIG. 1A to FIG. 7D, the front frame 600 is located on a side of the first middle frame 200 away from the backlight assembly 300, and is configured to press against the display panel 100 to fix the display panel 100 on the first middle frame 200. That is, the front frame contacts the display panel to fix the display panel on the first middle frame.

For example, the front frame 600 may be a continuous annular structure surrounding the display panel 100.

For example, a material of the front frame 600 can be galvanized steel plate with a thickness of 0.6 mm to 0.8 mm, and the curvature of the front frame can be ensured by stamping forming. For example, the back plate and the front frame can be made by die-casting forming process, and the rebound and dehydration rate of the formed material is less than that of the stamping forming process, and the statistical tolerance curvature can be ±1 mm.

For example, the front frame 600 may include a third arc strip portion 610 located on a side of the second arc strip portion 220 away from the first arc strip portion. The above-mentioned third arc strip portion is a strip portion corresponding to the first edge of the bottom wall, and the embodiment of the present disclosure determines the curvature of the display panel and the first middle frame by setting the curvature of the third arc strip portion of the front frame.

For example, the curvature of the second arc strip of the first middle frame is determined by the curvature of the third arc strip portion of the front frame. The material of the first middle frame in the embodiment of the disclosure adopts flexible material to bend along with the bending of the front frame, that is, the curvature of the first middle frame is determined by the curvature of the front frame on a side of the first middle frame away from the display panel, which can better cooperate with the front frame to ensure the curvature of the display panel.

For example, when the display panel is arranged between the first middle frame and the front frame, the curvature of the display panel is jointly determined by the curvatures of the front frame and the first middle frame.

For example, as shown in FIG. 7A to FIG. 7D, the front frame 600 includes a front frame side wall 620 located on a side of the outer rim 210 of the first middle frame 200 away from the side plate 420, and the front frame side wall 620 can be fixed with the side plate of the back plate by screws.

For example, the front frame side wall 620 includes an elongated hole 6200, so that the front frame side wall 620 is fixedly connected to the side plate 420 through a second fixing member 630 penetrating through the elongated hole 6200. The minor axis of the elongated hole 6200 is perpendicular to the first supporting surface to reduce the curvature tolerance after the front frame and the back plate are locked, that is, to reduce the curvature influence value, and at the same time, the major axis is used to ensure the election deviation and improve the assembly rate.

For example, the screw hole of the back plate may be a round hole with a diameter of 2.5 mm. The screw hole of the side wall of the front frame is an elliptical hole with a major axis of 4.4 mm and a minor axis of 3.2 mm, so the curvature tolerance of the front frame is 0.7 mm.

For example, in the extending direction of the minor axis, the size of the second fixing member matches the size of the minor axis to realize the accurate positioning of the front frame. That is, in the direction of the minor axis, the size of the second fixing member is approximately equal to that of the minor axis.

For example, along the major axis direction, the size difference between the second fixing member and the major axis may be between 0.81 and 0.96 mm; in the minor axis direction, the size difference between the second fixing member and the minor axis may be between 0.31 and 0.46 mm.

The accurate positioning in the embodiment of the present disclosure means that the size difference between the fixing member and the fixing hole is an assembly tolerance, and the assembly tolerance is a tolerance that exists reasonably in order to facilitate the installation of the fixing member into the fixing hole. For example, in actual products, the size of the fixing member and the size of the fixing hole cannot be completely the same. In order to install the fixing member into the fixing hole, the size of the fixing hole should exceed that of the fixing member, for example, the size of the fixing hole should exceed the size of the fixing member by 0.1~0.4 mm.

The rough positioning means that the size difference between the fixing member and the fixing hole is greater than the assembly tolerance, so that the fixing member and the fixing hole can move relatively in at least one direction after being fixed. In order to realize rough positioning, that is, allowing the fixing hole and the fixing member to move relatively in at least one direction, the size difference between the fixing member and the fixing hole will be set greater than the assembly tolerance, for example, the assembly tolerance is 0.1~0.5 mm In case of rough positioning, the size difference between the fixing member and the fixing hole can be 0.81~0.96 mm.

Figure 8:
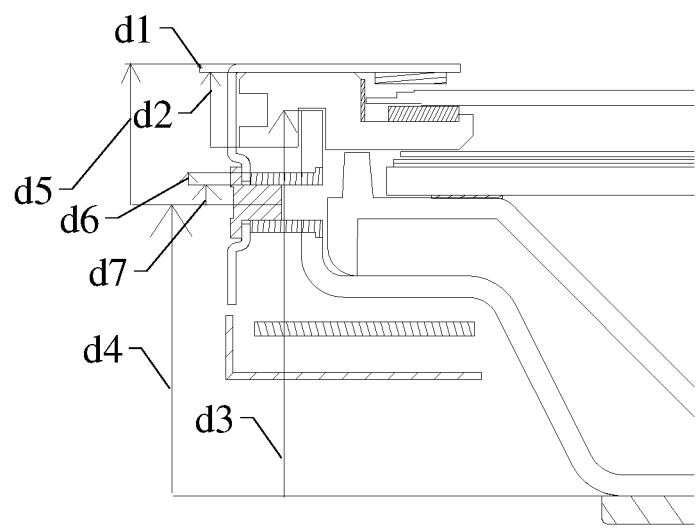
FIG. 8 is a schematic diagram of a curvature tolerance relationship of a curved surface display device provided by an embodiment of the present disclosure.

For example, FIG. 8 is a schematic diagram of a curvature tolerance relationship of a display device provided by an embodiment of the present disclosure. Different structures of the display device in the embodiment of the present disclosure have different curvatures. In order to ensure the assembly consideration, each assembly surface should keep the same curvature radius. The curvature radius formula of different structures can be $Rx=R0\pm h$, Rx refers to the curvature radius of the Xth layer structure, R0 refers to the curvature radius of a reference layer, and h refers to a height difference between the reference layer and the Xth layer. The embodiment of the present disclosure defines the curvature radius of an imaginary plane between an array substrate and an opposing substrate in a display panel as the curvature radius R0 of the curved surface display device. Of course, the curvature radius of the upper surface of the display panel away from the back plate can also be defined as R0.

As shown in FIG. 8, the curvature of the display device provided by the embodiment of the present disclosure can reach 4200R±4.5% R, and 4200R refers to the curvature radius of the display panel. When the back plate of curved surface display device is formed by stamping, the tolerance of chord height of display device can be ±2 mm, and when the back plate is formed by die casting, the tolerance of chord height of display device can be ±1 mm. As shown in FIG. 8, the tolerance of the front frame manufactured by stamping is d1±0.2 mm, the tolerance of the first middle frame manufactured by injection molding is d2±0.05 mm, a gap between the first middle frame and the back plate is 0.2 mm, the tolerance of the back plate manufactured by stamping is d3±0.3 mm, the curvature tolerance of the back plate is 0.7 mm, the deviation tolerance from the center of fixing hole between back plate and front frame to the surface of the bottom wall of back plate away from display panel is d4±0.3 mm, the manufacturing tolerance of a diameter of the screw is d7±0.05 mm, the gap between the screw and an edge of the positioning hole in the front frame is 0.6 mm, the deviation from center of the positioning hole in the front frame is d6±0.05 mm, and the deviation tolerance from a center of the positioning hole in the front frame to a surface of the front frame is d5±0.2 mm. Therefore, the accumulated curvature tolerance is 2.65 mm. The statistical tolerance is 1.67 mm after the curvature tolerance of a plurality of curved surface display devices in the production process is statistically normalized. Therefore, it can be obtained that the curvature accuracy of the display device provided by the embodiment of the present disclosure can reach 4.5% R.

For example, the curved surface display device provided by the embodiment of the present disclosure can be a vehicle-mounted curved surface display device applied to an automobile.

Upon the display device provided by an example of the embodiment of the present disclosure being applied in a vehicle-mounted environment, the combination of accurate positioning and rough positioning between the first sub-optical film and the second middle frame can ensure the fixation of the first sub-optical film and the second middle frame, and can also ensure that the first sub-optical film is not prone to wrinkle in a high-temperature and high-humidity environment, which does not affect the normal display of the display device.

Upon the display device provided by another example of the embodiment of the present disclosure being applied in a vehicle-mounted environment, the combination of accurate positioning and rough positioning adopted between the first sub-optical film and the second middle frame, and the combination of accurate positioning and rough positioning adopted between the second sub-optical film and the second middle frame can not only ensure the fixation of the first sub-optical film, the second sub-optical film and the second middle frame, but also ensure that the first sub-optical film and the second sub-optical film are not prone to wrinkles and other deformation affecting the display in high temperature and high humidity environment, which does not affect the display.

Upon the display device provided by another example of the embodiment of the present disclosure being applied in a vehicle-mounted environment, the combination of accurate positioning and rough positioning adopted between the first sub-optical film and the second middle frame, the combination of accurate positioning and rough positioning adopted between the second sub-optical film and the second middle frame, and a segmented manner spliced in the reflective sheet can ensure the stability of various film fixing structures and avoid bad problems such as scratches, white spots, tripping and the like under vehicle gauge vibration conditions.

According to another embodiment of the present disclosure, a vehicle is provided, which includes the curved surface display device as mentioned above.

For example, the vehicle can include a motor vehicle, an airplane, a ship, a subway and other vehicles that carry people or transport goods.

For example, the motor vehicle may be a car, a truck, or the like.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. A backlight assembly, comprising:
a first sub-optical film, comprising a plurality of first edge portions;
a supporting frame, comprising a first supporting portion, the first supporting portion having a first supporting surface facing the first sub-optical film to support the first sub-optical film, the first supporting portion comprising a plurality of rims, at least one rim being configured to support at least one first edge portion,
wherein the at least one rim comprises a first positioning groove and at least one second positioning groove, the at least one first edge portion comprises a first positioning portion and at least one second positioning portion, the first positioning portion is in the first positioning groove, and each second positioning portion is in a corresponding second positioning groove;
in a normal temperature environment, on each rim and the corresponding first edge portion, opposite sides of each second positioning groove in an extending direction of the rim are not in contact with opposite sides of the corresponding second positioning portion in the extending direction of the rim, the normal temperature environment means that the ambient temperature of the backlight assembly is in a range of 0~40° C.;
the plurality of first edge portions comprise a first sub-edge portion extending along a first direction and a second sub-edge portion extending along a second direction, the at least one second positioning portion comprises a plurality of second positioning portions, the plurality of second positioning portions are located on a same side of the first positioning portion on the first sub-edge portion.

2. The backlight assembly according to claim 1, wherein a length of the first sub-edge portion is greater than that of the second sub-edge portion;
in the normal temperature environment, a plurality of second spaces corresponding to the plurality of second positioning portions gradually increase in a direction from a position close to the first positioning portion to a position away from the first positioning portion.

3. The backlight assembly according to claim 1, wherein a length of the first sub-edge portion is greater than a length of the second sub-edge portion.

4. A backlight assembly, comprising:
a first sub-optical film, comprising a plurality of first edge portions;

a supporting frame, comprising a first supporting portion, the first supporting portion having a first supporting surface facing the first sub-optical film to support the first sub-optical film, the first supporting portion comprising a plurality of rims, at least one rim being configured to support at least one first edge portion, wherein the at least one rim comprises a first positioning groove and at least one second positioning groove, the at least one first edge portion comprises a first positioning portion and at least one second positioning portion, the first positioning portion is in the first positioning groove, and each second positioning portion is in a corresponding second positioning groove;

in a normal temperature environment, on each rim and the corresponding first edge portion, opposite sides of each second positioning groove in an extending direction of the rim are not in contact with opposite sides of the corresponding second positioning portion in the extending direction of the rim, the normal temperature environment means that the ambient temperature of the backlight assembly is in a range of 0~40° C.;

a difference between a size of the first positioning groove and a size of the first positioning portion in the extending direction of the rim is a first space, a difference between a size of each second positioning groove and a size of the corresponding second positioning portion in the extending direction of the rim is a second space, and the first space is smaller than the second space;

the plurality of first edge portions comprise a first sub-edge portion extending along a first direction and a second sub-edge portion extending along a second direction, the first positioning portion on the first sub-edge portion is approximately located at a midpoint of the first sub-edge portion in the first direction, and the at least one second positioning portion comprises a plurality of second positioning portions, and the plurality of second positioning portions located on the first sub-edge portion are distributed on both sides of the first positioning portion in the first direction.

5. The backlight assembly according to claim 4, wherein the rim of the plurality of rims configured to support the first sub-edge portion is an arc shaped rim, and a bending direction of the arc-shaped rim faces the first sub-optical film.

6. The backlight assembly according to claim 4, further comprising:
a back plate, at least part of the back plate being located at a side of the supporting frame away from the first sub-optical film,
wherein the back plate comprises a bottom plate and a side plate disposed on an edge of the bottom plate, and the supporting frame is connected to the bottom plate, the bottom plate comprises a bottom wall and a second supporting portion located outside an edge of the bottom wall, the second supporting portion has a second supporting surface facing the first sub-optical film, and the first supporting portion is disposed on the second supporting surface of the second supporting portion.

7. A display device, comprising the backlight assembly according to claim 4, wherein the display device is a curved surface display device.

8. The backlight assembly according to claim 4, further comprises:
a second sub-optical film including a plurality of second edge portions, the second sub-optical film being located between the first sub-optical film and the first supporting surface of the supporting frame, the first supporting surface being configured to support the second sub-optical film and the first sub-optical film, and at least one of the plurality of rims being configured to support at least one second edge portion;

wherein at least one rim of the first supporting portion further comprises a plurality of blocking walls, and at least one second edge portion comprises a plurality of concave portions, the plurality of concave portions are disposed in one-to-one correspondence with the plurality of blocking walls, and each concave portion is configured to be clamped with the corresponding blocking wall to fix the second sub-optical film.

9. The backlight assembly according to claim 8, wherein each of the plurality of blocking walls comprises two sub-blocking walls arranged in an extending direction of the rim where the blocking wall is located, and the first positioning groove, the second positioning groove, the third positioning groove or the fourth positioning groove is disposed between the two sub-blocking walls, and in the normal temperature environment, an edge of the first edge portion of the first sub-optical film except the first positioning portion, the second positioning portion, the third positioning portion and the fourth positioning portion has an interval with the blocking walls.

10. The backlight assembly according to claim 8, wherein the second sub-optical film comprises a third sub-edge portion extending along the first direction and a fourth sub-edge portion extending along the second direction;

the plurality of concave portions comprise a first sub-concave portion and a plurality of second sub-concave portions located on the third sub-edge portion, the first sub-concave portion is approximately located at a midpoint of the third sub-edge portion in the first direction, and the plurality of second sub-concave portions are distributed on both sides of the first sub-concave portion;

in the normal temperature environment, opposite sides of each second sub-concave portion in the first direction are not in contact with opposite sides of a corresponding blocking wall in the first direction, a difference between a size of the first sub-concave portion and a size of a corresponding blocking wall in the first direction is a fourth space, a difference between a size of the second sub-concave portion and a size of the corresponding blocking wall in the first direction is a fifth space, the fourth space is smaller than the fifth space.

11. The backlight assembly according to claim 10, wherein a length of the third sub-edge portion is greater than a length of the fourth sub-edge portion.

12. The backlight assembly according to claim 10, wherein, in the normal temperature environment, in a direction from a middle point to both end points of the third sub-edge portion, a plurality of fifth spaces corresponding to the plurality of second sub-concave portions gradually increase.

13. The backlight assembly according to claim 10, wherein the plurality of concave portions comprise a third sub-concave portion and at least one fourth sub-concave portion located on the fourth sub-edge portion, the at least one fourth sub-concave portion is located on one side of the third sub-concave portion in the second direction, and in the normal temperature environment, a difference between a size of the third sub-concave portion and a size of a corresponding blocking wall in the second direction is smaller than a difference between a size of each fourth sub-concave portion and a size of a corresponding blocking wall in the second direction.

14. The backlight assembly according to claim 4, wherein a length of the first sub-edge portion is greater than that of the second sub-edge portion;
in the normal temperature environment, a plurality of second spaces corresponding to the plurality of second positioning portions on the first sub-edge portion gradually increase in a direction from the midpoint to both end points of the first sub-edge portion.

15. The backlight assembly according to claim 14, wherein the second space between each second positioning portion and the corresponding second positioning groove comprises at least one of an expansion space and a contraction space, and in the normal temperature environment, in the direction from the midpoint to both end points of the first sub-edge portion, a plurality of expansion spaces corresponding to the plurality of second positioning portions gradually increase, and/or a plurality of contraction spaces corresponding to the plurality of second positioning grooves gradually increase.

16. The backlight assembly according to claim 14, wherein the first positioning portion on the first sub-edge portion comprises a first protruding portion, each second positioning portion on the first sub-edge portion comprises a second protruding portion, a middle part of the second protruding portion comprises an opening, a boss is disposed in the second positioning groove corresponding to the second positioning portion on the first sub-edge portion, and the opening is sleeved on the boss.

17. The backlight assembly according to claim 16, wherein, in the normal temperature environment, opposite sides of each boss in the first direction are not in contact with opposite sides of a corresponding opening in the first direction, and a difference between a size of the opening and a size of the boss in the first direction is a third space greater than the first space.

18. The backlight assembly according to claim 17, wherein a plurality of third spaces corresponding to the plurality of second positioning portions gradually increase in the direction from the midpoint to both end points of the first sub-edge portion.

19. The backlight assembly according to claim 16, wherein the first edge portion further comprises a third positioning portion and at least one fourth positioning portion on the second sub-edge portion, and the rim of the first supporting portion configured to support the second sub-edge portion comprises a third positioning groove and at least one fourth positioning groove, the third positioning portion is in the third positioning groove, and each fourth positioning portion is in a corresponding fourth positioning groove, the least one fourth positioning portion is located on a same side of the third positioning portion in the second direction,
in the normal temperature environment, opposite sides of each fourth positioning groove in the second direction are not in contact with opposite sides of the corresponding fourth positioning portion in the second direction, and a difference between a size of the third positioning groove and a size of the third positioning portion in the second direction is smaller than a difference between a size of each fourth positioning groove and a size of a corresponding fourth positioning portion in the second direction.

20. The backlight assembly according to claim 19, wherein the opening of the second positioning portion on the first sub-edge portion close to the third positioning portion contacts with or keeps a small distance from a side of a corresponding boss away from the third positioning portion in the second direction, and a space between a side of the third positioning portion away from the fourth positioning portion and a corresponding side of the third positioning groove is smaller than a space between a side the third positioning portion close to the fourth positioning portion and a corresponding side of the third positioning groove to realize an accurate positioning of the first sub-optical film in the second direction;
a space between the side of the third positioning portion away from the fourth positioning portion and the corresponding side of the third positioning groove is smaller than two spaces between two sides of each fourth positioning portion and a corresponding fourth positioning groove.

* * * * *